(12) United States Patent
Bica et al.

(10) Patent No.: US 12,140,195 B2
(45) Date of Patent: *Nov. 12, 2024

(54) MECHANICAL RENEWABLE GREEN ENERGY PRODUCTION

(71) Applicant: PHOS GLOBAL ENERGY SOLUTIONS, INC., Fort Lauderdale, FL (US)

(72) Inventors: Victor Bica, Saint James, NY (US); Eugene Earle Rudolph, Port Jefferson Station, NY (US)

(73) Assignee: PHOS GLOBAL ENERGY SOLUTIONS, INC, Fort Lauderdale, FL (US)

( * ) Notice: Subject to any disclaimer, the term of this patent is extended or adjusted under 35 U.S.C. 154(b) by 62 days.

This patent is subject to a terminal disclaimer.

(21) Appl. No.: 17/794,532

(22) PCT Filed: Aug. 14, 2020

(86) PCT No.: PCT/US2020/046453
§ 371 (c)(1),
(2) Date: Jul. 21, 2022

(87) PCT Pub. No.: WO2021/086470
PCT Pub. Date: May 6, 2021

(65) Prior Publication Data
US 2023/0261505 A1 Aug. 17, 2023

Related U.S. Application Data

(63) Continuation of application No. 16/735,502, filed on Jan. 6, 2020, now Pat. No. 10,749,372, and a
(Continued)

(51) Int. Cl.
*H02J 3/30* (2006.01)
*F03B 7/00* (2006.01)
(Continued)

(52) U.S. Cl.
CPC .............. *F16F 15/315* (2013.01); *F03B 7/00* (2013.01); *H02J 3/30* (2013.01); *H02J 7/0013* (2013.01);
(Continued)

(58) Field of Classification Search
CPC .... F03B 7/00; H02K 7/025; H02J 3/30; H02J 3/32; H02J 7/0013; H02J 7/007;
(Continued)

(56) References Cited

U.S. PATENT DOCUMENTS 2,460,015 A 1/1949 Jones
3,523,204 A 8/1970 Rand
(Continued)

FOREIGN PATENT DOCUMENTS

CN 1269628 A 10/2000
JP 2008035589 A 2/2008
WO 2010123343 A1 10/2010

OTHER PUBLICATIONS

Canadian Office Action issued in Canadian Application No. 3,157,178 dated May 10, 2023.
(Continued)

*Primary Examiner* — Levi Gannon
(74) *Attorney, Agent, or Firm* — Weber Rosselli & Cannon LLP

(57) ABSTRACT

A renewable energy generation system includes a drive motor, a flywheel in mechanical communication with the drive motor, a generator in mechanical communication with the flywheel, a charge controller in electrical communication with the generator, a plurality of charge controller switches in electrical communication with the charge controller, a plurality of batteries in electrical communication with a respective charge controller switch, and a power management module in electrical communication with the plurality
(Continued)

of charge controller switches. The drive motor effectuates rotation of the flywheel to generate stored rotational energy which is transferred to the generator as a load is placed upon the generator to maintain a constant speed of the drive motor. The power management module selectively opens or closes a charge controller switch to permit or inhibit the flow of electrical energy to a respective battery to reduce the electrical load placed upon the generator and drive motor.

15 Claims, 36 Drawing Sheets

Related U.S. Application Data continuation of application No. 16/925,071, filed on Jul. 9, 2020, now Pat. No. 10,900,540.

(60) Provisional application No. 62/929,562, filed on Nov. 1, 2019, provisional application No. 63/027,204, filed on May 19, 2020.

(51) Int. Cl.
| | |
|---|---|
| *F16F 15/315* | (2006.01) |
| *H02J 3/32* | (2006.01) |
| *H02J 7/00* | (2006.01) |
| *H02J 7/14* | (2006.01) |
| *H02J 7/32* | (2006.01) |
| *H02K 7/02* | (2006.01) |
| *H02K 7/18* | (2006.01) |
| *H02K 7/20* | (2006.01) |
| *H02K 49/10* | (2006.01) |
| *H02N 15/00* | (2006.01) |
| *C25B 1/04* | (2021.01) |
| *F02B 43/10* | (2006.01) |
| *F02M 21/02* | (2006.01) |

(52) U.S. Cl.
CPC .......... *H02J 7/1415* (2013.01); *H02J 7/1423* (2013.01); *H02J 7/32* (2013.01); *H02K 7/02* (2013.01); *H02K 7/1815* (2013.01); *H02K 7/20* (2013.01); *H02K 49/108* (2013.01); *H02N 15/00* (2013.01); *C25B 1/04* (2013.01); *F02B 43/10* (2013.01); *F02B 2043/106* (2013.01); *F02M 21/0209* (2013.01); *F02M 21/0239* (2013.01); *H02J 3/32* (2013.01); *H02J 7/007* (2013.01); *H02J 7/143* (2020.01); *H02K 7/025* (2013.01); *Y02E 10/20* (2013.01); *Y02E 70/30* (2013.01)

(58) Field of Classification Search
CPC .......... H02J 7/14; H02J 7/1415; H02J 7/1423; H02J 7/143; H02J 7/32
See application file for complete search history.

(56) References Cited

U.S. PATENT DOCUMENTS

| | | |
|---|---|---|
| 3,526,795 A | 9/1970 | Pecs |
| 4,211,452 A | 7/1980 | Poubeau |
| 4,677,365 A | 6/1987 | Yang |
| 5,563,802 A | 10/1996 | Plahn et al. |
| 5,690,519 A | 11/1997 | Chen |
| 6,114,775 A | 9/2000 | Chung et al. |
| 6,188,139 B1 | 2/2001 | Thaxton et al. |
| 6,236,127 B1 | 5/2001 | Bornemann |
| 6,611,068 B2 | 8/2003 | Cratty |
| 6,770,995 B1 | 8/2004 | Foshage |
| 6,803,679 B1 | 10/2004 | Luo et al. |
| 6,931,856 B2 | 8/2005 | Belokon et al. |
| 8,039,983 B2 | 10/2011 | Cote et al. |
| 8,049,358 B2 | 11/2011 | Crane et al. |
| 8,907,520 B2 | 12/2014 | Chapel et al. |
| 9,742,331 B2 | 8/2017 | Liang et al. |
| 9,751,625 B2 | 9/2017 | Phan et al. |
| 10,208,755 B2 | 2/2019 | Semple et al. |
| 10,389,121 B1 | 8/2019 | Sherry |
| 10,541,597 B2 | 1/2020 | Whitfield et al. |
| 2002/0175660 A1 | 11/2002 | King et al. |
| 2004/0051507 A1 | 3/2004 | Gabrys et al. |
| 2006/0091748 A1 | 5/2006 | Yoda et al. |
| 2008/0047391 A1 | 2/2008 | Bissell |
| 2010/0270883 A1* | 10/2010 | Teoh ............... H02K 53/00 310/113 |
| 2011/0316377 A1 | 12/2011 | Warmenhoven |
| 2012/0083173 A1 | 4/2012 | McMillan |
| 2012/0280518 A1 | 11/2012 | Woods et al. |
| 2013/0234653 A1 | 9/2013 | Botts |
| 2014/0184153 A1 | 7/2014 | Saint-Leger et al. |
| 2015/0097432 A1 | 4/2015 | Gurin et al. |
| 2015/0188400 A1 | 7/2015 | Kemp et al. |
| 2016/0241029 A1 | 8/2016 | Hodrinsky et al. |
| 2016/0352131 A1 | 12/2016 | Nelson et al. |
| 2017/0063150 A1 | 3/2017 | Sakamoto et al. |
| 2017/0085141 A1 | 3/2017 | Wang et al. |
| 2017/0294691 A1 | 10/2017 | Yamamoto et al. |
| 2018/0009329 A1 | 1/2018 | Tellez |
| 2018/0357577 A1 | 12/2018 | ElBsat et al. |
| 2019/0229542 A1 | 7/2019 | Dunn et al. |
| 2020/0063706 A1 | 2/2020 | Park |
| 2021/0184539 A1 | 6/2021 | Ashley |

OTHER PUBLICATIONS

"Deep Blue Hybrid", https://www.torqeedo.com/us/en-us/products/hybrid-drives, accessed Oct. 21, 2020.
Non-Final Office Action issued in U.S. Appl. No. 16/925,071 dated Sep. 29, 2020, 15 pages.
Non-Final Office Action issued in U.S. Appl. No. 16/944,782 dated Sep. 28, 2021.
Non-Final Office Action issued in U.S. Appl. No. 17/158,831 dated Mar. 29, 2022.
Notice of Allowance and Fees Due issued in U.S. Appl. No. 16/944,782 dated Apr. 13, 2022.
PCT Search Report and Written Opinion issued in PCT/US2020/046453 dated Oct. 21, 2020, 12 pages.
Notice of Acceptance issued in Australian Patent Application No. 2020373245 dated Oct. 4, 2023.
Examination report No. 1 issued in Australian Patent No. 2020373245 dated Dec. 6, 2022.
Examination report No. 2 issued in Australian Patent No. 2020373245 dated Jul. 27, 2023.

* cited by examiner

MECHANICAL RENEWABLE GREEN ENERGY PRODUCTION

CROSS-REFERENCE TO RELATED APPLICATION

The present application is a 371 application of PCT/US2020/046453 filed Aug. 14, 2020, which claims the benefit of and priority to U.S. patent application Ser. No. 16/925,071, filed on Jul. 9, 2020, which claims the benefit and priority to U.S. Provisional Patent Application Ser. No. 63/027,204, filed on May 19, 2020 and U.S. Provisional Patent Application Ser. No. 62/929,562, filed on Nov. 1, 2019, and U.S. patent application Ser. No. 16/735,502, filed on Jan. 6, 2020 which claims the benefit of and priority to U.S. Provisional Patent Application Ser. No. 62/929,562, filed on Nov. 1, 2019, the entire content of each of which is hereby incorporated by reference herein.

TECHNICAL FIELD

The present disclosure relates generally renewable energy devices, and in particular, mechanical renewable energy generation and storage devices.

BACKGROUND

Renewable energy generation, or green energy generation, has become an increasingly important source of electrical energy generation many countries around the world. As the demand for electrical energy has increased, the availability of fossil fuels has been strained, and the impact of using fossil fuels on the environment has been highlights. In an effort to overcome these obstacles, advancements in green energy generation has continued to accelerate, resulting in innovations such as hydrodynamic generators, wind turbines, geothermal energy, biomass energy, amongst others. However, mechanical energy generation, despite its simplicity, has historically remained rather inefficient. In particular, as a load is placed upon the system, the mechanical device driving electrical generators loses momentum, resulting in a drop in electrical energy generation. To avoid this decrease in electrical energy generation, it is necessary to input additional energy to maintain consistency and therefore, provide consistent electrical energy generation. As can be appreciated, the constant increase or decrease in energy required to maintain constant electrical energy generation using the mechanical device is inefficient and wasteful.

SUMMARY

The present disclosure relates to a renewable energy generation system including a drive motor, a flywheel in mechanical communication with the drive motor, wherein the drive motor effectuates a rotation of the flywheel to generate stored rotation energy, a generator in mechanical communication with the flywheel, wherein the rotational energy of the flywheel is transferred to the generator as a load is placed upon the generator, thereby maintaining a constant speed of the drive motor, a charge controller in electrical communication with the generator, a plurality of charge controller switches in electrical communication with the charge controller, a plurality of batteries, each battery of the plurality of batteries in electrical communication with a respective charge controller switch of the plurality of charge controller switches, and a power management module in electrical communication with the plurality of charge controller switches, the power management module selectively opening or closing one or more of the plurality of charge controller switches to permit or inhibit the flow of electrical energy to respective batteries of the plurality of batteries, thereby reducing the electrical load placed upon the generator, and therefore, the load placed upon the drive motor.

In aspects, the renewable energy generation system may include a plurality of generators, each being in mechanical communication with the flywheel and being in electrical communication with the charge controller.

In certain aspects, the renewable energy generation system may include a plurality of discharge controllers. Each discharge controller of the plurality of discharge controllers is in electrical communication with a respective battery of the plurality of batteries and in electrical communication with the power management module. The power management module selectively opens or closes one or more of the plurality of discharge controller switches to permit or inhibit the flow of electrical energy from respective batteries of the plurality of batteries, thereby reducing the electrical load placed upon the generator, and therefore, the load placed upon the drive motor.

In other aspects, the drive motor may be an electric motor.

In certain aspects, the drive motor may be a pump.

In aspects, the flywheel may be a water wheel. The pump transports the fluid to the water wheel to effectuate rotation of the water wheel.

In other aspects, the drive motor may be a hydraulic motor or a pneumatic motor.

In aspects, the renewable energy generation system may include an electrical control box disposed on an exterior portion of the housing. The electrical control box defines an interior portion in which the charge controller, the plurality of charge controller switches, the plurality of batteries, and the power management module are disposed.

In certain aspects, a rectifier, a diode, and a speed controller are disposed within the electrical control box. The rectifier and the diode are in electrical communication with the generator and the speed controller is in electrical communication with the drive motor.

In aspects, the renewable energy generation system may include a first electrical control box for receiving electrical energy generated by the generator and defining an interior portion in which a speed controller is disposed, the speed controller being in electrical communication with the drive motor, and a second electrical control box in electrical communication with the first electrical control box and defining an interior portion in which a rectifier and a diode are disposed, wherein the rectifier and the diode are in electrical communication with the generator.

In accordance with another aspect of the present disclosure, a method of generating renewable electrical energy includes transmitting rotational energy from a drive motor to a flywheel to store rotational energy into the flywheel, transmitting rotational energy from the flywheel to a generator to generate electrical energy, wherein if an electrical load is placed upon the generator, the rotational energy stored in the flywheel is transferred to the generator to maintain a constant rotational speed of the drive motor, transmitting generated electrical energy from the generator to a charge controller in electrical communication with a plurality of charge controller switches, identifying a battery from a plurality of batteries having a power level greater than a first pre-determined threshold using a power management module in electrical communication with the plurality of charge controller switches, and opening a charge controller switch corresponding to the identified battery to permit the flow of electrical energy to the identified battery, thereby inhibiting a large instantaneous load from being placed upon the generator and drive motor and maintaining the constant rotational speed of the drive motor.

In aspects, the method may include converting alternating current generated by the generator to direct current using a rectifier in electrical communication with the generator to store the direct current electrical energy in the plurality of batteries.

In certain aspects, the method may include converting the direct current received from the plurality of batteries to alternating current using an inverter.

In other aspects, the method may include closing a discharge switch corresponding tot eh identified battery to inhibit discharging the identified battery.

In certain aspects, the method may include closing a battery bank bypass switch such that the electrical energy generated by the generator bypasses the plurality of batteries and inhibits electrical energy from being transmitted to the plurality of batteries.

In other aspects, the method may include converting a first portion of the direct current electrical energy transmitted from the plurality of batteries to alternating current using a first inverter.

In aspects, the method may include converting a second portion of the direct current electrical energy transmitted from the plurality of batteries to alternating current using a second inverter.

In certain aspects, the first portion of the direct current electrical energy may be converted into alternating current using a pure sign wave inverter.

In other aspects, the second portion of the direct current electrical energy may be converted into alternating current using a grid tie inverter.

In aspects, the method may include monitoring the plurality of generators using a computer module in electrical communication therewith and generating an alarm in response to a fault identified by the computer module.

BRIEF DESCRIPTION OF THE DRAWINGS

The accompanying drawings, which are incorporated in and constitute a part of this specification, illustrate embodiments of the disclosure and, together with a general description of the disclosure given above, and the detailed description of the embodiments given below, serve to explain the principles of the disclosure, wherein.

Figure 38:
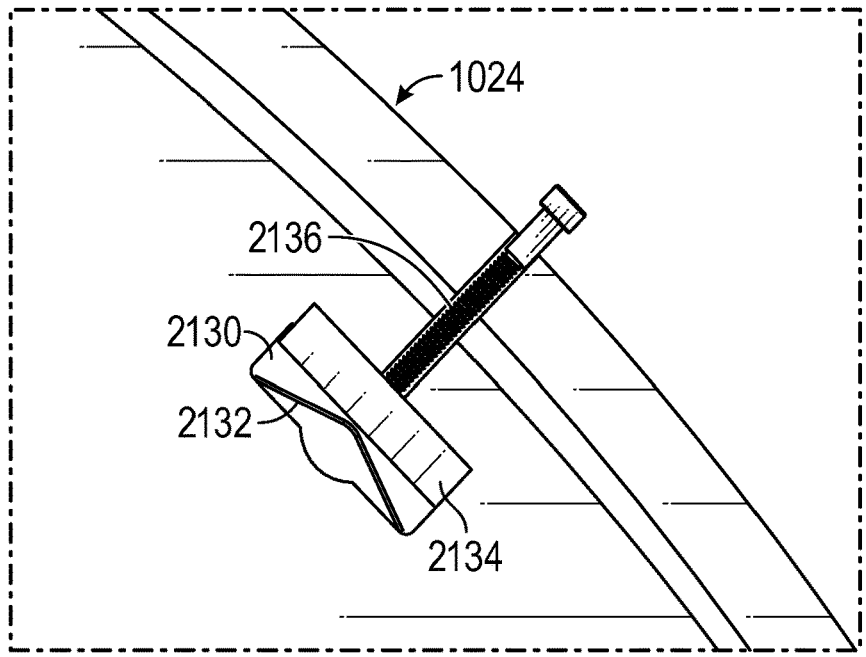
Figure 39:
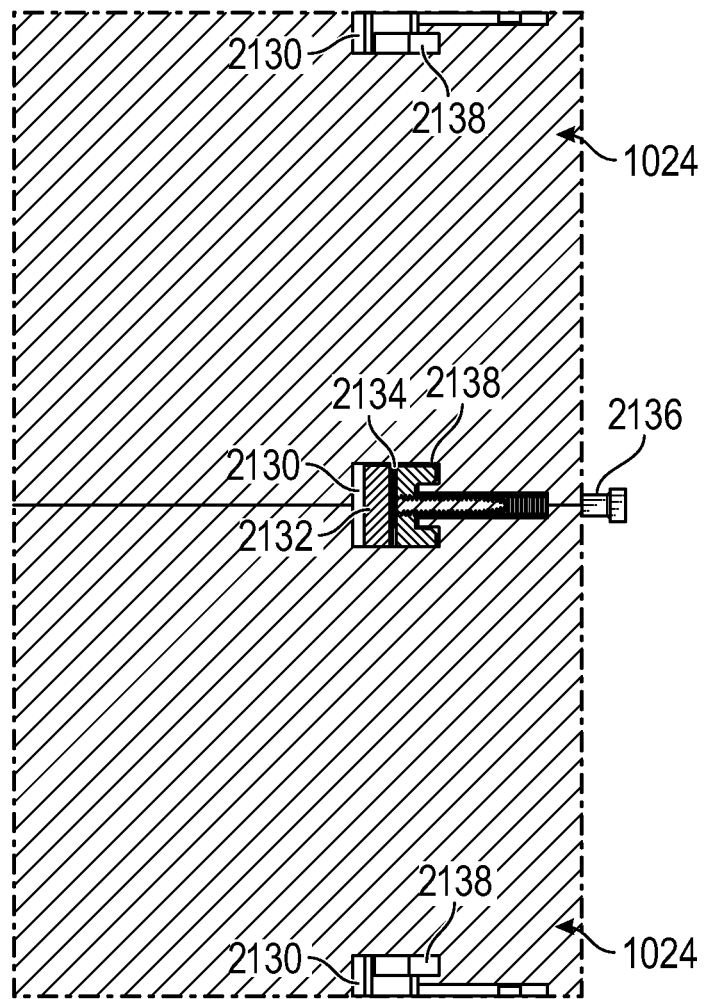
Figure 40:
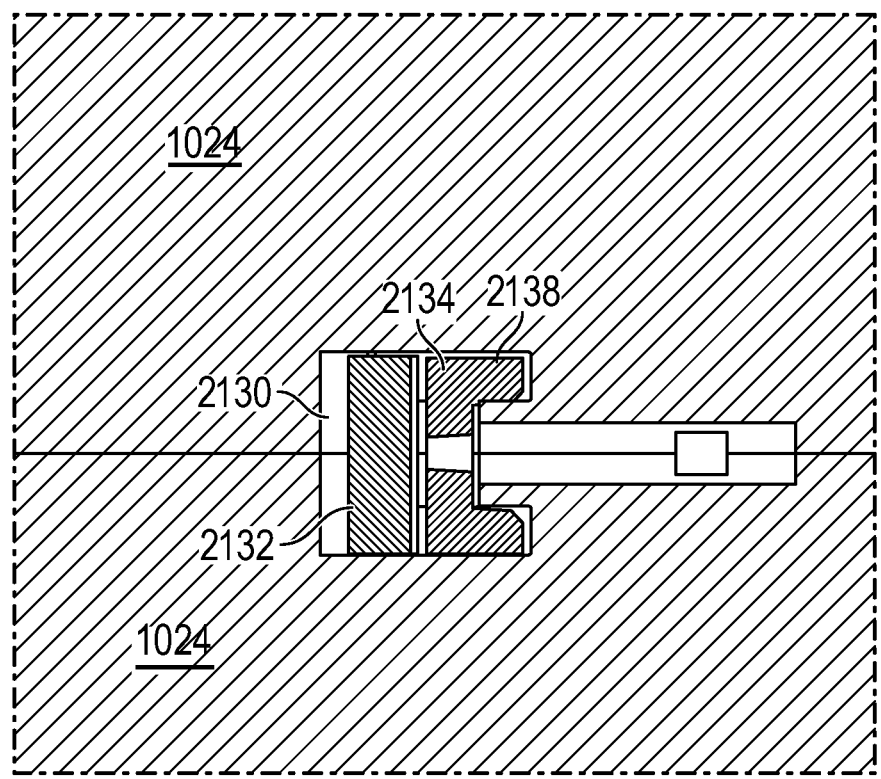
Figure 41:
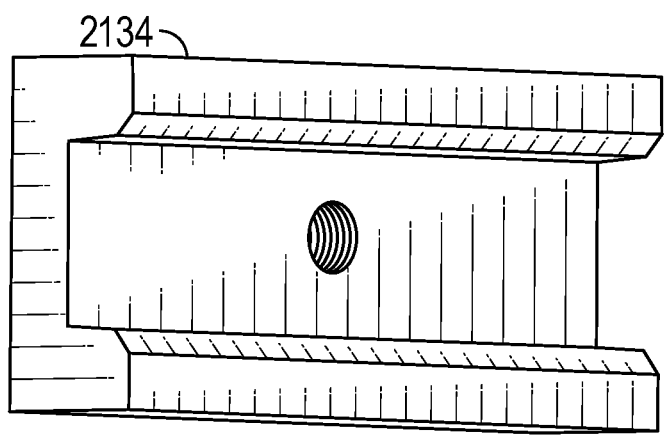

the disclosure;

FIG. 38 is a top view of a flywheel locking system and method in accordance with the disclosure;

FIG. 39 is a side view of a flywheel locking system and method in accordance with the disclosure;

FIG. 40 is an enlarged side view of a flywheel locking system and method in accordance with the disclosure; and FIG. 41 is a perspective view of a U-shaped clip in accordance with the disclosure.

DETAILED DESCRIPTION

The present disclosure is directed to renewable energy generation systems. As described herein, the renewable energy generation system includes a housing and an electrical control box. The housing defines an interior portion housing a drive motor, a plurality of drive gears, a flywheel, a plurality of generator gears, and a plurality of generators. As can be appreciated, the drive motor is in mechanical communication with the flywheel via the plurality of drive gears, such that rotation of an output shaft of the drive motor effectuates a corresponding rotation of the flywheel. It is envisioned that any of the gears described herein may be replaced with a belt and pully configuration. Similarly, the drive motor may be an electric motor, a pump, a hydraulic pump, a pneumatic pump or motor, or the like. In this manner, in the case where the drive motor is an electric motor, a hydraulic pump, or a pneumatic pump the flywheel may be a disc type flywheel. In the case where the drive motor is a pump, the flywheel may be a water wheel, tesla turbine, or the like.

As the flywheel is caused to be rotated, the flywheel stores rotational energy in the form of angular kinetic energy. The higher the rotational speed of the flywheel, the greater the amount of rotational energy is stored by the flywheel. The flywheel is in mechanical communication with the plurality of generators via the plurality of generator gears, such that rotation of the flywheel effectuates a corresponding rotation of the plurality of generators, which in turn, generate electrical energy. As can be appreciated, as load is placed upon the plurality of generators, the load is transferred to the drive motor, thereby causing the drive motor to reduce its rotational speed. To minimize the disruption to the drive motor, and to aid in maintaining a relatively constant rotational speed, the flywheel transfers its stored rotational energy to the plurality of generators to help maintain the rotational speed of both the plurality of generators and the drive motor, thereby reducing the amount of energy required for the renewable energy generation system to generate electrical energy, and increasing the efficiency thereof.

The electrical control box is selectively secured to an outer portion of the housing and defines an interior portion therein housing a computer module, wireless transmitter, a plurality of rectifiers, a plurality of diodes, a plurality of breakers, and a speed controller therein. An alternating current (AC) power source is supplied to the electrical control box which is in electrical communication with the motor speed controller and the computer module, such that the motor speed controller is permitted to monitor and manipulate the speed of the drive motor in response to various loads placed upon the drive motor and/or environmental conditions. The computer module is electrically coupled to the wireless transmitter such that the computer module may be wirelessly connected to a remote computer or user device. In this manner, a user may monitor or otherwise control the renewable energy generation system remotely.

Each of the plurality of generators is electrically coupled to a respective rectifier such that the AC electrical power generated by the plurality of generators is rectified to direct current (DC) electrical power, which is usable by a plurality of batteries. To inhibit electrical power from being returned to the rectifiers (e.g., only permitting flow of electrical energy away from the plurality of rectifiers, and therefore, inhibiting the flow of electrical energy towards the plurality of rectifiers). The DC electrical power is transmitted to a bus, where the DC electrical energy from each of the plurality of generators is combined, and to the computer module, where the voltage level of each of the plurality of generators is monitors. In this manner, the computer monitor identifies faults and generates messages and/or alarms which are wirelessly transmitted by the wireless transmitter to the remote computer and/or user device to alert the user of the fault.

The rectified and combined DC electrical energy is transmitted to a charge controller which monitors and regulates the rate at which DC electrical energy is permitted to be transmitted to, or be drawn by, the plurality of batteries. In the case where a plurality of batteries is utilized, the charge controller is in electrical communication with a plurality of charge controller switches, which enable, or inhibit, DC electrical energy to be transmitted to a respective battery. In this manner, the plurality of charge controller switches are in electrical communication with a power management module, which monitors the plurality of batteries and identifies which batteries have a power level above a minimum value, in which the flow of DC electrical energy is permitted to flow, and which batteries have a power level below a minimum value, in which the flow of DC electrical energy is inhibited from flowing. Additionally, the power management module is in electrical communication with a plurality of discharge controller switches, which in turn, is in electrical communication with the plurality of batteries. The power management module identifies which of the plurality of batteries are in condition to be discharged, or should be inhibited from being discharged. In this manner, the power management module compares the voltage of the plurality of batteries to a minimum value, where the identified battery or plurality of batteries is inhibited from being discharged, and to a maximum value, where the identified battery or plurality of batteries is permitted to be discharged. Power is permitted to flow to the batteries, if the charge controller senses that the power levels are below a set minimum charge level. Power discharges from the batteries, if the charge controller senses that the power levels are above a set maximum charge level. By this process, the renewable energy generation system is permitted to operate without subjecting the renewable energy generation system to instances where the drive motor is subjected to severe electrical loads, maintaining the load placed upon the drive motor as being relatively constant.

The DC electrical energy discharged from the plurality of batteries, and the DC electrical energy transmitted by the battery bank bypass switch in a case where the DC electrical energy from the plurality of generators bypasses the plurality of batteries, is transmitted to a pure sign wave inverter and a grid tie inverter. The pure sign wave inverter is electrically coupled to a local source that may be sensitive to power quality, such as a home, camp, recreational vehicle, etc. and the grid tie inverter is electrically coupled to the electrical grid. In this way, there is no direct load placed on the generators, which enables them to operate at a near constant speed, and improve efficiency for charging the batteries.

In embodiments, the renewable energy generation system may include a flywheel assembly. As described herein, the flywheel assembly includes a plurality of flywheel housings and a corresponding plurality of flywheels disposed within each respective housing that is simultaneously formed from the same component or material as the flywheel housing. Each flywheel is fixedly coupled to a flywheel shaft such that the flywheels and the flywheel shaft rotate in unison. In embodiments, the flywheel assembly may not include a flywheel shaft, and rather, each flywheel is selectively coupled to one another using a centering ring that is received within a corresponding annular grooved formed in upper and lower surfaces of each flywheel. In this embodiment, each flywheel is fixedly coupled using a plurality of tie bars arranged in a longitudinal manner that longitudinally fix each flywheel to one another.

The flywheel assembly includes a magnetic levitation disk having a plurality of magnets disposed thereon. In embodiments, the magnetic levitation disk may be entirely formed from a magnet and may include permanent or electromagnets. The magnetic levitation disk is fixedly coupled to the flywheel shaft and abuts a lower portion of a lower most flywheel such that the magnetic levitation disk rotates in unison with the flywheels and the flywheel shaft.

A magnetic coupling is fixedly coupled to the flywheel shaft and abuts an upper portion of an upper most flywheel. The magnetic coupling includes a plurality of torque magnets disposed on an upper surface thereof and forms a magnetic gear. In this manner, the plurality of torque magnets is arranged in an alternating manner such that a pole of each respective torque magnet of the plurality of torque magnets alternates in a north, south, north, south, etc. fashion.

A base plate includes an aperture defined at a center portion thereof that is configured to rotatably receive a lower portion of the flywheel shaft thereon. In embodiments where the flywheel assembly does not include a flywheel shaft, the aperture of the base plate is configured to rotatably receive a portion of the magnetic levitation disk therein. An upper portion of the base plate includes a plurality of magnets disposed therein having a polarity that is opposite to the magnets of the magnetic levitation disk such that the plurality of magnets of the base plate urge the plurality of magnets of the magnetic levitation disk, and therefore, the magnetic levitation disk itself, away from the base plate such that the magnetic levitation disk levitates or floats above the base plate. In this manner, the base plate constrains the flywheel shaft, magnetic levitation disk, flywheels, and magnetic coupling to one degree of freedom and forming a pseudo-levitation method of magnetic levitation to enable the flywheels to rotate in a near frictionless environment.

The flywheel assembly includes a vacuum plate that is disposed on an upper most flywheel housing to form a vacuum chamber therewithin. The vacuum plate is configured to rotatably receive a portion of the flywheel shaft, and in embodiments where the flywheel assembly does not include a flywheel shaft, a portion of the magnetic coupling, such that in cooperation with the aperture of the base plate, the flywheel shaft and flywheels are constrained to one degree of freedom. A vacuum pump is disposed on an upper portion of the vacuum plate and is in fluid communication with the chamber of the flywheel housing. In embodiments, the vacuum pump may be an ultra-high vacuum (UHV) pump, such as an ion pump, turbomolecular pump, etc. in instances where an UHV environment is required. As can be appreciated, the vacuum pump permits the flywheels to rotate within the cavity of the flywheel housing in a near zero friction environment, thereby increasing the efficiency of the flywheel assembly.

A motor coupling is rotatably supported on the vacuum plate and includes a plurality of torque magnets disposed thereon. The motor coupling is configured to operably engage a motor, generator, etc., such that rotation of a portion of the motor effectuates a corresponding rotation of the motor coupling. The plurality of torque magnets of the motor coupling is arranged an alternating manner such that a pole of each respective torque magnet of the plurality of torque magnets alternates in a north, south, north, south, etc. fashion, such that rotation of the motor coupling causes the plurality of torque magnets of the motor coupling to repel and attract the plurality of torque magnets of the magnetic coupling, thereby effectuating a corresponding rotation of the magnetic coupling.

In this manner, the magnetic coupling force between the plurality of torque magnets of the motor coupling and the plurality of torque magnets of the magnetic coupling acts as an axial-gap magnetic gear. In embodiments, the flywheel assembly may include a pair of magnetic gears rotatably supported on the vacuum plate and arranged in an axially aligned but spaced apart manner to define a gap therebetween. Each of the pair of magnetic gears includes a plurality of torque magnets arranged in an alternating fashion. A motor coupling magnetic gear may include a corresponding plurality of torque magnets arranged in an alternating fashion and disposed within the gap formed by the pair of magnetic gears, such that rotation of the motor coupling magnetic gear effectuates a corresponding rotation of the pair of magnetic gears.

It is contemplated that the flywheel assemblies may be arranged in a pod configuration (e.g., circular manner) defining a channel therebetween. In this manner, the flywheel pods include a single motor coupling disposed within the channel such that rotation of the motor coupling effectuates a corresponding rotation of the flywheels in each of the flywheel assemblies of the flywheel pod.

In accordance with the present disclosure, a variety of energy sources can be utilized including renewable resources such as solar, wind, and water power to provide the energy to drive the motor. Additionally or alternatively, the motor may be driven by an electrical connection to the public utility AC grid. Renewable options may be preferable for off-grid locations, however, a mixed input may also be employed using a combination of renewable and public utility grid connections. Where access to the public utility grid is available, the charge and discharge controllers may be configured to charge during evening and night hours when public utility rates are less, and discharge during daytime hours where public utilities are under a greater strain in order to prevent local brown outs of the public utility grid. The charge controller may nonetheless enable charging of the batteries during daylight hours, though limiting the input to that from the renewable sources to eliminate additional burden on the utility grid.

Embodiments of the present disclosure are now described in detail with reference to the drawings in which like reference numerals designate identical or corresponding elements in each of the several views. In the drawings and in the description that follows, terms such as front, rear, upper, lower, top, bottom, and similar directional terms are used simply for convenience of description and are not intended to limit the disclosure. In the following description, well-known functions or constructions are not described in detail to avoid obscuring the present disclosure in unnecessary detail.

Referring now to the drawings, a renewable energy generation system is illustrated and generally identified by reference numeral 10. As illustrated in FIGS. 1-8, the renewable energy generation system 10 includes a housing 12 and an electrical control box 100 selectively affixed to an outer portion thereof. The housing 12 and the electrical control box 100 both include ventilation ports 11 defined therein for encouraging airflow into and out of each to enhance cooling of the components disposed therein.

The housing 12 defines an interior portion 12a (FIG. 2) in which a drive motor 14, a plurality of drive gears 16, a flywheel 18, a plurality of generator gears 20 (FIG. 3), and a plurality of generators 22 are disposed. The drive motor 14 is an electric motor having a housing 14a and an output shaft 14b rotatably supported within the housing 14a. The housing 14a is rigidly secured to a portion of the housing 12 such that the housing 14a is inhibited from moving relative to the housing 12. The output shaft 14b is coupled to a drive shaft 24a such that rotation of the output shaft 14b effectuates a corresponding rotation of the drive shaft 24a. As can be appreciated, the output shaft 14b may be fixedly or selectively coupled to the drive shaft 24a using any suitable means, such as welding, adhesives, fasteners (rigid coupling, flexible coupling, etc.), amongst others. It is contemplated that the drive motor 14 may be any suitable electric motor capable of converting electrical energy into rotational energy, such as a brushed motor, a brushless motor, an alternating current (AC) motor, a direct current (DC) motor, etc.

The capacity of the drive motor 14 is selected based upon the anticipated maximum load of the renewable energy generation system 10 (e.g., peak load). As can be appreciated, when a direct load is placed upon the plurality of generators 22, the rotational speed of the drive motor 14 will be reduced. As such, when the drive motor 14 is subjected to a peak load, the drive motor 14 is caused to operate at a minimum rotational speed. However, if the load placed upon the drive motor 14 is kept to a minimum or low level, and load is maintained at a substantially constant level, the drive motor 14 may be effectively controlled to manage the power output transmitted to the plurality of generators 22, as will be described in further detail hereinbelow.

Figure 1:
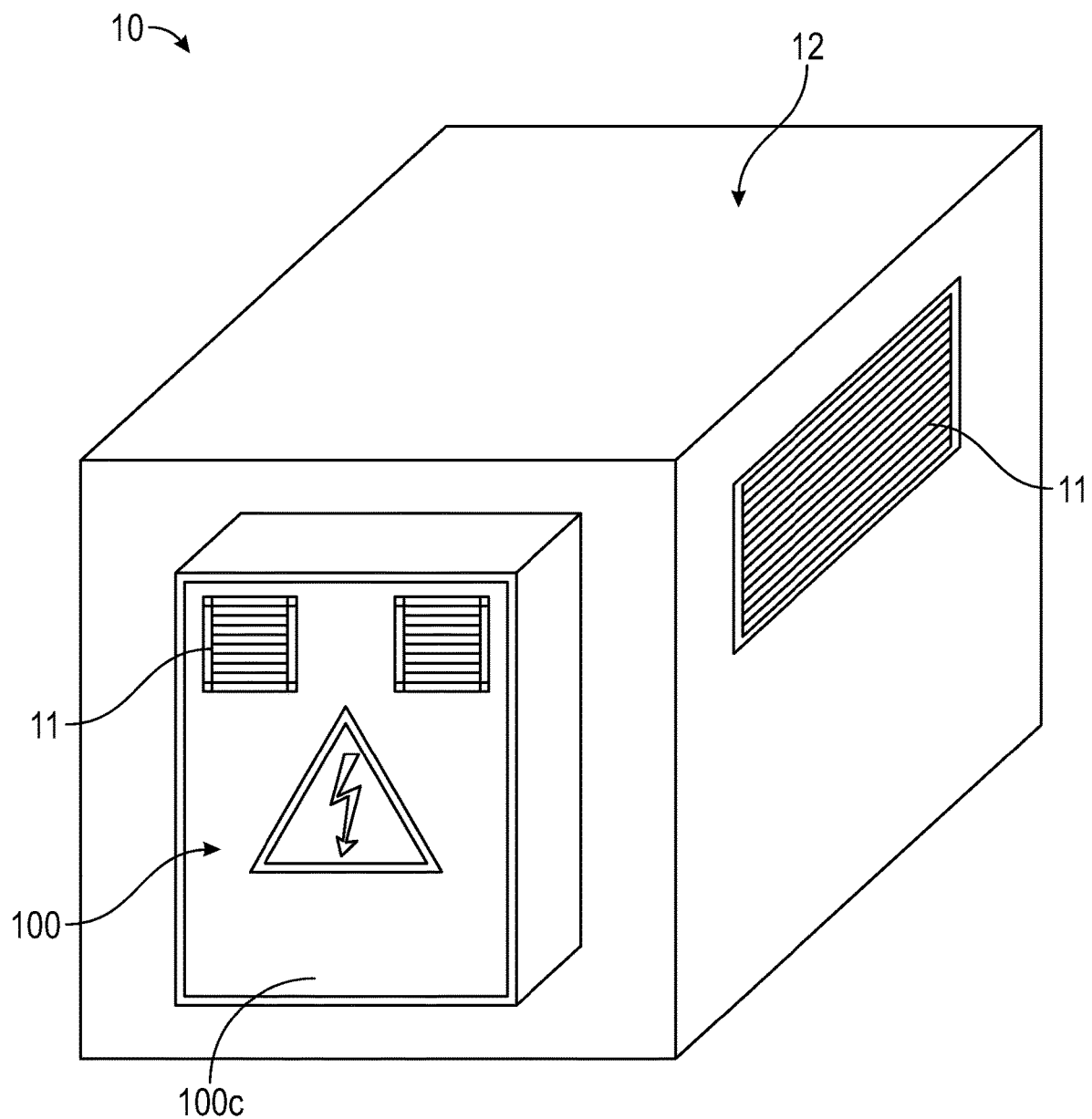
FIG. 1 is a perspective view of a renewable energy generation system provided in accordance with the present disclosure.
Figure 2:
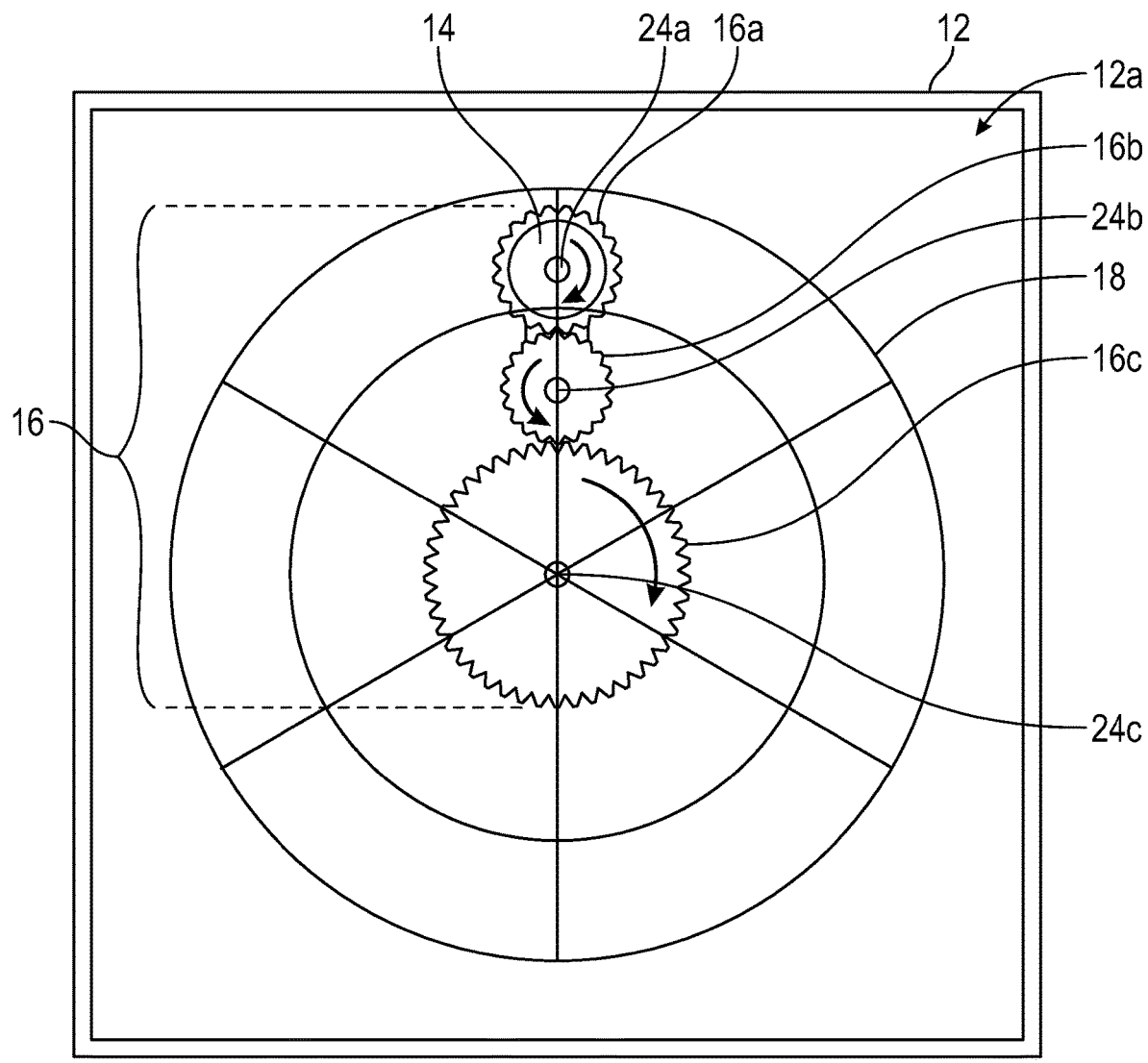
FIG. 2 is a front view of a renewable energy generation device of the renewable energy generation system of FIG. 1.

The plurality of drive gears 16 includes a pinion gear 16a, an idler gear 16b, and a spur gear 16c (FIG. 2). The pinion gear 16a is fixedly coupled (e.g., by welding, fasteners, adhesives, etc.) to the drive shaft 24a such that rotation of the output shaft 14b of the motor 14 effectuates a corresponding rotation of the drive shaft 24a and likewise, a corresponding rotation of the pinion gear 16a. The idler gear 16b is rotatably supported on an idler shaft 24b such that the idler gear 16b is permitted to rotate about the idler shaft 24b. In this manner, the idler shaft 24b is fixedly supported on a portion of the housing 12 using any suitable means, such as welding, adhesives, fasteners, amongst others. The idler gear 16b is meshingly engaged with the pinion gear 16a such that rotation of the pinion gear 16a effectuates a corresponding rotation of the idler gear 16b. The spur gear 16c is fixedly coupled to a flywheel shaft 24c using any suitable means, such as welding, adhesives, fasteners, amongst others. The flywheel shaft 24c is rotatably supported on a portion of the housing 12 by means of a ball bearing, bushing, etc., such that the flywheel shaft 24c is permitted to rotate relative to the housing 12. The spur gear 16a is meshingly engaged with the idler gear 16b such that rotation of the idler gear 16b effectuates a corresponding rotation of the spur gear 16c. It is contemplated that the plurality of drive gears 16 may be formed from any suitable material, such as a metallic material, a polymer, a composite, a ceramic, amongst others, and each of the pinion gear 16a, idler gear 16b, and spur gear 16c may be formed from the same or different materials.

The flywheel 18 is fixedly supported on the flywheel shaft 24c such that rotation of the flywheel shaft 24c effectuates a corresponding rotation of the flywheel 18. As can be appreciated, the flywheel 18 may be fixedly or selectively coupled to the flywheel shaft 24c using any suitable means, such as such as welding, adhesives, fasteners (rigid coupling, flexible coupling, etc.), amongst others. The flywheel 18 defines a generally cylindrical profile and may be formed from any suitable material, such as a metallic material, a polymer, a composite, a ceramic, amongst others. As the flywheel 18 is caused to be rotated, the flywheel 18 stores energy in the form of angular kinetic energy (rotational energy). In this manner, as the flywheel 18 gains rotational speed, the rotational energy of the flywheel 18 increases. As can be appreciated, the overall weight of the flywheel 18, the geometry of the flywheel 18 (outer diameter, thickness (constant or varying), etc.), and the rotational speed of the flywheel 18 cooperate to define the amount of rotational energy the flywheel 18 is able to store. Accordingly, the characteristics of the flywheel 18 can be varied depending upon the requirements of the renewable energy generation system 10. It is contemplated that the flywheel 18 may be disposed in the open air (exposed to the effects of aerodynamic drag) or may be disposed in a vacuum chamber (not shown) to reduce the drag effectuated on the flywheel 18 and therefore reducing the amount of electrical power required to maintain the rotational energy of the flywheel and thereby increasing the efficiency of the renewable energy generation system 10.

As can be appreciated, the rotational energy stored by the flywheel 18 is utilized to reduce the instantaneous load placed upon the drive motor 14 when a load is placed upon one or more of the plurality of generators 22. In this manner, the as a load placed upon the plurality of generators 22 is increased, the rotational energy of the flywheel 18 is transferred to the plurality of generators 22 to help maintain a substantially constant rotational speed of both the plurality of generators 22 and the drive motor 14. It is envisioned that a clutch or other decoupling device (not shown) may be utilized in conjunction with the flywheel 18 to selectively couple and decouple the flywheel 18 from one or both of the plurality of generators 22 or the drive motor 14. By decoupling the flywheel 18 from the drive motor 14 or the plurality of generators 22, the instantaneous load placed upon the drive motor 14 or the plurality of generators 22 can be metered out or more smoothly applied to ensure a relatively constant rotational speed of both the drive motor 14 and the plurality of generators 22.

Figure 4:
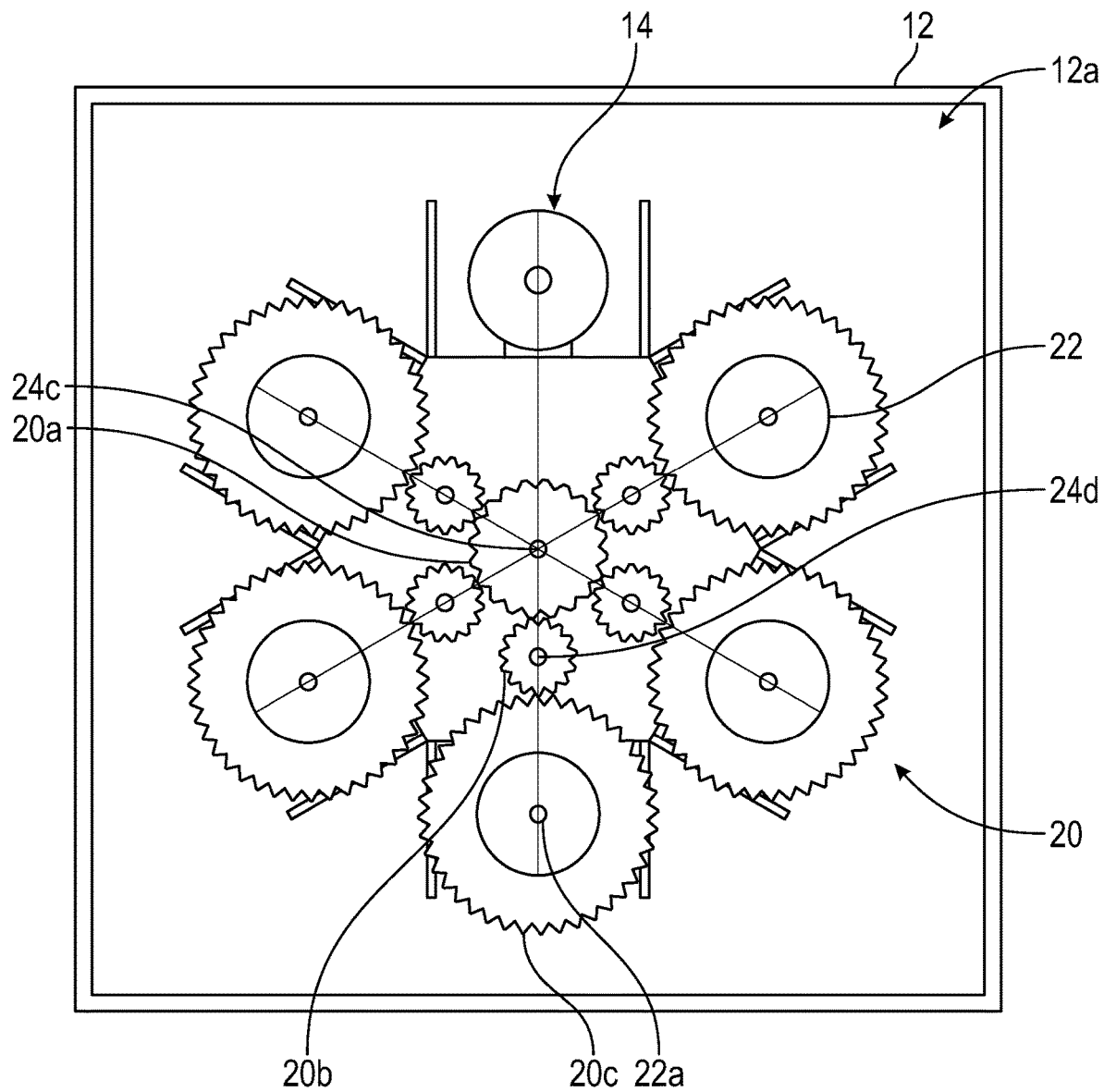
FIG. 4 is a front view of the renewable energy generation device of FIG. 2, showing a gear train coupling a drive motor to generators for the generation of electrical energy.

The plurality of generator gears 20 include a pinion gear 20*a*, an idler gear 20*b*, and a spur gear 20*c* (FIG. 4). As can be appreciated, each generator 22 includes a respective plurality of generator gears, and therefore, only one set of the plurality of generator gears 20 will be described in detail herein in the interest of brevity.

The pinion gear 20*a* of the plurality of generator gears 20 is fixedly coupled (e.g., by welding, fasteners, adhesives, etc.) to the flywheel shaft 24*c* such that rotation of the flywheel shaft 24*c* effectuates a corresponding rotation of the pinion gear 20*a*. The idler gear 20*b* is rotatably supported on an idler shaft 24*d* such that the idler gear 20*b* is permitted to rotate about the idler shaft 24*d*. In this manner, the idler shaft 24*d* is fixedly supported on a portion of the housing 12 using any suitable means, such as welding, adhesives, fasteners, amongst others. The idler gear 20*b* is meshingly engaged with the pinion gear 20*a* such that rotation of the pinion gear 20*a* effectuates a corresponding rotation of the idler gear 20*b*. The spur gear 20*c* is fixedly coupled to an output shaft 22*a* (FIG. 3) of a corresponding generator of the plurality of generators 22 using any suitable means, such as welding, adhesives, fasteners, amongst others. As can be appreciated, rotation of the spur gear 20*c* effectuates a corresponding rotation of the spur gear 20*c*, thereby causing the output shaft 22*a* of the generator 22 to rotate and cause the generation of electrical energy, as will be described in further detail hereinbelow.

Figure 3:
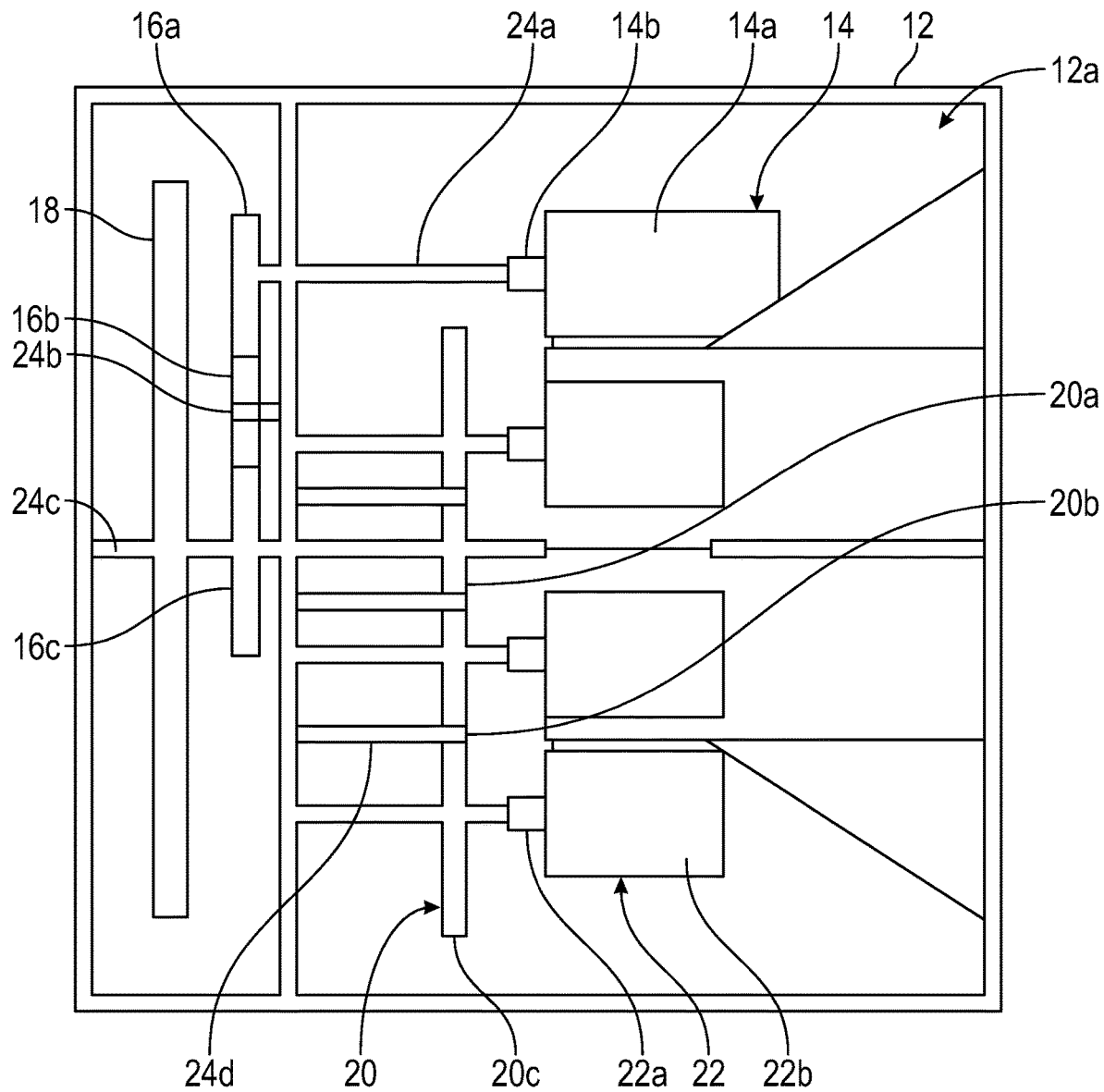
FIG. 3 is a side view of the renewable energy generation device of FIG. 2.

With reference to FIGS. 3 and 4, each generator of the plurality of generators 22 is substantially similar, and therefore, only one generator of the plurality of generators 22 will be described herein in the interest of brevity. The generator 22 is rigidly coupled to a portion of the housing 12 using any suitable means, such as welding, adhesives, fasteners, amongst others. In this manner, the generator 22 includes an outer housing 22*b* and an output shaft 22*a* rotatably supported within the outer housing 22*b* using any suitable means, such as ball bearings, bushings, fluid bearing, etc. Although generally described herein as an induction generator, it is contemplated that the generator 22 may be any suitable generator capable of generating electrical energy may be utilized herein. As can be appreciated, rotation of the output shaft 22*a* within the housing 22*b* produces electrical energy, which may be harvested or utilized in any number ways, as will be described in further detail hereinbelow.

It is contemplated that the renewable energy generation system 10 may include one generator 22 or a plurality of generators 22, depending upon the design needs of the system 10. As can be appreciated, for applications requiring a small amount of electrical energy, fewer generators 22 will be utilized and for applications requiring a large amount of electrical energy, more generators 22 will be utilized. In this manner, it is contemplated that the size of the drive motor 14 and/or the plurality of generators 22 may be varied depending upon the required electrical load. It is envisioned that each of the plurality of generators 22 may be the same size or may be different sizes depending upon the required electrical load, such as being sequentially smaller in capacity.

As illustrated in FIG. 4, it is contemplated that the plurality of generators 22 may be arranged in any suitable pattern relative to one another. In this manner, it is envisioned that the plurality of generators 22 may be arranged in a circular pattern about the flywheel shaft 24*c*, a hexagonal pattern, etc. such that each generator of the plurality of generators 22 is disposed substantially the same distance from one another. As can be appreciated, by spacing the plurality of generators 22 in this manner, the system 10 may be more easily balanced and the design and placement of the plurality of drive gears 16, flywheel 18, and plurality of generator gears 20 may be simplified, reducing the number of required components.

It will be appreciated that for a given installation various gear ratios can be employed to increase or decrease rpm of the various gear driven components as well as power and torque, thus increasing the power and speed of the energy supplied to the generators. These gear ratios may vary from generator to generator as various loads may arise to each generator. In some embodiments with multiple generators, one or more the generators may employ a high gear ratio some a low gear ratio to account for load factors as more generators are added to the system.

Figure 5:
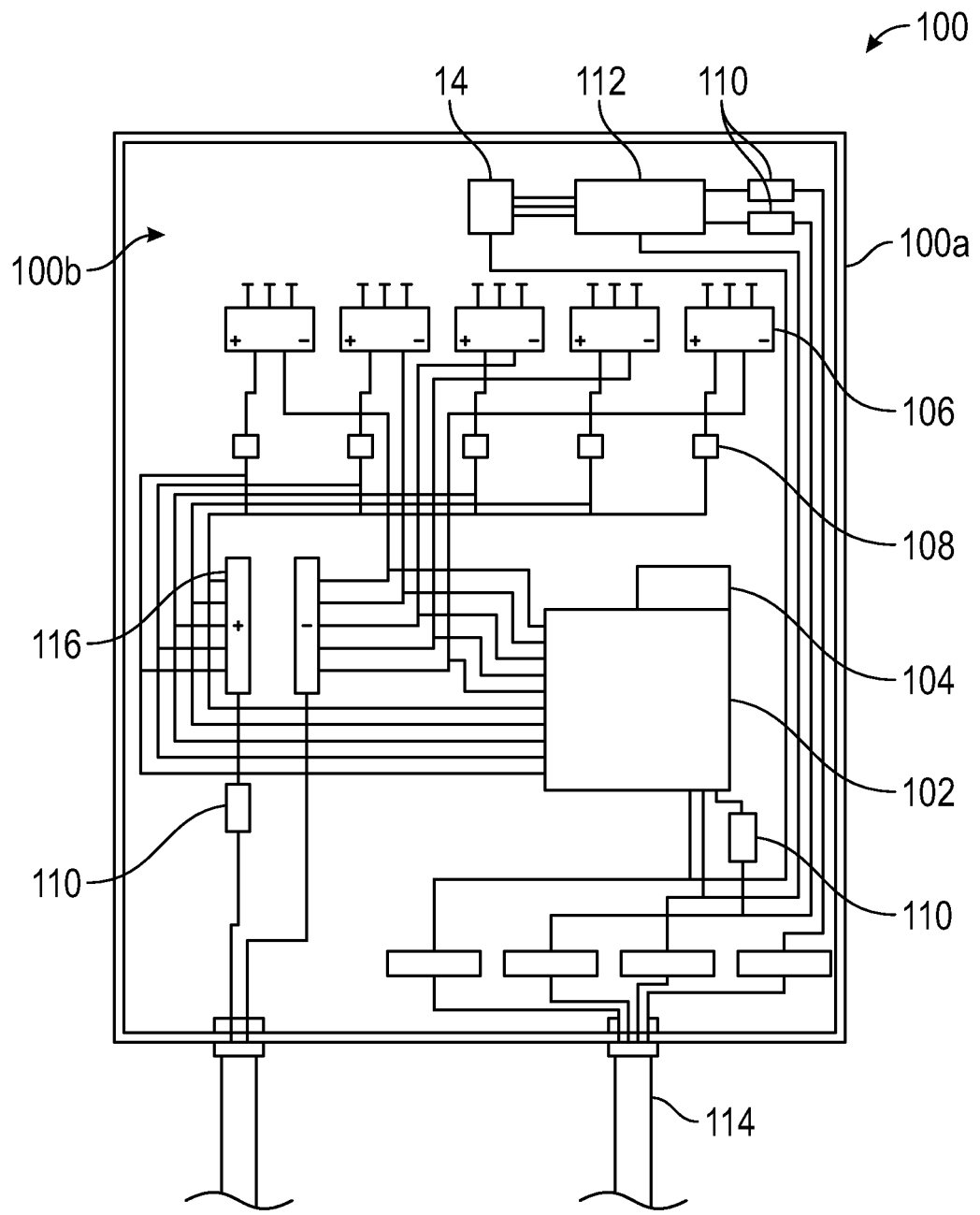
FIG. 5 is a schematic view of an electrical circuit of the renewable energy generation device of FIG. 2 showing AC input power and DC output power.

With reference to FIG. 5, the electrical control box 100 for use with the renewable energy generation system 10 is illustrated. The electrical control box 100 may be any suitable electrical control box capable of being used in either indoor or outdoor locations, depending upon the design needs of the renewable energy generation system 10. The electrical control box 100 includes an outer housing 100*a* defining an interior portion 100*b* therein. The outer housing 100*a* of the electrical control box 100 includes a door 100*c* (FIG. 1) hingedly coupled to the outer housing 100*a* such that the interior portion 100*b* may be accessed. In embodiments, it is contemplated that the door 100*c* may be removably coupled to a portion or portions of the outer housing 100*a*.

The electrical control box 100 includes a plurality of electrical components disposed therein and mechanically coupled thereto using any suitable means, such as an electrical sub-plate, DIN-rail, amongst others. As illustrated in FIG. 5, the electrical control box 100 includes a computer module 102, a wireless (WiFi) transmitter 104, a plurality of rectifiers 106, a plurality of diodes 108, a plurality of breakers 110, and a speed controller 112.

An Alternating Current (AC) power source 114 is supplied to the electrical control box 100 from any suitable AC source, such as a generator, AC mains, a service meter, amongst others. The AC power source 114 is in electrical communication with the motor speed controller 112. In this manner, the motor speed controller 112 is in electrical communication with the drive motor 14 such that the motor speed controller 112 is permitted to control the speed of the drive motor 14 in response to various loads placed on the drive motor 14 and/or environmental conditions, as will be described in further detail hereinbelow.

Figure 8:
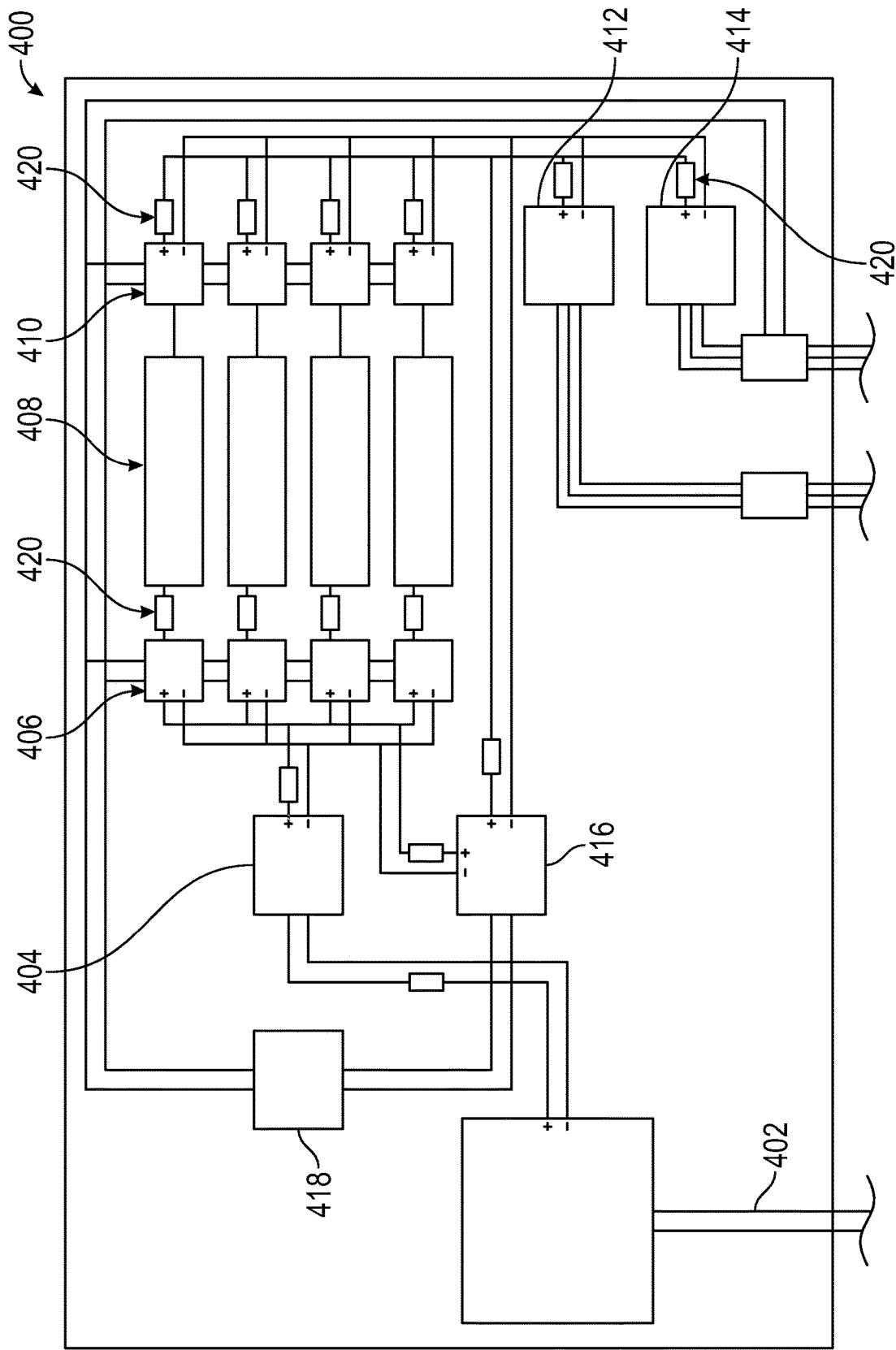
FIG. 8 is a schematic view of an electrical circuit of the renewable energy generation device of FIG. 2 for controlling where the generated energy is transferred

Each generator of the plurality of generators 22 is electrically coupled to a respective rectifier of the plurality of rectifiers 106. In this manner, the alternating current (AC) electrical energy generated by each generator of the plurality of generators 22 is transmitted to each respective rectifier of the plurality of rectifiers 106 such that the electrical energy may be rectified into direct current (DC) electrical energy that is usable by a plurality of batteries 408 (FIG. 8). The positive terminal of each rectifier of the plurality of rectifiers 106 is electrically coupled to a respective diode of the plurality of diodes 108 to inhibit the flow of electrical energy back towards the plurality of rectifiers 106. From the plurality of diodes 108 and the plurality of rectifiers 106, the DC electrical energy is transmitted to both the computer module 102 for monitoring and through an electrical breaker of the plurality of breakers 110 to be transmitted to the plurality of batteries 408. In this manner, the DC electrical energy from each respective generator of the plurality of generators 22 is individually fed to the computer module 102, such that the computer module 102 is permitted to monitor each generator of the plurality of generators 102 for faults, as will be described in further detail hereinbelow. Additionally, the DC electrical energy from each respective generator of the plurality of generators 22 is combined at a bus 116, and thereafter, the combined DC electrical energy is transmitted out of the electrical control box 100 and to the plurality of batteries 408.

Continuing with FIG. 5, the computer module 102 includes a processor (not shown) and a memory (not shown), such as a non-transitory storage medium, that is electrically coupled to the processor. The memory stores a software application and a plurality of voltage thresholds, such that when the software application is executed by the processor, the computer module 102 monitors the voltage levels of each generator of the plurality of generators 22 to identify faults. Specifically, if any the voltage level of a particular generator of the plurality of generators 22 falls below a pre-programmed voltage threshold, the computer module 102 generates an alarm and/or a message to alert a user that a fault exists with that particular generator. It is envisioned that the computer module 102 may generate alarms and/or messages for as many of the plurality of generators 22 that encounter a fault. It is envisioned that the memory can store any number of identifying events for generating alarms and/or messages, depending upon the design needs of the renewable energy generation system 10.

The wireless transmitter 104 may be any suitable wireless transmitter capable of wirelessly transmitting communication data to a remote computer or user device (not shown), such as a WiFi transmitter conforming to IEEE standards or any other suitable wireless protocol. The wireless transmitter 104 is in electrical communication with the computer module 102, such that information pertaining to the operation of the renewable energy generation system 10 that is collected by the processor may be wirelessly transmitted by the wireless transmitter 104 to the remote computer or user device. In this manner, alarms and/or messages generated by the processor of the computer module 102 are wirelessly transmitted by the wireless transmitter 104 and received by the computer or user device to alert a user to a fault in the renewable energy generation system 10.

The wireless transmitter 104 is further utilized to receive instructions from the remote computer or user device (not shown) to wireless control the rotational speed of the drive motor 14. In this manner, the user enters commands in the remote computer or user device which are wireless transmitted to the wireless transmitter 104. The instructions received by the wireless transmitter 104 are transmitted to the computer module 102, which in turn, instructs the speed controller 112 to increase or decrease the rotational speed of the drive motor 14.

Figure 6:
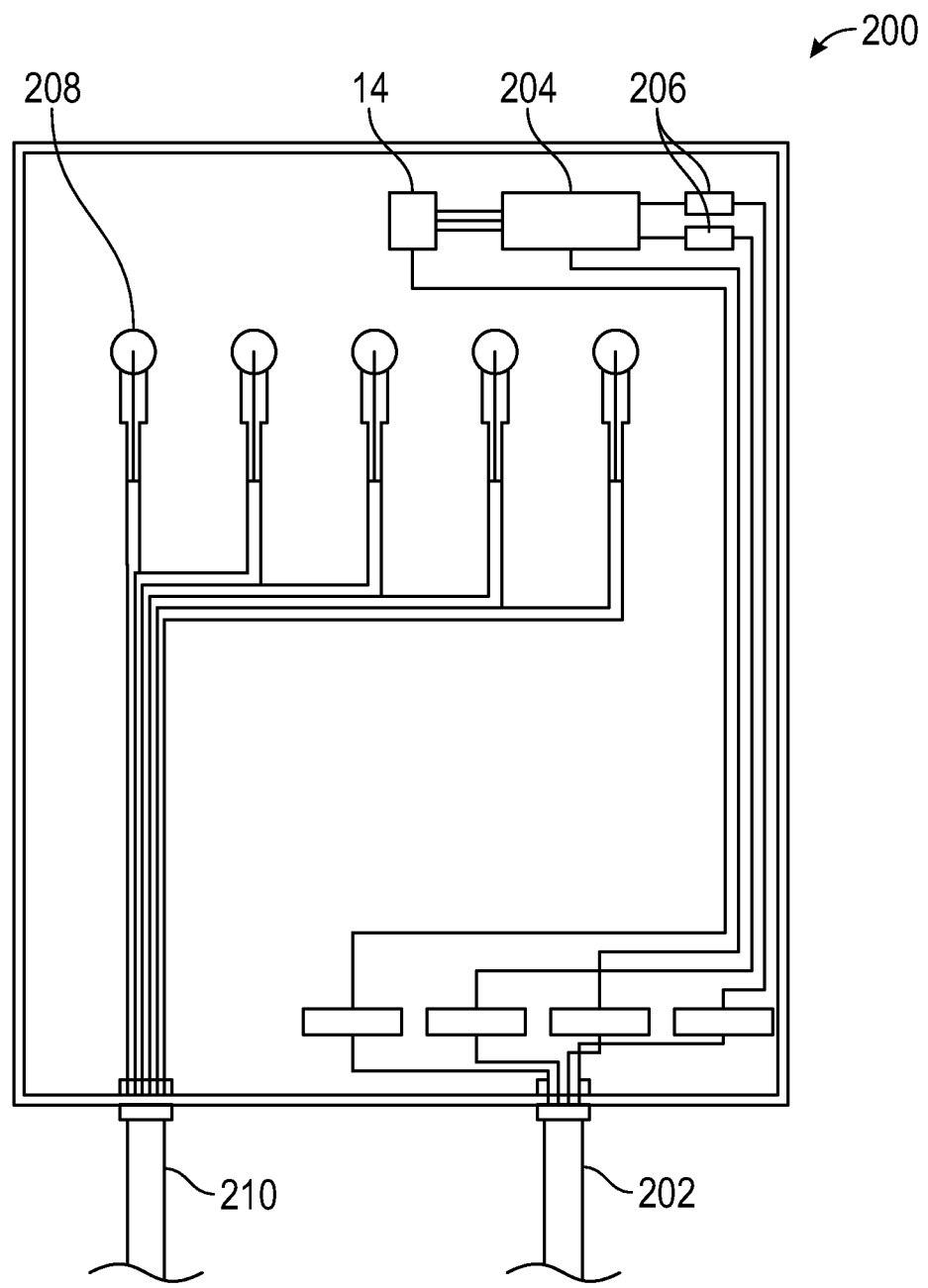
FIG. 6 is a schematic view of another embodiment of an electrical circuit of the renewable energy generation device of FIG. 2 showing AC input and output power.
Figure 7:
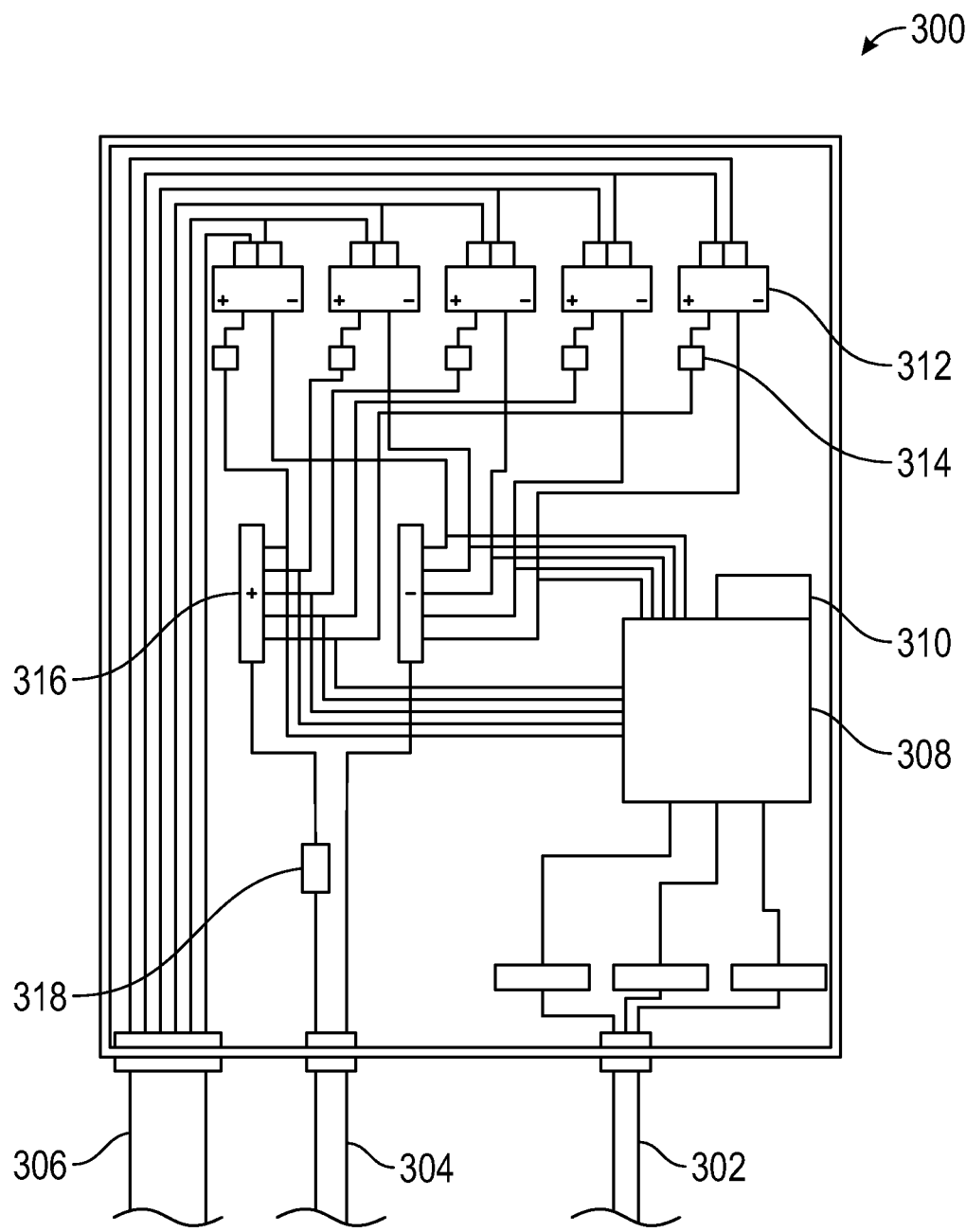
FIG. 7 is a schematic view of yet another embodiment of an electrical circuit of the renewable energy generation device of FIG. 2 showing AC input power, DC output power, and AC power received from the generators of FIG. 4.

As can be appreciated, DC electrical power is not particularly suited for transmission over long distances. Therefore, it is contemplated that the electrical control box 100 is intended for use in situations where the plurality of batteries 408 (FIG. 8) is located a relatively short distance away from the plurality of electrical generators 22. In instances where the electrical energy generated by the plurality of generators 22 is intended to be transmitted over a relatively long distance, such as when the plurality of batteries 408 is located a relatively long distance from the plurality of generators 22, the renewable energy generation system 10 may include two electrical control boxes 200 and 300, splitting the components disposed within the electrical control box 100 therebetween. As illustrated in FIGS. 6 and 7, the renewable energy generation system 10 may include a first electrical control box 200 and a second electrical control box 300. The first electrical control box 200 includes an AC power source 202, a speed controller 204, a plurality of breakers 206, a plurality of generator connectors 208, and an AC outlet 210. The AC power source 202 is supplied to the electrical control box 200 from any suitable AC source, such as a generator, a battery bank, a service meter, amongst others, and is in electrical communication with the speed controller 204, which in turn, is in electrical communication with the drive motor 14. Operation of the speed controller 204 is substantially similar to that of the speed controller 112, and therefore, will not be described in detail herein in the interest of brevity. The plurality of breakers 206 are electrically coupled to the speed controller 204 to protect the speed controller from damage caused by power spikes from the AC source or from situations where the speed controller 204 is caused to draw more power than is permitted by its design.

Each generator connector of the plurality of generator connectors 208 is electrically coupled to a respective generator of the plurality of generators 22 such that AC electrical energy generated by the plurality of generators 22 may be transmitted from the electrical control box 200 to the electrical control box 300 via the AC outlet 210. In this manner, the wires or cables associated with each generator connector of the plurality of generator connectors 208 is kept separate from one another (e.g., not combined on a bus), such that the AC electrical energy associated with each may be individually monitored, as will be described in detail hereinbelow. As can be appreciated, by not rectifying the AC electrical energy generated by the plurality of generators 22, the AC electrical energy is able to be transmitted over a longer distance as compared to DC electrical energy while using a similarly sized AC outlet 210 (e.g., the wire size required to maintain a particular power level is lower than is required by DC electrical energy).

The second electrical control box 300 includes an AC inlet 302, a DC outlet 304, an AC generator power inlet 306, a computer module 308, a wireless (WiFi) transmitter 310, a plurality of rectifiers 312, a plurality of diodes 314, a bus 316 and a breaker 318. An AC power source is supplied to the AC inlet 302 from any suitable AC source, such as a generator, a battery bank, a service meter, amongst others and is in electrical communication with the computer module 308. The computer module 308 and the wireless transmitter 310 are substantially similar to the computer module 102 and the wireless transmitter 104 of the electrical control box 100, and therefore, will not be described in detail herein in the interest of brevity.

The AC generator power inlet 306 is in electrical communication with the AC outlet of the first electrical control box 200, such that the AC electrical energy generated by the plurality of generators 22 is received by the plurality of rectifiers 312. The positive terminal of each of the rectifiers of the plurality of rectifiers 312 is electrically coupled to a respective diode of the plurality of diodes 314 to inhibit the flow of electrical energy back towards the plurality of rectifiers 312. The rectified DC electrical energy from each rectifier of the plurality of rectifiers 312 and each diode of the plurality of diodes 314 is transmitted to both the computer module 308 for monitoring and through the electrical breaker 318 to be transmitted to the plurality of batteries 408. In this manner, the DC electrical energy from each respective generator of the plurality of generators 22 is individually fed to the computer module 308, such that the computer module 308 is permitted to monitor each generator of the plurality of generators 22 for faults. Additionally, the DC electrical energy from each respective generator of the plurality of generators 22 is combined at a bus 316, and thereafter, the combined DC electrical energy is transmitted out of the second electrical control box 300 via the DC outlet 304 and to the plurality of batteries 408.

Turning to FIG. 8, a battery bank control box is illustrated and generally identified as reference number 400. The battery bank control box 400 includes a DC input 402, a charger controller 404, a plurality of charge controller switches 406, a plurality of batteries 408, a plurality of discharge controller switches 410, first inverter 412, a second inverters 414, a battery bank bypass switch 416, a power management module 418, and a plurality of breakers 420.

The DC input 402 is electrically coupled to the DC outlet 304 of the second electrical control box 300 such that the DC electrical energy generated by the plurality of generators 22 is transmitted to the charge controller 404. The charge controller 404 is any suitable charge controller capable of monitoring and regulating the rate at which DC is permitted to transmit to, or be drawn by, the plurality of batteries 408. In this manner, the charge controller 404 inhibits overcharging the plurality of batteries 408 and ensures the plurality of batteries 408 are inhibited from being completely discharged.

Each charge controller switch of the plurality of charge controller switches 406 is in electrical communication with the charge controller 404 at a first portion and in electrical communication with a respective battery of the plurality of batteries 408 at a second portion. Additionally, the power management module 418 is in electrical communication with each charge controller switch of the plurality of charge controller switches 406 and the battery bank bypass switch 416. The power management module 418 controls the operation of the plurality of charge controller switches 406 and the battery bank bypass switch 416. In this manner, the power management module 418 identifies a battery of the plurality of batteries 408 which is not fully charged as well as not being utilized to provide DC electrical power to one of the first or second inverters 412, 414. To identify a battery of the plurality of batteries 408 that is not fully charged, the computer system compares the voltage of each battery of the plurality of batteries 408 to pre-programmed values stored on the memory of the computer system. It is contemplated that the pre-programmed values can be altered depending upon the needs of the renewable energy generation system 10 such as a low voltage value indicative that the battery needs to be charged, and a high voltage value indicative that the battery is near capacity and charging should be terminated. In one non-limiting embodiment, the low voltage value is 20% of battery capacity and the high voltage value is 95% of battery capacity. As can be appreciated, the percentage value of capacity will vary depending upon the type of battery being utilized.

Similarly, discharge controller switches 410 are utilized to identify a battery of the plurality of batteries 408 that are in condition to be discharged or should be inhibited from being discharged. In this manner, the power management module 418 compares the voltage of the plurality of batteries to the pre-programmed values stored on the memory of the computer system. It is contemplated that the power management module 418 may permit discharging of a battery if the identified voltage is greater than (or in embodiments, equal to) 95% capacity of the battery and inhibit discharging of a battery if the identified voltage is less than (or in embodiments, equal to) 20% capacity of the battery. In this manner, the power management module 418 inhibits discharging of a battery if the battery is being charged. As such, the renewable energy generation system 10 is permitted to operate without subjecting the renewable energy generation system 10 to instances where the drive motor is subjected to severe electrical loads, and therefore, enables the drive motor 14 to run more efficiently. In one embodiment, the charge and discharge controllers are so arranged such that the same battery cannot be simultaneously charged and discharged.

The battery bank bypass switch 416 is in electrical communication with the power management module 418 and enables the power management module 418 to switch transmission of electrical power from the plurality of batteries 408 to the first and second inverters 412, 414. In this manner, the DC power received from the electrical control box 100 is permitted to bypass the plurality of batteries 408. As can be appreciated, bypassing the plurality of batteries 408 may be necessary at times where the plurality of batteries 408 are being serviced without interrupting the generation of electrical energy by the plurality of generators 22, during times where use of the plurality of batteries 408 is not required (e.g., during off-peak hours), or when the electrical energy is being transmitted to the electrical grid directly. It is envisioned that utilizing the battery bank bypass switch 416 to bypass the plurality of batteries 408 will vary depending upon the needs of the end user. As can be appreciated, there are situations where a plurality of batteries 408 is not required unless the plurality of batteries is already a part of the end use system, such as camping, recreational vehicles, boating, amongst others (e.g., small scale applications). However, in large scale applications, such as housing, businesses, etc., the use of the plurality of batteries 408 may be used to optimize power consumption during peak and off-peak hours.

The first and second inverters 412, 414 are electrically coupled to the plurality of discharge controller switches 410 and the battery bank bypass switch 416. The first and second inverters 412, 414 convert the DC electrical power supplied by the plurality of batteries 408 or the DC input 402 to AC electrical power than may be utilized either locally or transmitted to the electrical grid. In this manner, the first inverter 412 is in electrical communication with a local power need, such as a house, a business, camping, recreational vehicle, boat, etc. and the second inverter 414 is in electrical communication with the electrical grid. As the local power need is likely to be sensitive to the power quality being supplied thereto (e.g., being appliances, televisions, computers, etc.), it is envisioned that the first inverter 412 may be a pure sign wave inverter. In contrast, since the electrical grid does not require the same level of power quality as the local power need, it is envisioned that the second inverter 414 may be a grid tie inverter. As can be appreciated, the first and second inverters 412, 414, may be the same or different type of inverter, depending upon the design needs of the renewable energy generation system 10.

Although generally described as being a separate enclosure from the second electrical control box 300, it is contemplated that the components of the battery bank control box 400 may be located within the electrical control box 100 or the second electrical control box 300 or the battery bank control box 400 itself may be disposed within the electrical control box 100 or the second electrical control box 300, depending upon the design needs of the renewable energy generation system 10.

In operation, when the renewable energy generation system 10 is idle (e.g., the drive motor 14 is not being driven), a user enters a command on the remote computer or user device to begin generating electrical energy, which in turn, is wireless transmitted and received by the wireless transmitter 104. The computer module 102, in electrical communication with the wireless transmitter 104, commands the speed controller 204 to provide electrical energy to the drive motor 14 and cause the drive motor 14 to begin operating at a target rotational speed, which remains substantially constant. In embodiments, it is contemplated that the computer module 102 automatically identifies when the voltage of one or more of the plurality of batteries 408 falls below the first pre-determined value and causes the speed controller 204 to provide power to the drive motor 14.

The drive motor 14 begins rotating and reaches the target rotational speed, which in turn, effectuates a corresponding rotation of the flywheel 18 to begin storing rotational energy. The rotation of the flywheel 18 effectuates a corresponding rotation of the plurality of generators 22, which begins generating AC electrical energy. The AC electrical energy generated by the plurality of generators is transmitted to the electrical control box 100, and specifically, to the plurality of rectifiers 106 such that the AC electrical energy generated by the plurality of generators 22 is converted to DC electrical energy usable by the plurality of batteries 408.

The DC electrical energy is monitored by the computer module 102 to identify faults within the system, such as if the plurality of generators 22 is not generating electrical energy, generates a message or alarm, and sends the generated message or alarm to the remote computer and/or user device via the wireless transmitter 104. At this point, the user may wirelessly send a command via the remote computer and/or user device to the wireless transmitter 104 to shut-off the drive motor 14 and thereby terminate the generation of electrical energy. Although power is no longer being generated by the plurality of generators 22, power may continue to be drawn from the plurality of batteries 408 during this time. As can be appreciated, the plurality of batteries 408 is concurrently monitored, via the power management module 418, and if faults are identified within one or more of the plurality of batteries 408 or the voltage level of the plurality of batteries falls below the first pre-determined value, the power management module 418 may close the battery bank bypass switch 418 to allows electrical energy generated by the plurality of generators 22 to bypass the plurality of batteries 408 and flow directly to the first and second inverters 412, 414.

The DC electrical energy is transmitted to the charge controller 404, and thereafter, each of the plurality of charge controller switches 406. The power management module 418 identifies which of the plurality of batteries 408 is below the first pre-determined value, above the first-predetermined value, below the second pre-determined value, and/or above the second pre-determined value and opens and/or closes respective charge controller switches 406 to permit or otherwise inhibit charging of respective batteries of the plurality of batteries 408. By monitoring the voltage level of each battery of the plurality of batteries 408, the power management module 418 inhibits large electrical loads from being placed upon the plurality of generators 22, and therefore, the drive motor 14, which permits the drive motor 14 to operate at a substantially constant speed and increases the efficiency of the renewable energy generation system 10.

As demand for electrical energy is placed upon the renewable energy generation system 10, DC electrical energy is drawn from the plurality of batteries 408, which in turn is transmitted to the first and second inverters 412, 414 for converting the DC electrical energy to AC electrical energy. Local power needs, such as a home, business, camp, recreational vehicle, etc. are drawn from the first inverter 412, where the DC electrical energy is converted to AC electrical energy using a pure sign wave inverter, whereas excess electrical energy is drawn from the second inverter 414, which is a grid tie inverter, such that the excess electrical energy is fed back into the electrical grid.

It is contemplated that at any point during the operation of the renewable energy generation system 10, a user may modify or otherwise control the operating parameters of the drive motor 14, plurality of charge controller switches 406, battery bank bypass switch 418, etc. via the remote computer and/or user device. In this manner, the user commands are wirelessly received by the wireless transmitter 104, which in turn are received by the computer module 102, which transmits the user commands to the relevant module and/or component.

Figure 9:
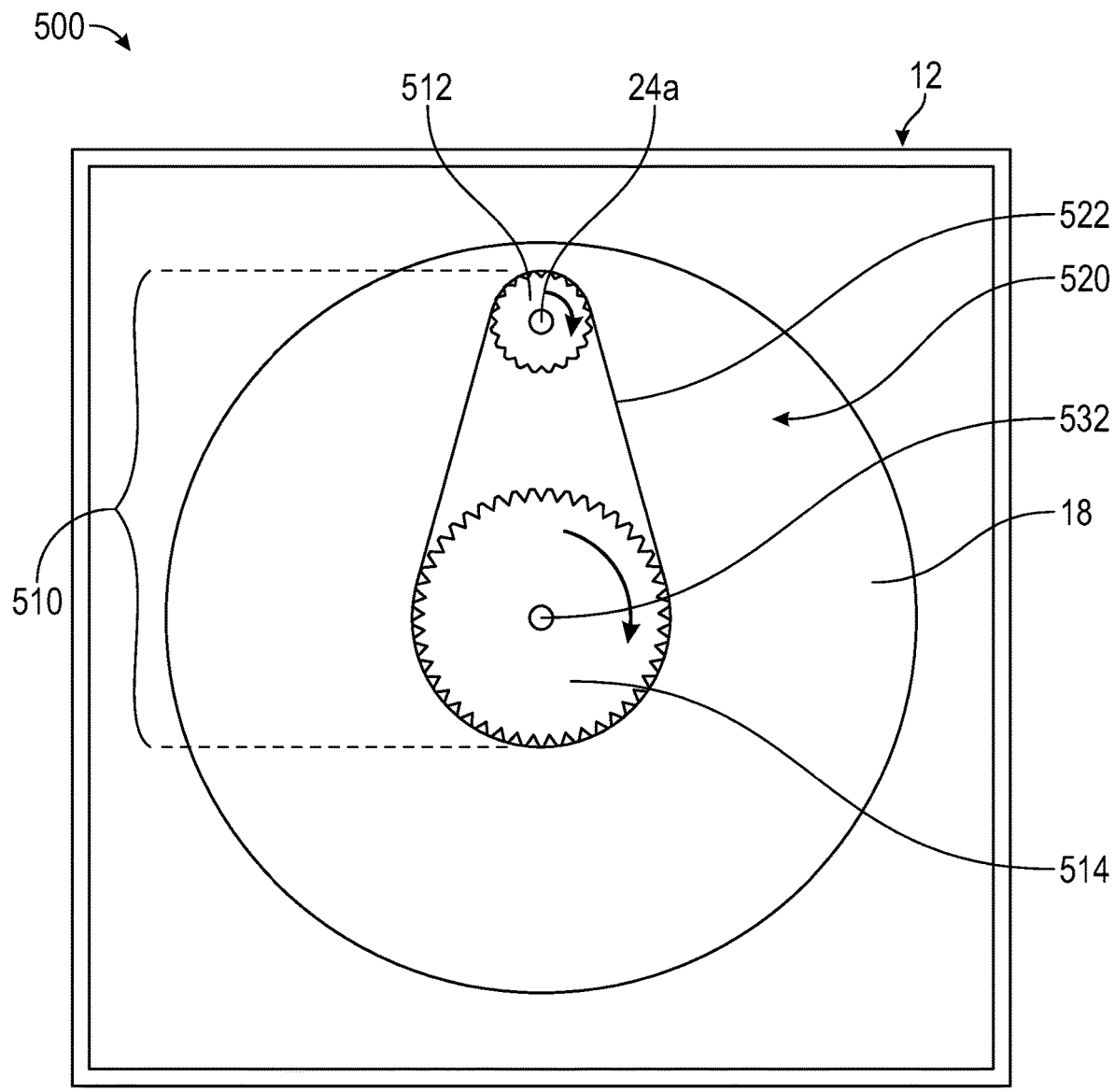
FIG. 9 is a front view of a renewable energy generation device in accordance with another embodiment of the present disclosure.
Figure 10:
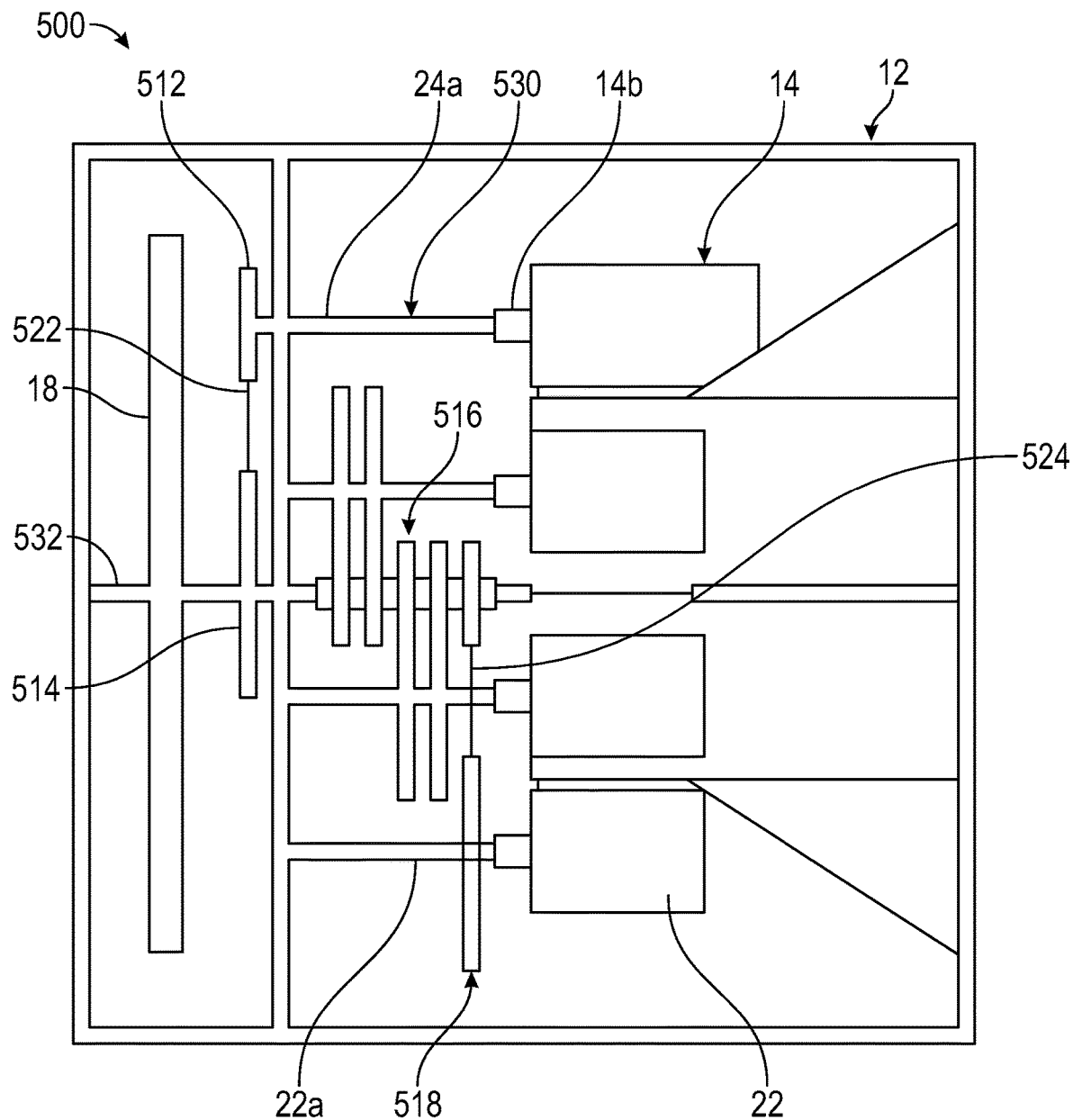
FIG. 10 is a is a side view of the renewable energy generation device of FIG. 9.
Figure 11:
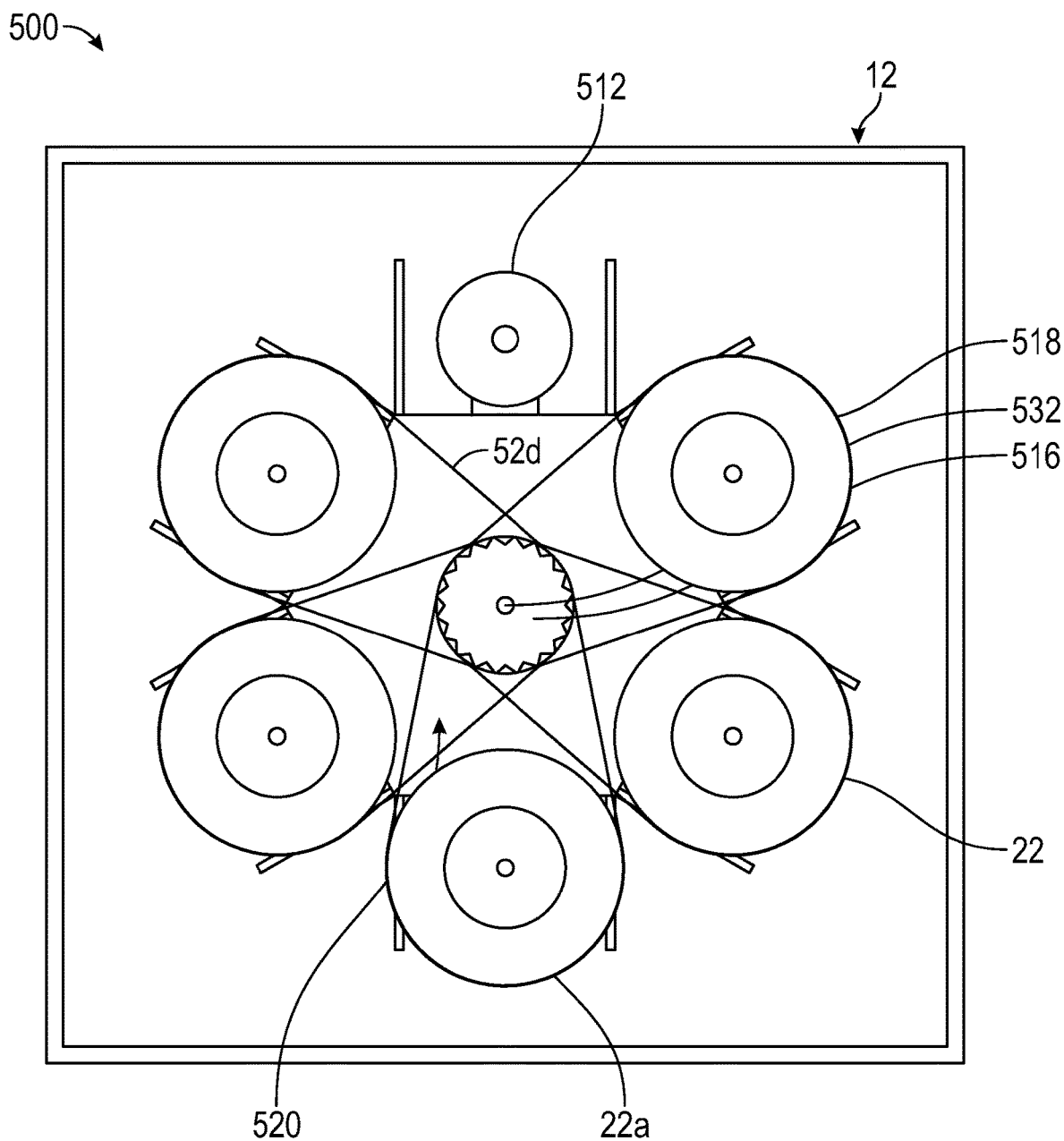
FIG. 11 is a front view of the renewable energy generation device of FIG. 9, showing a pulley system coupling a drive motor to generators for the generation of electrical energy.

With reference to FIGS. 9-11, an alternate embodiment of the renewable energy generation system is illustrated and generally identified by reference numeral 500. The renewable energy generation system 500 is substantially similar to renewable energy generation system 10, and therefore, only the differences therebetween will be described herein in the interest of brevity.

The renewable energy generation system 500 includes a plurality of pulleys 510, a plurality of belts 520, and a plurality of shafts 530. The plurality of pulleys 510 includes a drive pulley 512, a flywheel pulley 514, a plurality of output pulleys 516 (FIG. 10), and a plurality of generator pulleys 518 (FIG. 10). As illustrated in FIG. 10, the drive pulley 512 is fixedly secured to the drive shaft 24a such that rotation of the output shaft 14b of the drive motor 14 effectuates rotation of the drive shaft 24a which effectuates a corresponding rotation of the drive pulley 512. The flywheel pulley 514 is fixedly secured to a flywheel shaft 532 of the plurality of shafts 530. The flywheel shaft 532 is rotatably supported on a portion of the housing 12 by means of a ball bearing, bushing, etc., such that the flywheel shaft 532 is permitted to rotate relative to the housing 12. The drive pulley 512 and the flywheel pulley 514 are in mechanical communication with one another using a drive belt 522 of the plurality of belts 520. It is contemplated that the drive belt 522 may be any suitable type of belt, such as a flat belt, v-belt, etc., or may be a chain or other suitable drive transmission device utilizing pulleys.

The plurality of output pulleys 516 are fixedly secured to the flywheel shaft 532 using any suitable means, such as welding, adhesives, fasteners, amongst others. Each pulley of the plurality of output pulleys 516 is in mechanical communication with a corresponding pulley of the plurality of generator pulleys 518 using a generator belt 524 of the plurality of belts 520. It is contemplated that the generator belt 524 may be any suitable type of belt such as a flat belt, v-belt, etc., or may be a chain or other suitable drive transmission device utilizing pulleys, depending upon the needs of the renewable energy generation system 500. In embodiments, the generator belt 524 may be the same or different than the drive belt 522, and each generator belt 524 may be the same or different depending upon the size of the corresponding generator of the plurality of generators 22.

Each generator pulley of the plurality of generator pulleys 518 is fixedly coupled to the output shaft 22a of a corresponding generator of the plurality of generators 22 using any suitable means, such as welding, adhesives, fasteners, amongst others. As can be appreciated, rotation of the generator pulley 518 effectuates a corresponding rotation of the output shaft 22a of the generator 22 to cause the generation of electrical energy, as will be described in further detail hereinbelow. As illustrated in FIG. 10, each of the output pulleys 516 and each corresponding generator pulley 518 is offset relative to one another along a longitudinal axis defined by the flywheel shaft 532. In this manner, each generator belt 524 is spaced apart from one another to ensure there is no interference therebetween.

Operation of the renewable energy generation system 500 is substantially similar to that of the renewable energy generation system 10, and therefore, a detailed description of the operation of which is not provided in detail herein in the interest of brevity.

Figure 12:
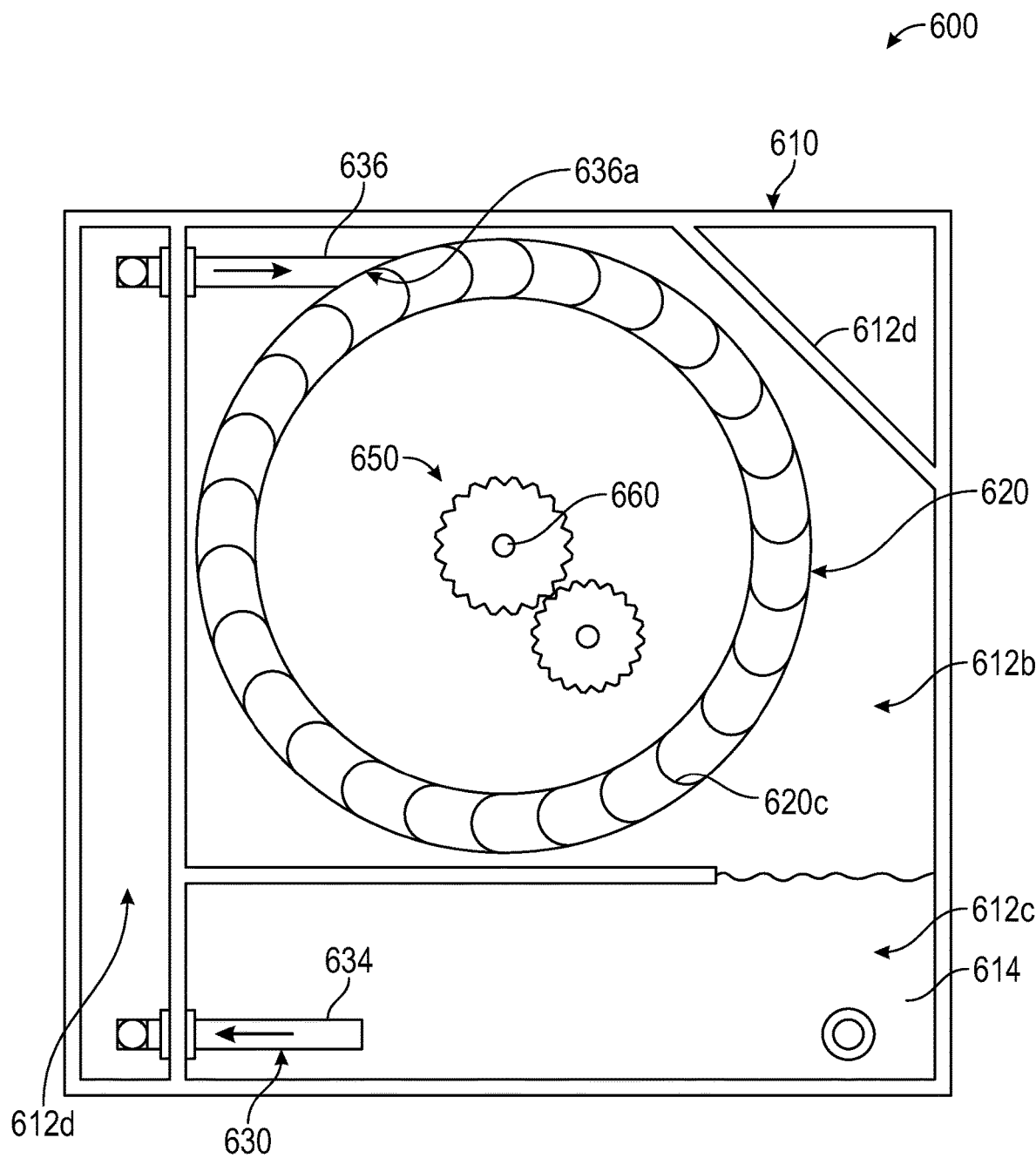
FIG. 12 is a front view of yet another embodiment of a renewable energy generation device provided in accordance with the present disclosure.
Figure 13:
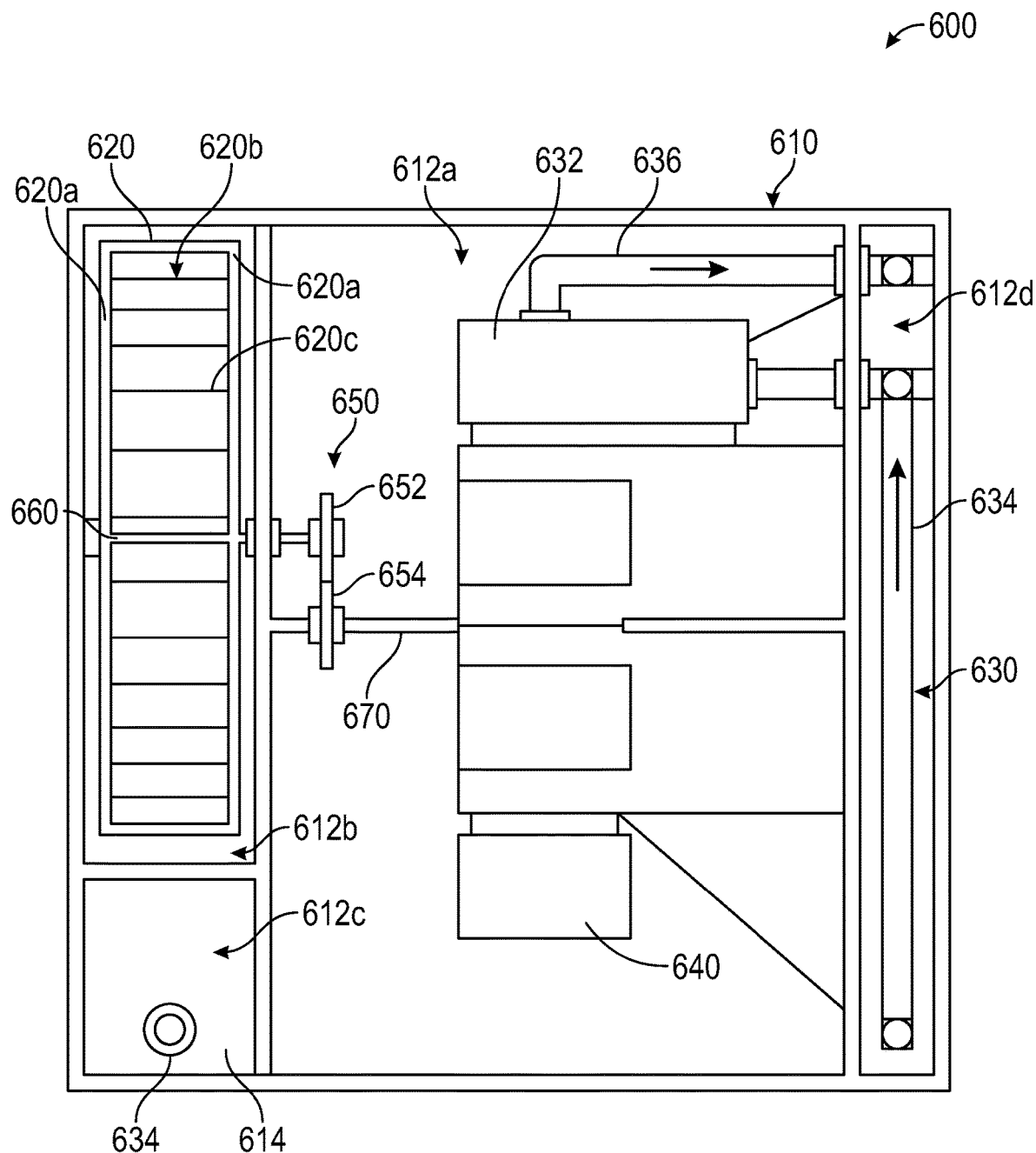
FIG. 13 is a side view of the renewable energy generation device of FIG. 12.
Figure 14:
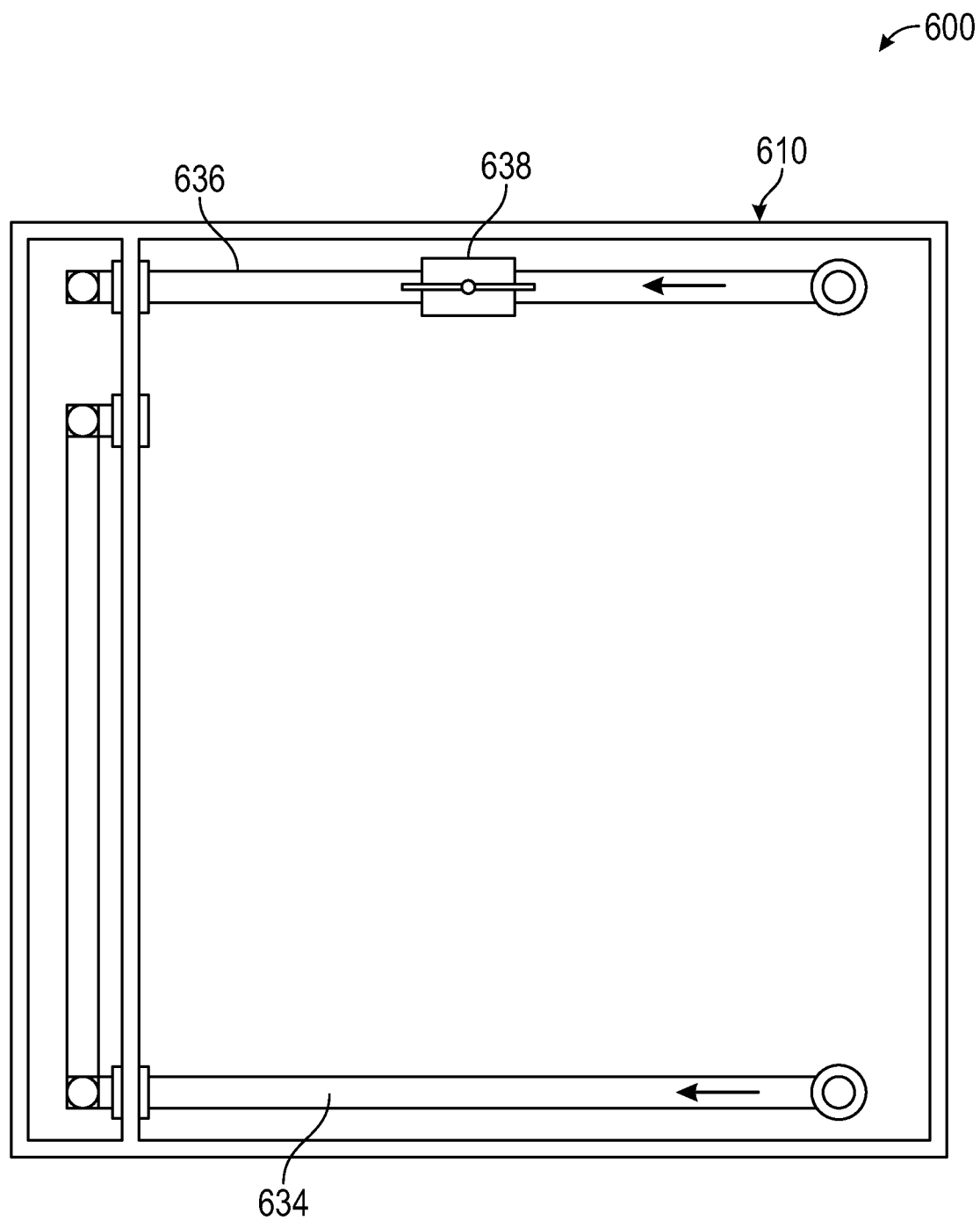
FIG. 14 is a schematic view of a fluid pumping system of the renewable energy generation device of FIG. 13.

With reference to FIGS. 12-14, another embodiment of a renewable energy generation system is illustrated and generally identified by reference numeral 600. The renewable energy generation system 600 includes a housing 610, a water wheel 620, a hydraulic circuit 630, a plurality of generators 640 (FIG. 13), and a gear train 650.

The housing 610 defines an interior portion defining a main compartment 612a at a center portion thereof in which the plurality of generators 640 and the gear train 650 is disposed. The interior portion of the housing 610 defines a water wheel compartment 612b at an end portion thereof for rotatably supporting the water wheel 620 therein. In this manner, the water wheel 620 is fixedly supported on a drive shaft 660 using any suitable means, such as welding, fasteners, adhesives, etc., which in turn is rotatably supported by a portion of the housing 610 using any suitable means, such as ball bearings, fluid bearings, bushings, amongst others. The water wheel 620 includes a generally cylindrical configuration having a pair of spaced apart end plates 620a defining a gap 620b therebetween. A plurality of fins or paddles 620c is disposed within the gap 620b and each fin 620c is fixedly secured to a respective end plate of the pair of end plates 620a on opposite ends thereof such that a fluid impinging on a surface of each fin 620c effectuates rotation of the water wheel 620, as will be described in further detail hereinbelow.

It is contemplated that the plurality of fins 620c may be planar, concave, convex, or any other suitable profile, and may be oriented parallel to a radius extending from a center portion of the water wheel 620 or may be oriented at an angle relative thereto, depending upon the needs of the renewable energy generation system 600. In one non-limiting embodiment, the plurality of fins 620c define a concave or otherwise basket shaped profile and are oriented parallel to a radius of the water wheel 620.

As can be appreciated, the water wheel 620 acts as a flywheel, similar to the flywheel 18 of the renewable energy generation system 10. In this manner, as the water wheel 620 is caused to be rotated, the water wheel 620 stores energy in the form of angular kinetic energy (rotational energy). Accordingly, as the water wheel 620 gains rotational speed, the rotational energy of the water wheel 620 increases. As can be appreciated, the overall weight of the water wheel 620, the geometry of the water wheel 620 (outer diameter, thickness (constant or varying), etc.), and the rotational speed of the water wheel 620 cooperate to define the amount of rotational energy the water wheel 620 is able to store. Accordingly, the characteristics of the water wheel 620 can be varied depending upon the requirements of the renewable energy generation system 600. Although generally described as being a water wheel, it is contemplated that the water wheel 620 may be a tesla turbine utilizing air or other gas transferred thereto by the pump 632 (FIG. 13).

In embodiments, the housing 610 may include a splash guard 612d (FIG. 12) disposed within a portion of the water wheel compartment 612b to deflect or otherwise direct fluid that is ejected from the water wheel 620 towards a holding tank 612c defined at a lower portion of the interior portion 612 of the housing 610. In this manner, the splash guard 612d is oriented at an angle relative to a vertical axis (not shown) defined by the housing 610.

The holding tank 612c defines a volume in which a fluid 614 is disposed. The fluid 614 may be any suitable fluid capable of being transported from the holding tank to an upper portion of the water wheel 620, such as water, oil, gas, etc. In one non-limiting embodiment, the fluid 614 is water. In embodiments, the holding tank 612c is formed from a corrosion resistant material, such as a composite, stainless steel, aluminum, polymer, amongst others. It is contemplated that the holding tank 612c may be formed from a non-corrosion resistant material which is coated with a corrosion resistant coating, such as a metallic material, non-metallic material, ceramic, etc. A portion of the holding tank 612c defines an aperture in which a pipe or other suitable component may be disposed such that the holding tank 612c is in fluid communication therewith.

The interior portion of the housing 610 defines a pipeline compartment 612d in which a portion of the hydraulic circuit 630 is disposed. In this manner, the hydraulic circuit 630 includes a pump 632, an inlet pipe 634, and an outlet pipe 636. Although generally illustrated as being disposed within the main compartment 612a, it is contemplated that the pump 632 may be disposed within the pipeline compartment 612d or within the holding tank 612c. In this manner, the pump 632 may be any suitable pump capable of pumping a fluid, such as a direct lift pump, a displacement pump, a gravity pump, etc. As can be appreciated, the pump 632 may be a submersible pump or a non-submersible pump and may be electrically driven or driven by any suitable means.

The inlet pipe 634 interconnects the holding tank 612c at a first end thereof and an inlet of the pump 632 at a second, opposite end thereof such that the pump 632 is in fluid communication with the holding tank 612c. The outlet pipe 636 is fluidly coupled to an outlet of the pump 632 and transports the fluid 614 to an upper portion of the water wheel compartment 612b, such that the fluid 614 pumped from the pump and through the outlet pipe 636 is ejected from an outlet 636a of the outlet pipe 636 and impinges the fins 620c of the water wheel 620, thereby causing the water wheel 620 to rotate. As can be appreciated, the fluid 614 utilized by the water wheel 620 is collected by the holding tank 612c to help maintain the amount of fluid held by the holding tank 612c. In embodiments, the hydraulic circuit 630 may include a check valve or one-way valve 638 coupled to the outlet pipe 636 to inhibit the flow of fluid back towards the pump 632. It is contemplated that the hydraulic circuit may include a shut-off valve (not shown) or other suitable device capable of inhibiting the flow of fluid through the hydraulic circuit 630. It is envisioned that the shut-off valve may be manually or automatically operated, depending upon the design needs of the hydraulic circuit 630.

With reference to FIG. 13, the drive shaft 660 extends into the main compartment 612a. A pinion gear 652 of the gear train 650 is fixedly coupled to the drive shaft 260 within the main compartment 612a using any suitable means, such as welding, fasteners, adhesives, amongst others. A layshaft 670 is rotatably supported within the main compartment 612a using any suitable means, such as ball bearings, fluid bearings, bushings, etc. and includes a spur gear 654 fixedly coupled thereto by means of welding, fasteners, adhesives, or the like. The spur gear 654 is meshingly engaged with the pinion gear 652 such that rotation of the pinion gear 652 effectuates a corresponding rotation of the spur gear 654, which effectuates a corresponding rotation of the layshaft 670.

The plurality of generators 640 is in mechanical communication with the layshaft 670 using any suitable means. In embodiments, the plurality of generators 640 may be mechanically coupled to the layshaft using a plurality of gears similar to the plurality of generator gears 20 of the renewable energy generation system 10 or the plurality of generator pulleys 518 of the renewable energy generation system 500, and therefore, the means by which rotation of the layshaft 670 is mechanically coupled to the plurality of generators 640 is not described herein in the interest of brevity. Although generally described herein as including a plurality of gears, it is contemplated that the gear train 650 may include a pulley system similar to that of the renewable energy generation system 500. It is further contemplated that the renewable energy generation system 600 may utilize a combination of gears and pulleys, depending upon the design needs thereof.

Operation of the renewable energy generation system 600 is substantially similar to that of the renewable energy generation system 10, except that the speed control 104 operates to control the speed of the pump 632, which in turn, controls the rotational speed of the water wheel 620 to control the generation of electrical energy. Therefore, a further detailed description of the operation of the renewable energy generation system 600 will not be provided herein in the interest of brevity.

Figure 15:
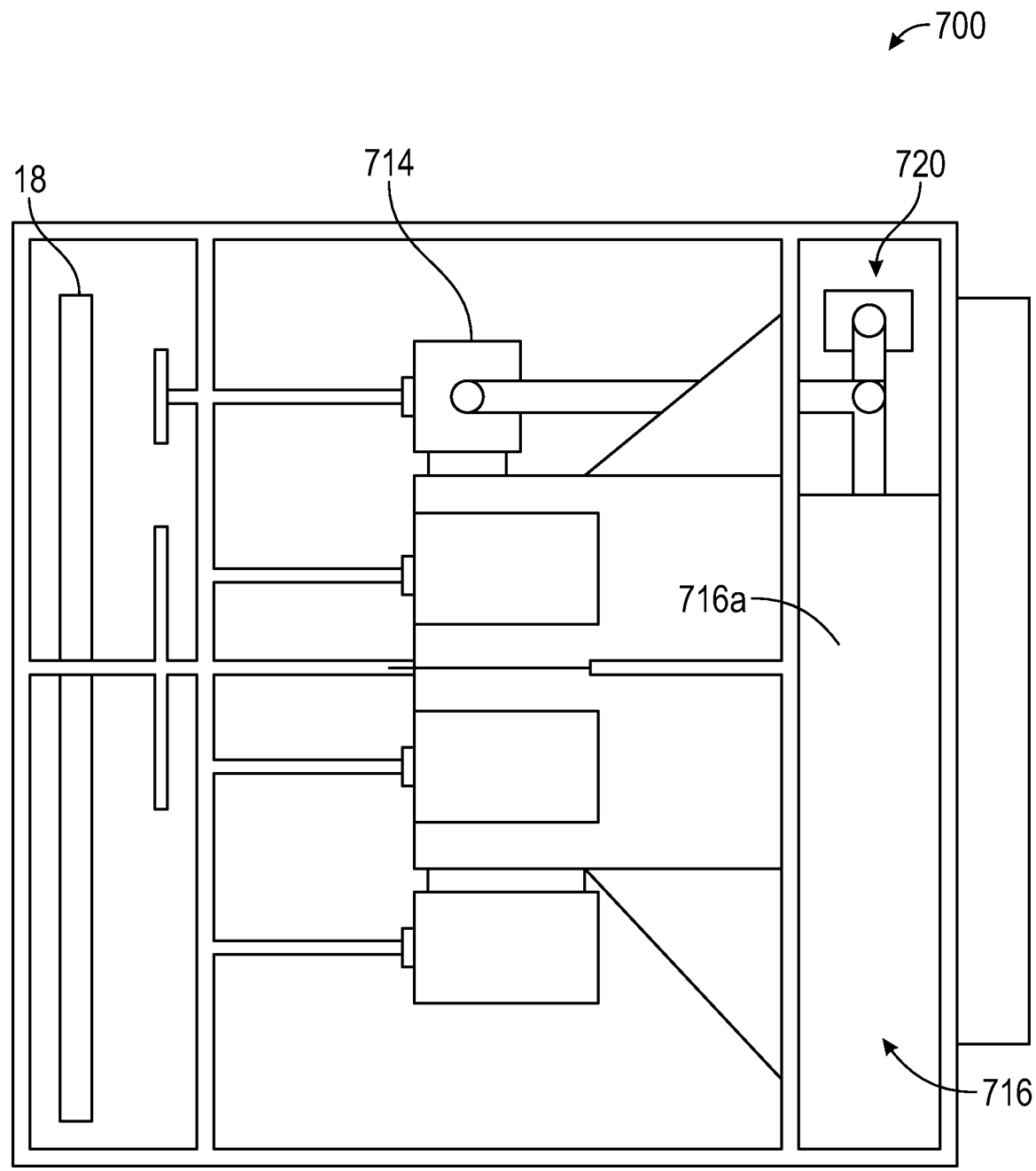
FIG. 15 is a side view of a renewable energy generation device provided in accordance with another embodiment of the present disclosure.
Figure 16:
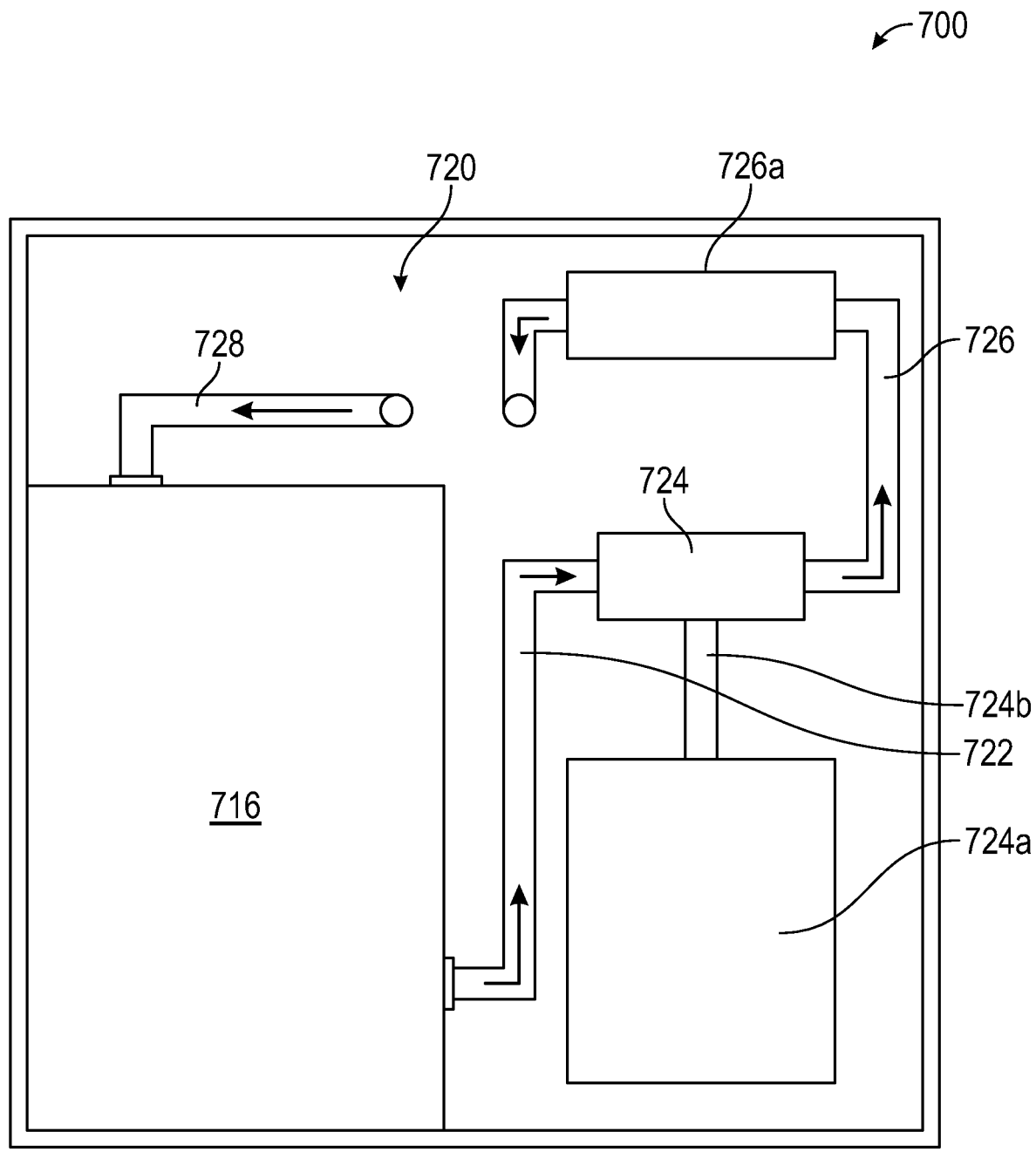
FIG. 16 is a schematic view of a hydraulic or pneumatic circuit of the renewable energy generation device of FIG. 15.

With reference to FIGS. 15 and 16, another embodiment of a renewable energy generation system is illustrated and generally identified by reference numeral 700. The renewable energy generation system 700 is substantially similar to the renewable energy generation system 10, and therefore, only the differences therebetween will be described herein in the interest of brevity.

The renewable energy generation system 700 includes a hydraulic motor 714 in place of the drive motor 14 of the renewable energy generation system 10. It is contemplated that the hydraulic motor 714 may be any suitable hydraulic motor capable of effectuating rotation of the flywheel 718, such as a vane motor, gear motor, gearotor motor, axial plunger motor, radial piston motor, amongst others. Those of ordinary skill in the art will appreciate that the hydraulic motor 714 may alternatively be a pneumatic motor driven by compressed air or another suitable gas to effectuate rotation of the flywheel 718.

The housing 712 of the renewable energy generation system 700 includes a hydraulic fluid holding tank 716 disposed within a portion of the interior portion thereof. In the case of a pneumatic system the holding tank 716 may be a compressed gas cylinder. The hydraulic fluid holding tank 716 defines an interior volume in which a hydraulic fluid 716a is disposed. It is contemplated that the hydraulic fluid may be any suitable hydraulic fluid capable of driving the hydraulic motor 714, such as an oil based hydraulic fluid, a water based hydraulic fluid, etc.

The renewable energy generation system 700 includes a hydraulic system 720 for transporting the hydraulic fluid 716a from the hydraulic fluid holding tank 716, to the hydraulic motor 714, and from the hydraulic motor 714 back to the hydraulic fluid holding tank 716. In the case of a pneumatic system, the gas may either be recaptured or simply released into the atmosphere. As illustrated in FIG. 16, the hydraulic system 720 includes a suction pipe 722 fluidly coupled at a first portion thereof to a lower portion of the hydraulic fluid holding tank 716, although it is contemplated that the suction pipe 722 may be fluidly coupled to any portion of the hydraulic fluid holding tank 716. The suction pipe 722 is fluidly coupled to an inlet of a hydraulic pump 724 at a second portion thereof, such that the hydraulic pump 724 is in fluid communication with the hydraulic fluid holding tank 716. The hydraulic system 720 includes an inlet pipe 726 fluidly coupled to an output of the hydraulic pump 724 at a first portion thereof and is fluid coupled to an inlet of the hydraulic motor 714 at a second, opposite portion thereof. In embodiments, the inlet pipe 726 includes a flow control valve 726a fluidly coupled thereto to control the flow of fluid from the hydraulic pump 724 to the hydraulic motor 714, thereby controlling the speed of the hydraulic motor 714. An outlet pipe 728 is fluidly coupled to an outlet of the hydraulic motor 714 at a first portion thereof and is fluidly coupled to an upper portion of the hydraulic fluid holding tank 716 at a second, opposite portion thereof. In this manner, fluid expelled from the outlet of the hydraulic motor 714 flows through the outlet pipe 728 and is returned to the hydraulic fluid holding tank 716. In the case of a pneumatic motor 714, the hydraulic pump 724 is replaced by compressor used to increase the pressure of the gas in the compressed gas cylinder (i.e., holding tank 716). The compressor is located in fluid communication with an inlet pipe to the compressed gas cylinder. Although generally described herein as being pipes, it is contemplated that the suction pipe 722, the inlet pipe 726, and the outlet pipe 728 may be any suitable component capable of transporting hydraulic fluid and resisting high pressures, such as a hydraulic hose or the like.

The hydraulic system 720 includes a hydraulic pump drive motor 724a in mechanical communication with the hydraulic pump 724. In this manner, the output shaft of the hydraulic pump drive motor 724a is mechanically coupled to a drive shaft 724b of the hydraulic pump 724 using any suitable means, such as welding, fasteners, adhesives, amongst others. Although generally illustrated as being an electric motor, it is contemplated that the hydraulic pump drive motor 724a may be any suitable device capable of motor capable of driving the hydraulic pump 724. Again, in a pneumatic system, the drive motor 724a can be employed to drive the compressor and increase the pressure of the gas held in the holding tank 716. It is contemplated that the flow control valve 726a and/or the hydraulic pump drive motor 724a may be manually controller or automatically controlled using the remote computer or user device in wireless communication with the wireless transmitter.

Operation of the renewable energy generation system 700 is substantially similar to that of the renewable energy generation system 10 except that the speed controller 104 controls the speed of the hydraulic pump drive motor 724a and the computer module 102 controls the operation of the flow control valve 726a, which in cooperation control the generation of electrical energy. Therefore, a further detailed description of the operation of the renewable energy generation system 700 will not be provided herein in the interest of brevity.

Figure 17:
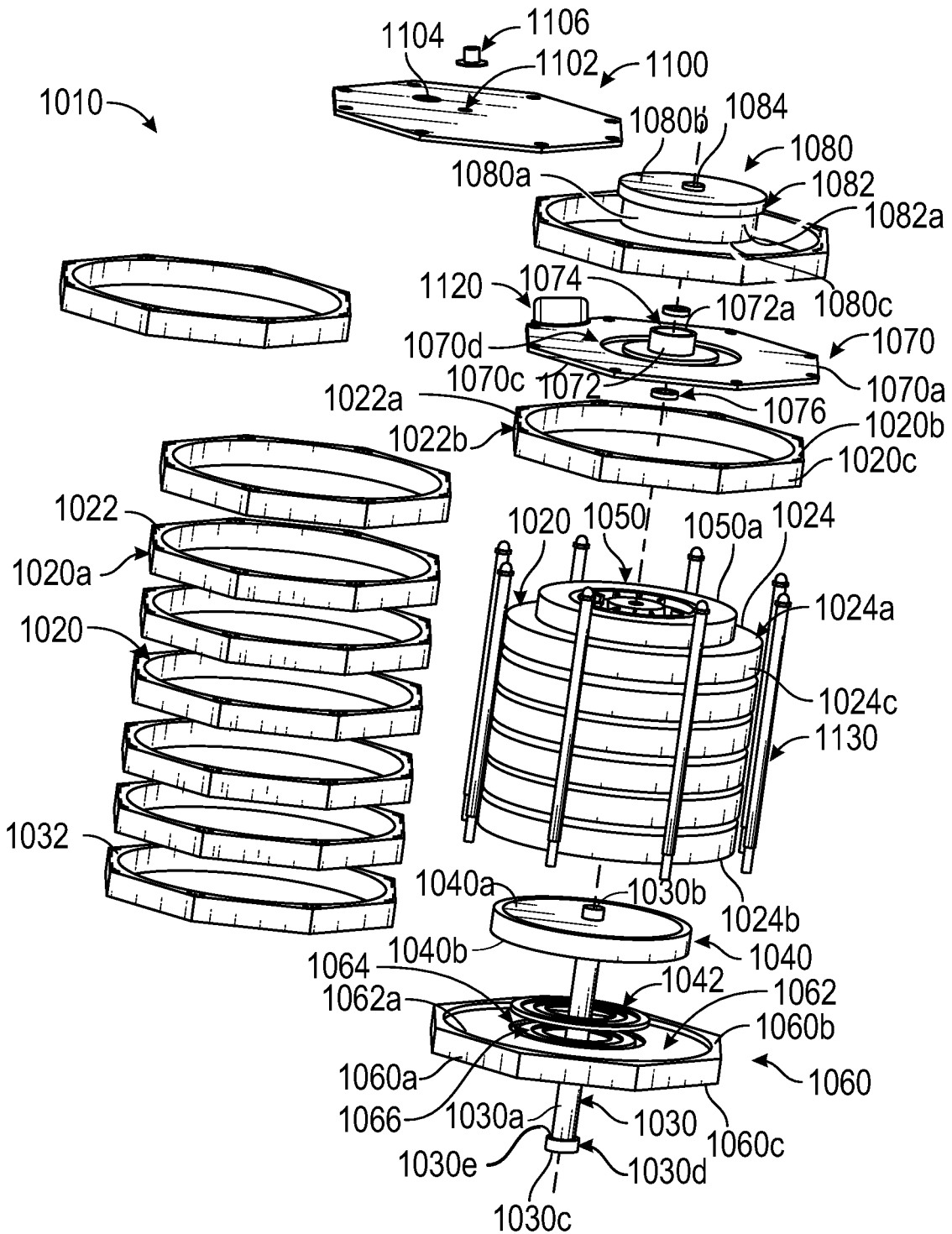
FIG. 17 is an exploded, perspective view of a flywheel assembly provided in accordance with the present disclosure.
Figure 18:
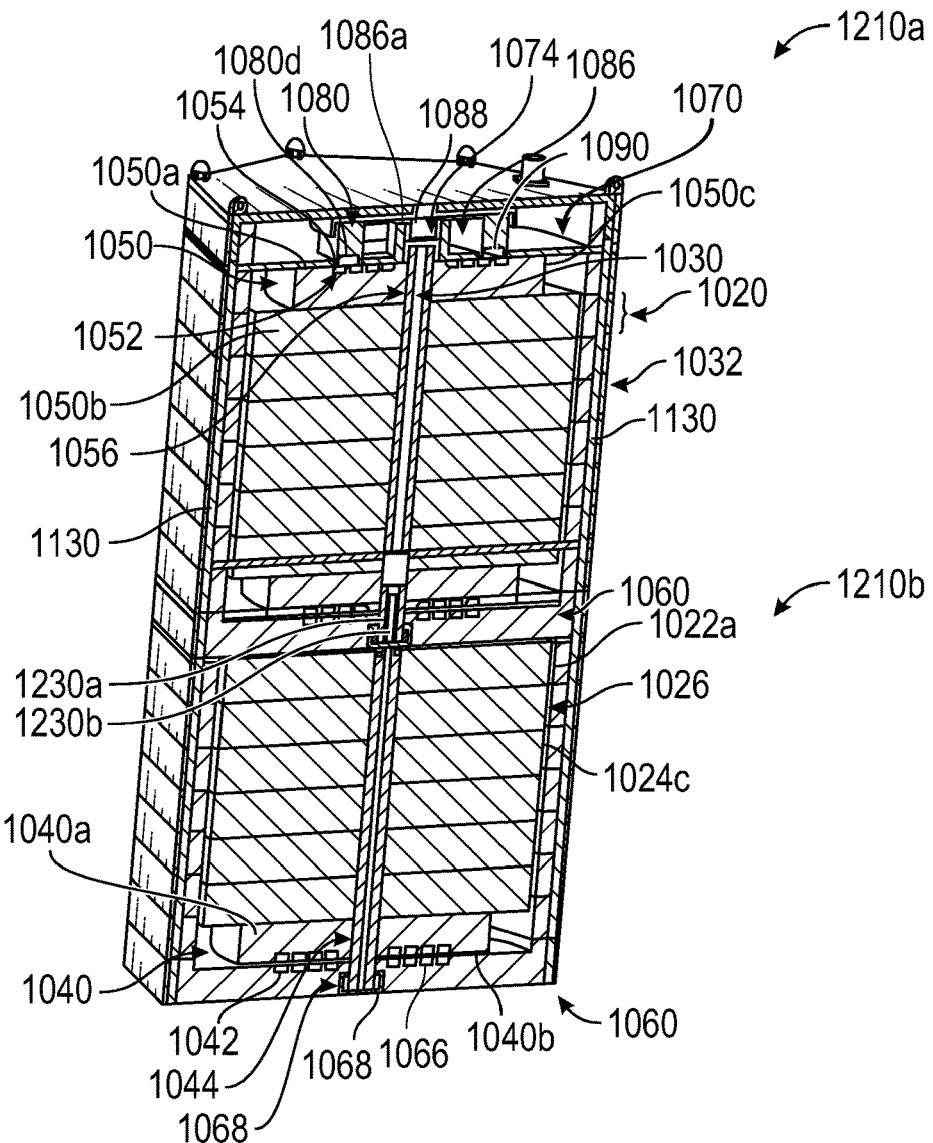
FIG. 18 is a cross-sectional view of the flywheel assembly of FIG. 17 showing a second flywheel assembly coupled thereto.
Figure 18A:
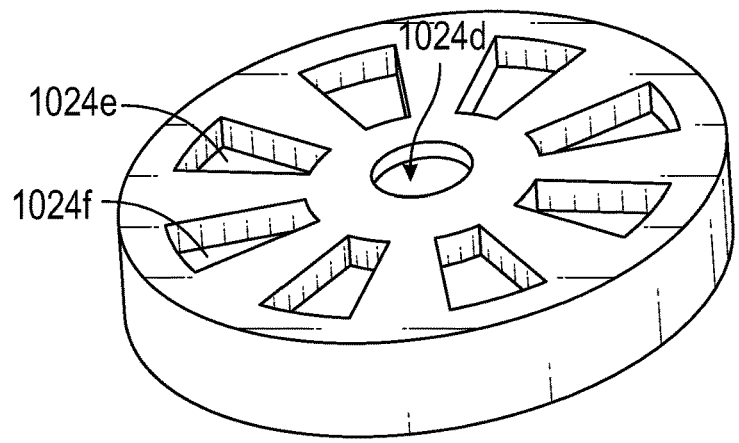
FIG. 18A is a perspective view of a flywheel of the flywheel assembly of FIG. 17 showing keys and keyways of the flywheel.
Figure 19:
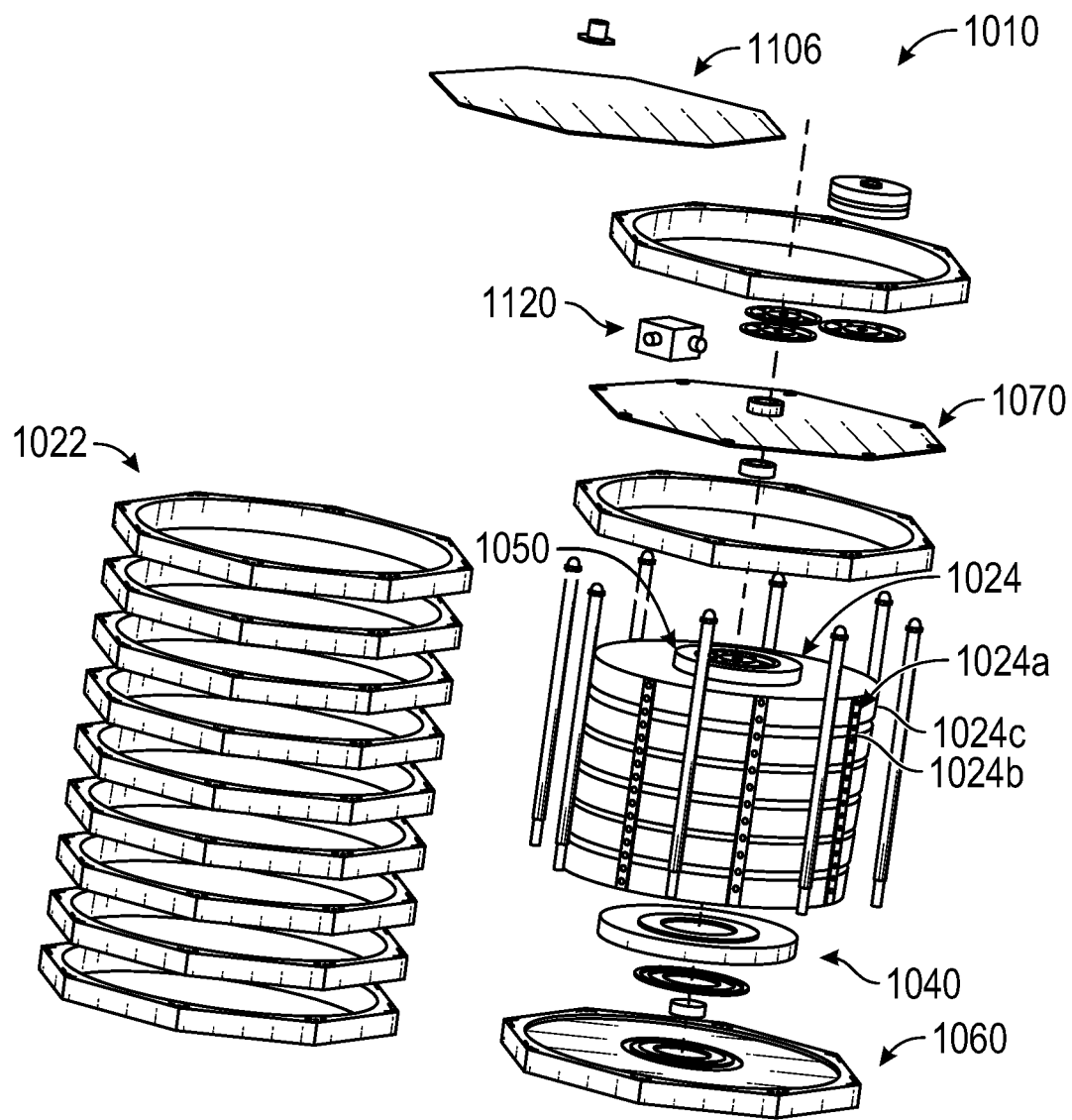
FIG. 19 is an exploded, perspective view of another embodiment of a flywheel assembly provided in accordance with the present disclosure.

With reference to FIGS. 17 and 18, a flywheel assembly for use with a renewable energy generation system is illustrated and is generally identified by reference numeral 1010. Although generally described herein as being utilized for renewable energy generation systems, it is contemplated that the flywheel assembly 1010 may be utilized in any suitable system, such as energy generation systems, energy storage systems, etc.

The flywheel assembly 1010 includes one or more flywheel segments 1020, a flywheel shaft 1030, a magnetic levitation disk 1040, a magnetic coupling 1050, a base plate 1060, a vacuum plate 1070, a motor and/or generator coupling 1080, a top cover 1100, a vacuum pump 1120, and a plurality of securement bolts 1130.

Each of the one or more flywheel segments 1020 are substantially similar, and therefore, only one flywheel segment 1020 will be described in detail herein in the interest of brevity. The flywheel segment 1020 includes an outer sidewall 1020a extending between opposed upper and lower surfaces 1020b and 1020c, respectively, and is formed from a single monolithic piece of material, such as a billet, casting, etc. Each flywheel segment 1020 includes a flywheel housing 1022 and a flywheel 1024. The flywheel housing 1022 and the flywheel 1024 are separated from one another during manufacturing by cutting or milling (e.g., water jet, plasma cutting, vertical mill, lathe, horizontal mill, etc.) the flywheel 1024 from the flywheel segment 1020, forming separate components in the form of the flywheel housing 1022 and the flywheel 1024. In this manner, the flywheel segment 1020 is cut through the upper and lower surfaces 1020b, 1020c to form a gap 1026 between a resulting circumference or outer wall 1024c of the flywheel 1024 and a resulting inner wall 1022a of the flywheel housing 1022. The gap 1026 formed between the outer wall 1024c of the flywheel 1024 and the inner wall 1022a of the flywheel housing 1022 includes a dimension that is configured to permit the flywheel 1024 to rotate and/or be otherwise manipulated relative to the flywheel housing 1022 therewithin. It is envisioned that the flywheel segments 1020 may be formed from any suitable material, such as aluminum and aluminum, steel, stainless steel, tungsten, etc., and alloys and/or combinations thereof.

The flywheel 1024 defines resulting opposed upper and lower surfaces 1024a and 1024b and the outer wall 1024c extending therebetween. A borehole 1024d is defined through the upper surface 1024a at a center portion thereof and extends through the lower surface 1024b. The borehole 1024d is configured to fixedly receive a portion of a flywheel shaft 1030 therein using an interference fit, friction fit, adhesives, welding, mechanical fasteners, etc. In one non-limiting embodiment, the flywheel 1024 is fixedly secured to the flywheel shaft 1030 by an interference fit utilizing thermal energy.

In embodiments, each of the upper and lower surfaces 1024a, 1024b of the flywheel 1024 may include one or more keys 1024e disposed thereon and one or more keyways 1024f defined therein. The keys 1024e and the keyways 1024f are arranged on the upper and lower surfaces 1024a, 1024b of the flywheel 1024 such that the keys 1024e of one flywheel 1024 may be received within corresponding keyways 1024f of an adjacent flywheel 1024 to lock or otherwise inhibit rotation of one flywheel 1024 relative to another. In this manner, any suitable number of flywheels 1024 may be stacked on one another depending upon the amount of stored energy is desired, such as one, two, three, four, five, etc. In one non-limiting embodiment, the flywheel assembly 1010 includes six flywheels 1024 fixedly secured to the flywheel shaft 1030.

The flywheel shaft 1030 includes a generally cylindrical profile having an outer surface 1030a extending longitudinally between opposed first and second end surfaces 1030b and 1030, respectively. The flywheel shaft 1030 includes an outer dimension that is configured to be fixedly retained within the borehole 1024d and rotatably received within one or more bearings, as will be described in further detail hereinbelow.

As described hereinabove, in one embodiment as depicted in FIG. 18 each flywheel 1024 is fixedly secured to the flywheel shaft 1030 by an interference fit. In this manner, one or more flywheels 1024 are heated or otherwise treated to cause the inner dimension of the borehole 1024c to expand. To further aid in assembly, the flywheel shaft 1030 may be cooled or otherwise treated to cause the outer dimension thereof to contract or shrink. The flywheel shaft 1030 is then advanced within each borehole 1024d of each respective flywheel 1024 and each flywheel 1024 is caused to abut each adjacent flywheel 1024. In embodiments where each flywheel 1024 includes a key 1024e and a keyway 1024f, each adjacent flywheel is caused to abut one another such that each key 1024e is received within a respective keyway 1024f to inhibit rotation of each flywheel 1024 relative to one another. The flywheels 1024 and the flywheel shaft 1030 are then brought to room temperature to fix the flywheels 1024 to the flywheel shaft 1030 such that rotation of the flywheel shaft 1030 effectuates a corresponding rotation of the flywheels 1024 and vice versa.

In embodiments, the outer surface 1030a of the flywheel shaft 1030 defines a radial flange 1030d extending radially outward therefrom adjacent the second end surface 1030c. The radial flange 1030d extends longitudinally from the second end surface 1030c towards the first end surface 1030b and terminating in an annular surface 1030e. The annular surface 1030e is configured to abut a portion of a ball bearing, bushing, or other similar feature to inhibit translation of the flywheel shaft 1030 therethrough.

The magnetic levitation disk 1040 includes a generally circular profile, although it is contemplated that the magnetic levitation disk 1040 may include any suitable profile, such as hexagonal, octagonal, square, oval, etc. The magnetic levitation disk 1040 may be formed from formed from any suitable material, such as aluminum and aluminum, steel, stainless steel, tungsten, etc., and alloys and/or combinations thereof. In embodiments, the magnetic levitation disk 1040 may be formed entirely from a permanent magnet, such as a ceramic or ferrite magnet, an alnico magnet, an injected molded magnet, a rare earth magnet, a magnetic metallic element, etc., although it is contemplated that the magnet may be an electromagnet. In embodiments, the magnetic levitation disk 1040 may include a plurality of recesses (not shown) defined therein that are configured to retain one or more magnets 1042 therein (FIG. 18).

The magnetic levitation disk 1040 includes opposed top and bottom surfaces 1040a and 1040b, respectively, and an outer surface 1040c extending longitudinally therebetween. A bore 1044 is defined through a center portion of the top surface 1040a and extends through the bottom surface 1040b. The bore 1044 includes an inner dimension that is configured to receive a portion of the flywheel shaft 1030 therein. It is contemplated that the bore 1044 may slidably receive the flywheel shaft 1030 therein or may fixedly retain the flywheel shaft 1030 therein by means of interference fit, friction fit, adhesives, welding, mechanical fasteners, etc. In this manner, the magnetic levitation disk 1040 may be caused to rotate in unison with the flywheel shaft 1030 or may permit the flywheel shaft 1030 to rotate within the bore 1044.

Continuing with FIGS. 17 and 18, the magnetic coupling 1050 is includes a generally circular profile, although it is contemplated that the magnetic coupling 1050 may include any suitable profile, such as hexagonal, octagonal, square, oval, etc. The magnetic coupling 1050 may be formed from formed from any suitable material, such as aluminum and aluminum, steel, stainless steel, tungsten, etc., and alloys and/or combinations thereof. In embodiments, the magnetic coupling 1050 may include a similar profile and similar dimensions to that of the magnetic levitation disk 1040 or the flywheels 1024.

The magnetic coupling 1050 includes opposed upper and lower surfaces 1050a and 1050b, respectively, and an outer surface 1050c extending longitudinally therebetween. A plurality of recesses 1052 is defined through the upper surface 1050a that is configured to retain a corresponding plurality of torque magnets 1054 therein. The plurality of torque magnets 1054 is arranged in a circumferential manner to enable the plurality of torque magnets 1054 to act as a magnetic gear element in cooperation with a corresponding plurality of torque magnets 1090 coupled to the motor coupling 1080, as will be described in further detail hereinbelow. In this manner, the plurality of torque magnets 1054 of the magnetic coupling 1050 is arranged in an alternating fashion, e.g., a pole of each respective magnet of the plurality of torque magnets alternates in a north, south, north, south, etc. fashion.

The magnetic coupling 1050 includes a bore 1056 defined through a center portion of the upper surface 1050a and extending through the lower surface 1050b. The bore 1056 includes an inner dimension that is configured to receive a portion of the flywheel shaft 1030 therein. It is contemplated that the bore 1056 may slidably receive the flywheel shaft 1030 therein or may fixedly retain the flywheel shaft 1030 therein by means of interference fit, friction fit, adhesive es, welding, mechanical fasteners, etc. In this manner, the magnetic coupling 1050 may be caused to rotate in unison with the flywheel shaft 1030 or may permit the flywheel shaft 1030 to rotate within the bore 1056. The combination of the flywheels 1024, the flywheel shaft 1030, magnetic levitation disk 1040, and the magnetic coupling 1050 define an aperture or spindle type configuration having a portion of the flywheel shaft 1030 extending longitudinally beyond the upper surface 1050a of the magnetic coupling and longitudinally beyond the bottom surface 1040b of the magnetic levitation disk 1040.

The base plate 1060 includes a generally octagonal outer profile defining an outer surface 1060a extending between opposed top and bottom surfaces 1060b and 1060c, respectively. In embodiments, the base plate 1060 may include the same or different outer profile as the outer profile of the flywheel housing 1022, such as hexagonal, oval, circular, square, etc. In one non-limiting embodiment, the outer profile of the base plate 1060 is the same as the outer profile of the flywheel housing 1022. The top surface 1060b of the base plate defines a counterbore 1062 therein that extends towards the bottom surface 1060c and terminates at an inner surface 1062a. A plurality of recesses 1064 is defined within the inner surface 1062a extending towards the bottom surface 1060c. The plurality of recesses 1064 is configured to receive a corresponding plurality of base magnets 1066 therein such that the plurality of base magnets 1066 is constrained or otherwise inhibited from being manipulated relative to the base plate 1060. It is contemplated that each of the plurality of base magnets 1066 may be secured within each respective recess of the plurality of recesses 1064 using any suitable means, such as an interference fit, friction fit, adhesives, mechanical fasteners, etc. In embodiments, the inner surface 1062a of the counterbore 1062 may be planar (e.g., without the plurality of recesses) or may include a combination of planar portions and recesses 1064. In this manner, it is envisioned that the plurality of base magnets 1060 may be affixed to the planar inner surface 1062a of the counterbore 1062 using any suitable means, such as adhesives, mechanical fasteners, etc., or may include a first portion of the plurality of base magnets 1066 affixed to the planar inner surface 1062a and a second portion of the plurality of base magnets 1066 received within corresponding recesses of the plurality of recesses 1064.

As can be appreciated, the plurality of base magnets 1066 facing or adjacent to the magnetic levitation disk 1040 or the magnets 1042 of the magnetic levitation disk 1040 includes a pole opposite to the magnetic levitation disk 1040 or magnets 1042 (e.g., north vs. south or south vs. north) such that the magnetic levitation disk 1040 is urged in a direction away from the plurality of base magnets 1066. In this manner, the magnetic levitation disk 1040 is caused to float or levitate a distance away from the plurality of base magnets, thereby enabling the magnetic levitation disk 1040 to rotate freely and without friction between two otherwise contacting surfaces.

The magnetic levitation disk 1040 and the plurality of base magnets 1066 cooperate to provide enough repulsive force to maintain levitation of the magnetic levitation disk 1040 when one or more flywheels 1024 are disposed on the magnetic levitation disk 1040. In this manner, the magnetic levitation disk 1040 carries or otherwise supports the one or more flywheels 1024 and enables the rotation of the one or more flywheels 1024 freely and without friction between two otherwise contacting surfaces.

With continued reference to FIGS. 17 and 18, an aperture 1068 is defined through the inner surface 1062a of the counterbore 1062 of the base plate 1060 and extends through the bottom surface 1060c. The aperture 1068 is disposed at a center portion of the counterbore 1062 and includes an inner diameter that is configured to receive one or more bushings or bearings 1068 therein using any suitable means, such as interference fit, friction fit, adhesives, mechanical fasteners, etc. It is contemplated that the bearings 1068 may be bronze bushings (plain, oiled, grease grooved, graphite plugged, etc.), ball bearings (steel, ceramic, tungsten carbide, etc.), hydrodynamic bearings, hydrostatic bearings, magnets, etc., and combinations thereof. In one non-limiting embodiment, the bearings 1068 are ball bearings.

As can be appreciated, the flywheel shaft 1030 cooperates with the bearings 1068 to constrain the magnetic levitation disk 1040 to one degree of freedom (e.g., rotation), thereby enabling the magnetic levitation disk 1040, in combination with the plurality of base magnets 1066, to a employ pseudo-levitation method to enable the magnetic levitation disk 1040 to maintain separation from the base plate 1060.

The flywheel housing 1022 defines a generally octagonal outer profile having a plurality of apexes or corners 1022a, although any suitable outer profile may be utilized. A plurality of through-bores 1022b is formed through opposed upper and lower surfaces 1022c and 1022d adjacent each corner 1022a and each is configured to selectively receive a corresponding securement bolt of the plurality of securement bolts 1130, as will be described in further detail hereinbelow. Although generally described as being disposed adjacent each corner of the plurality of corners 1022a, it is contemplated that the plurality of through-bores 1022b may be defined at any suitable location and may include any suitable number of through-bores.

A gasket 1032 is interposed between each flywheel housing 1022 to form a vacuum tight seal between each flywheel housing 1022. In embodiments, each of the upper and lower surfaces 1022c, 1022d of the flywheel housing 1022 may include a recess or groove (not shown) that is configured to receive a respective gasket 1032 to locate or otherwise inhibit movement of the gasket 1030 relative to each flywheel housing 1022.

The vacuum plate 1070 includes a generally octagonal outer profile, although it is contemplated that the vacuum plate may include any suitable profile and may be the same or different than the outer profile of the flywheel housing 1022 of the flywheel segments 1020. The vacuum plate includes an outer surface 1070a extending between opposed upper and lower surfaces 1070b and 1070c, respectively. A boss 1072 is disposed at a center portion of the upper surface 1070b and extends longitudinally therefrom terminating at a top surface 1072a. A through-hole 1074 is defined through the top surface 1072a and extends through the lower surface 1070c. The through-hole 1074 includes an inner dimension that is configured to slidably and rotatably receive a portion of the flywheel shaft 1030 and a portion of the motor coupling 1080 therein. A pair of opposed counterbores 1072b is defined in the top surface 1072a and the lower surface 1070c respectively and each is concentric with the through-hole 1074. The pair of opposed counterbores 1072b is configured to retain a corresponding pair of bushings or bearings 1076 therein using any suitable means, such as interference fit, friction fit, adhesives, mechanical fasteners, etc. It is contemplated that the bearings 1076 may be bronze bushings (plain, oiled, grease grooved, graphite plugged, etc.), ball bearings (steel, ceramic, tungsten carbide, etc.), hydrodynamic bearings, hydrostatic bearings, magnets, etc., and combinations thereof. In one non-limiting embodiment, the bearings 1076 are ball bearings.

An annular groove 1070d is defined within the upper surface 1070b at a center portion thereof and substantially concentric with the boss 1072 and terminating at an annular surface 1070e. The annular groove 1070d is configured to rotatably receive a portion of the motor coupling 1080 as will be described in further detail hereinbelow. In embodiments, one or more cut-outs or slots (not shown) may be defined through the annular surface 1070e and extending through the lower surface 1070c to act as a plurality of stators or steel poles in a magnetic gear formed by the magnetic coupling 1050 and the motor coupling 1080, as will be described in further detail hereinbelow.

A vacuum port (not shown) is defined through the top surface 1070b of the vacuum plate 1070 and extends through the lower surface 1070c thereof. A vacuum pump 1120 is coupled to a portion of the vacuum plate 1070 and is in fluid communication with the vacuum port. The vacuum pump 1120 may be any suitable vacuum pump capable of evacuating air from a cavity or vessel, and in embodiments, where an ultra-high vacuum (UHV) environment is required, the vacuum pump 1120 may be an turbomolecular pump, a diffusion pump, or an ion pump to evacuate gas molecules off-gassed from the materials within the flywheel assembly 1010. As can be appreciated, the vacuum generated by the vacuum pump 1120 reduces drag on the plurality of flywheels 1024 as they rotate and enhances the efficiency of the magnetic coupling strength between the magnetic coupling 1050 and the motor coupling 1080.

The vacuum plate 1070 is formed from a non-magnetic material to minimize magnetic interference between the magnetic coupling 1050 and the motor coupling 1080 and enhance the efficiency of the magnetic coupling strength between the magnetic coupling 1050 and the motor coupling 1080. It is envisioned the vacuum plate may be formed from a non-metallic material, such as a ceramic, a polymer, etc., a metallic material such as aluminum, brass, titanium, etc., or any material having suitable strength and non-magnetic properties.

Continuing with FIGS. 17 and 18, the motor coupling 1080 includes a generally circular profile having an outer surface 1080a extending between opposed upper and lower surfaces 1080b and 1080c, respectively. Although generally described has having a circular profile, it is contemplated that the motor coupling 1080 may include any suitable profile, such as hexagonal, octagonal, square, oval, etc. and may be the same or different that the profile of the magnetic coupling 1050 and/or flywheels 1024.

The outer surface 1080a of the motor coupling 1080 defines an annular flange 1082 extending radially outward therefrom and adjacent the upper surface 1080b. The annular flange 1082 extends from the upper surface 1080b towards the lower surface 1080c and terminates at an annular surface 1082a. A boss 1084 is disposed on the upper surface 1080b at a center portion thereof and is configured to couple to or otherwise engage a corresponding portion of a motor or generator to effectuate rotation of the motor coupling 1080 as will be described in further detail hereinbelow. A counterbore 1086 is defined through the lower surface 1080c extending towards the upper surface 1080b and terminating at an inner surface 1086a. A protuberance 1088 is disposed on the inner surface 1086a of the counterbore 1086 and extends towards the lower surface 1080c. The protuberance 1088 includes an outer dimension that is configured to be received within a portion of a bearing 1076 of the vacuum plate 1070 such that the motor coupling 1080 is permitted to rotate relative to the vacuum plate 1070. The protuberance 1088 may be received within the portion of the bearing 1076 by any suitable means, such as interference fit, friction fit, adhesives, mechanical fasteners, etc.

The lower surface 1080c of the motor coupling 1080 include a plurality of recesses 1080d defined therein configured to receive a corresponding plurality of torque magnets 1090 therein. The plurality of torque magnets 1090 of the motor coupling 1080 is arranged in a circumferential manner to enable the plurality of torque magnets 1090 to act as a magnetic gear element in cooperation with the plurality of torque magnets 1054 of the magnetic coupling 1050. In this manner, each torque magnet of the plurality of torque magnets 1090 of the motor coupling 1080 is arranged in an alternating fashion, e.g., a pole of each respective magnet of the plurality of torque magnets 1090 alternates in a north, south, north, south, etc. fashion such that rotation of the motor coupling 1080 causes the plurality of torque magnets 1090 to repel and attract the plurality of torque magnets 1054 of the magnetic coupling 1050, thereby effectuating a corresponding rotation of the magnetic coupling 1050.

The magnetic coupling force between the plurality of torque magnets 1090 of the motor coupling 1080 and the plurality of torque magnets 1054 of the magnetic coupling 1050 acts as an axial-gap magnetic gear. In embodiments, the plurality of torque magnets 1090 of the motor coupling 1080 may include the same or different number of magnets as the plurality of torque magnets 1054 of the magnetic coupling 1050 depending upon the design needs of the flywheel assembly 1010. It is contemplated that the number of slots defined through the vacuum plate 1070 may be increased or decreased depending upon the design needs of the flywheel assembly 1010.

The top plate 1100 includes a profile generally similar to that of the flywheel housing 1022 of the flywheel segment 1020, although it is contemplated that the top plate 1100 may include any suitable profile, such as hexagonal, circular, oval, square, etc. The top plate 1100 is generally planar and includes an aperture 1102 defined longitudinally through a center portion thereof that is configured to receive a portion of the boss 1084 of the motor coupling 1080 such that the motor coupling 1080 may be operably coupled to a motor or generator using any suitable means, such as a spline, belt, gear, coupling, mechanical fasteners, etc., as will be described in further detail hereinbelow. A penetration 1104 is defined longitudinally through the top plate 1100 that is configured to receive electrical and/or communication wires therethrough. An electrical connector 1106 is disposed within or over the penetration 1104 and may be a bulkhead connector, surface connector, etc. In this manner, electrical wires (not shown) are operably coupled to a portion of the vacuum pump 1120 at a first end portion thereof and are operably coupled to a portion of the electrical connector 1106 at a second end portion thereof to electrically couple the electrical connector 1106 to the vacuum pump 1120. In embodiments, the electrical connector 1106 may be a pass-through connector such that electrical wires operably coupled to the vacuum pump 1120 may pass through the electrical connector 1106 and be operably coupled to an electrical device remote from the flywheel assembly 1010.

With continued reference to FIGS. 17 and 18, each of the base plate 1060, the flywheel housings 1022, vacuum plate 1070, and top plate 1100 are coupled to one another using the plurality of securement bolts 1130. In this manner, a gasket 1032 is interposed between each of the base plate 1060, the flywheel housings 1022, the vacuum plate 1070, and the top plate 1100 and the plurality of securement bolts 1130 is advanced within corresponding through-holes of each. Once the plurality of securement bolts 1130 is fully advanced within each through-hole, a corresponding plurality of nuts or other suitable mechanism is utilized to tighten and otherwise seal the base plate 1060, flywheel housings 1022, vacuum plate 1070, and top plate 1100 together to form a vacuum tight seal. Although generally described as being a bolt, it is contemplated that the plurality of securement bolts 1130 may be threaded rods, screws, or any suitable mechanism for coupling one or more components to one another.

Turning to FIG. 18, an embodiment with two or more flywheel assemblies 1010 coupled together is illustrated and generally identified by reference numeral 1200. Although generally illustrated as having two flywheel assemblies 1010, it is contemplated that the flywheel assembly 1200 may include any number of flywheel assemblies 1010 depending upon design needs and the amount of energy storage required.

The flywheel assembly 1200 includes a first, upper flywheel assembly 1210a and a second, lower flywheel assembly 1210b. The upper flywheel assembly 1210a is substantially similar to the flywheel assembly 1010 described hereinabove except that the flywheel shaft 1030 includes an internal spline 1230a that is configured to receive a corresponding external spline 1230b of a flywheel shaft 1030 of the lower flywheel assembly 1210b such that rotation of the flywheel shaft 1030 of the upper flywheel assembly 1210a effectuates a corresponding rotation of the flywheel 1030 of the lower flywheel assembly 1210b. Further, it is contemplated that the base plate 1060 of the upper flywheel assembly 1210a may include one or more vacuum ports (not shown) defined through the upper and lower surfaces 1260a, 1260b such that the vacuum pump 1120 may cause a vacuum within both the upper flywheel assembly 1210a and the lower flywheel assembly 1210b.

The lower flywheel assembly 1210b is substantially similar to the flywheel assembly 1024 described hereinabove except that the lower flywheel assembly 1210b does not include a magnetic coupling 1050, a vacuum plate 1070, a motor coupling 1080, and a top plate 1100. The upper most flywheel housing 1222 of the lower flywheel assembly 1210b is coupled to the base plate 1260 of the upper flywheel assembly 1210a using a plurality of bolts Turning to FIGS. 19-22, it is contemplated that the flywheel assembly 1010 may not include a flywheel shaft 1030. In this manner, each flywheel 1024 includes an annular groove 2000 defined in the upper and lower surfaces 1024a, 1024b in which a centering ring or key 2002 is disposed. It is contemplated that the centering ring 2002 may be received within the annular groove 2000 using any suitable means, such as interference fit, friction fit, welding, adhesives, mechanical fasteners, etc. and in one non-limiting embodiment, the centering ring 2002 is secured within the annular groove by a press fit.

The outer wall 1024c of each flywheel 1024 includes a plurality of channels 1024g defined therein and extending longitudinally and through each of the upper and lower surfaces 1024a, 1024b of the flywheel. The plurality of channels 1024f is configured to receive a respective tie bar 2004 therein. The tie bars 2004 are configured to fixedly couple each flywheel 1024 to one another such that each flywheel 1024 is inhibited from separating longitudinally from one another. It is contemplated that the tie bars 2004 may be coupled to the flywheels 1024 using any suitable means, such as mechanical fasteners, welding, adhesives, etc.

Figure 20:
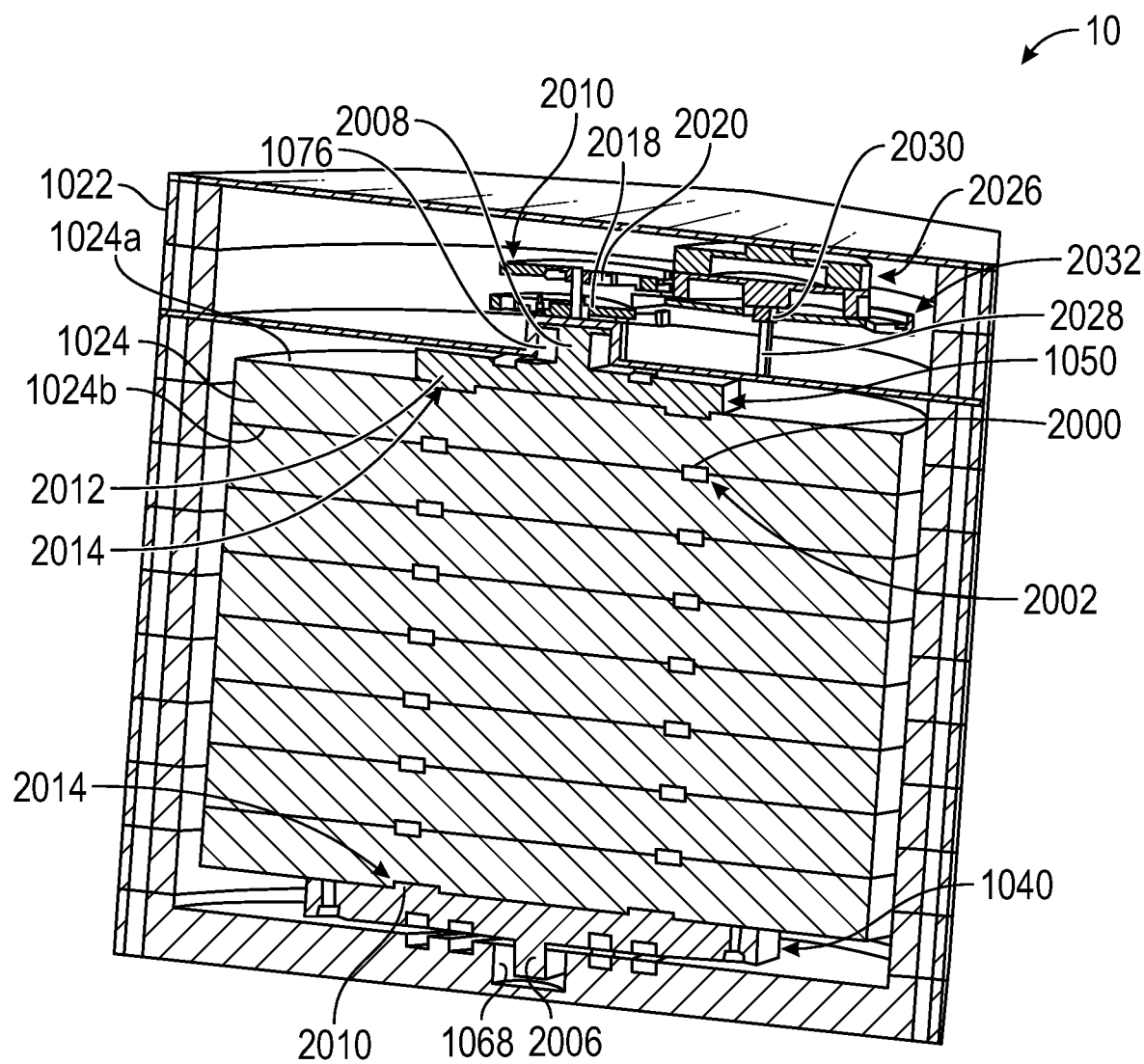
FIG. 20 is a cross-sectional view of the flywheel assembly of FIG. 19.

In the instance where the flywheel assembly 1010 does not include a flywheel shaft 1030, it is envisioned that the magnetic levitation disk 1040 and the magnetic coupling 1050 may include a respective boss 1006 and 1008 disposed thereon that are configured to be received within the bearings 1068 of the base plate 1060 and the bearings 1076 of the vacuum plate 1070. With reference to FIG. 20, each of the magnetic levitation disk 1040 and the magnetic coupling 1050 include an annular boss 2010 and 2012 disposed on the upper surface 1050a and lower surface 1040b thereof, respectively. Each of the annular bosses 2010, 2012 of the magnetic levitation disk 1040 and the magnetic coupling 1050, respectively, is configured to be received within a respective annular groove 2014 defined in each respective adjacent flywheel 1024 to axially align each of the magnetic levitation disk 1040 and the magnetic coupling 1050 with the flywheels 1024. It is envisioned that the magnetic levitation disk 1040 and the magnetic coupling 1050 may be fixedly coupled to each respective adjacent flywheel 1024 using any suitable means, such as mechanical fasteners, interference fit, welding, adhesives, etc.

Figure 21:
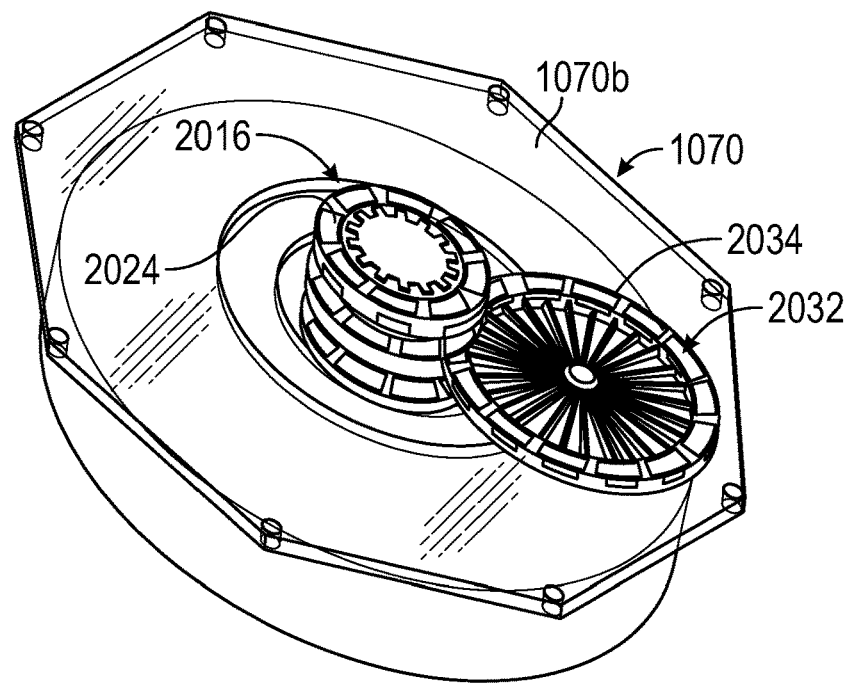
FIG. 21 is a top, perspective view of a magnetic gear assembly of the flywheel assembly of FIG. 19.
Figure 22:
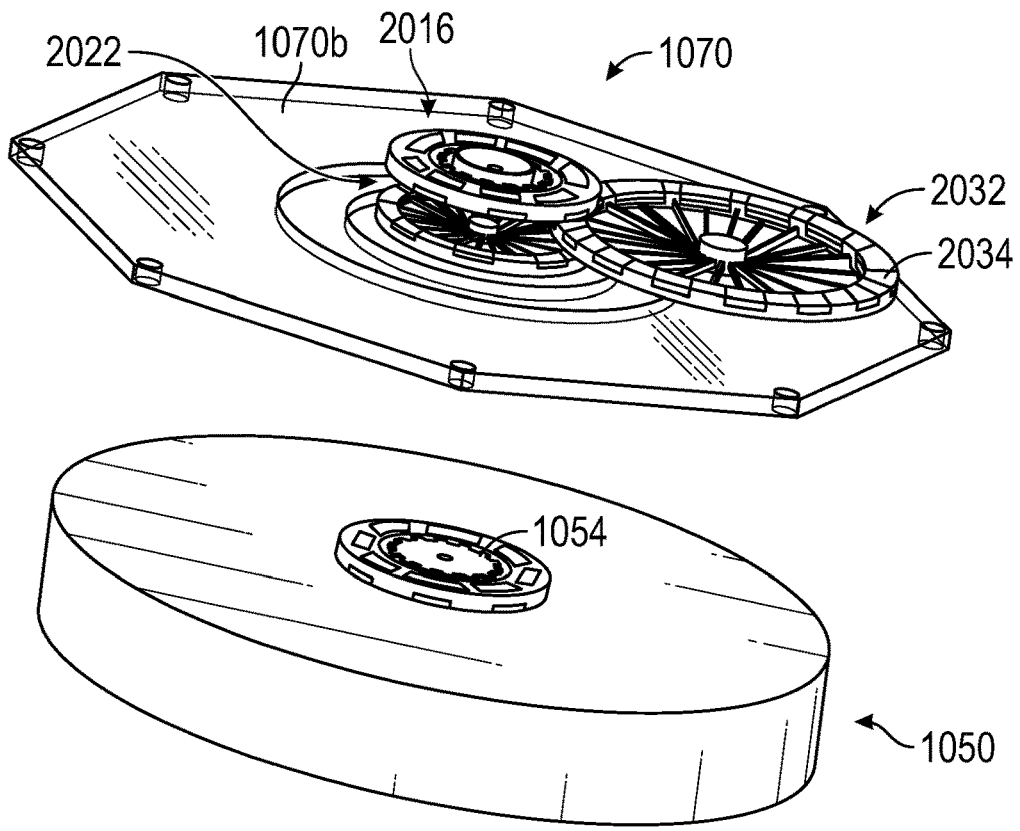
FIG. 22 is a perspective view of the magnetic gear assembly of FIG. 21.

With reference to FIGS. 20-22, it is contemplated that the flywheel assembly 1010 may include a pair of magnetic gears 2016 rotatably supported on the upper surface 1070b of the vacuum plate 1070 using any suitable means, such as a shaft or spindle 2018. In this manner, it is contemplated that the spindle 2018 may be fixedly secured to a center portion of the upper surface 1070b of the vacuum plate 1070 using any suitable means, such as welding, adhesives, interference fit, friction fit, mechanical fasteners, etc. In this manner, each of the pair of magnetic gears 2016 may include a bearing or bushing 2020 coupled thereto and configured to receive a portion of the spindle therein thereby enabling the pair of magnetic gears 2016 to rotate about the spindle 2018. In embodiments, the spindle 2018 may be rotatably supported on the upper surface 1070b of the vacuum plate 1070 using bearings, bushings, etc. In this manner, the pair of magnetic gears 2016 may be fixedly coupled to the spindle 2018 using any suitable means, such as interference fit, friction fit, welding, adhesives, mechanical fasteners, etc. such that the pair of magnetic gears 2016 and the spindle 2018 rotate in unison within the bearings disposed in the vacuum plate 1070.

The pair of magnetic gears 2016 are axially aligned and longitudinally spaced apart from one another such that a gap 2022 is defined therebetween. Each of the pair of magnetic gears 2016 includes a plurality of torque magnets 2024 therein. The plurality of torque magnets 2024 of the pair of magnetic gears 2016 is arranged in a circumferential manner to enable the plurality of torque magnets 2024 to act as a magnetic gear element in cooperation with the plurality of torque magnets 1054 of the magnetic coupling 2050. In this manner, each torque magnet of the plurality of torque magnets 2024 of the pair of magnetic gears 2016 is arranged in an alternating fashion, e.g., a pole of each respective magnet of the plurality of torque magnets 2024 alternates in a north, south, north, south, etc. fashion such that rotation of the pair of magnetic gears 2016 causes the plurality of torque magnets 2024 to repel and attract the plurality of torque magnets 1054 of the magnetic coupling 1050, thereby effectuating a corresponding rotation of the magnetic coupling 1050.

The magnetic coupling force between the plurality of torque magnets 2024 of the pair of magnetic gears 2016 and the plurality of torque magnets 1054 of the magnetic coupling 1050 acts as an axial-gap magnetic gear. In embodiments, the plurality of torque magnets 2024 of the pair of magnetic gears 2016 may include the same or different number of magnets as the plurality of torque magnets 1054 of the magnetic coupling 50 depending upon the design needs of the flywheel assembly 1010.

In embodiments, the flywheel assembly 1010 may include a motor coupling gear 2026 rotatably supported on the upper surface 1070b of the vacuum plate 1070 using any suitable means, such as a shaft or spindle 2028. In this manner, it is contemplated that the spindle 2028 of the motor coupling gear 2026 may be fixedly secured to a portion of the upper surface 1070b of the vacuum plate 1070 at a location that is radially offset from the pair of magnetic gears 2016 using any suitable means, such as welding, adhesives, interference fit, friction fit, mechanical fasteners, etc. In this manner, the motor coupling gear 2026 may include a bearing or bushing 2030 coupled thereto and configured to receive a portion of the spindle 2028 therein thereby enabling the motor coupling gear 2026 to rotate about the spindle 2028. In embodiments, the spindle 2028 of the motor coupling gear 2026 may be rotatably supported on the upper surface 1070b of the vacuum plate 1070 using bearings, bushings, etc. In this manner, the magnetic coupling gear 2026 may be fixedly coupled to the spindle 2028 using any suitable means, such as interference fit, friction fit, welding, adhesives, mechanical fasteners, etc. such that the motor coupling gear 2026 and the spindle 2028 rotate in unison within the bearings disposed in the vacuum plate 1070.

The motor coupling gear 2026 includes a radial flange 2032 disposed thereon and extending radially therefrom. The radial flange 2032 of the motor coupling gear 2026 is configured to be received within the gap 2022 defined between the pair of magnetic gears 2016 and includes a plurality of torque magnets 2034 disposed thereon. The plurality of torque magnets 2034 of the motor coupling gear 2026 is arranged in a circumferential manner to enable the plurality of torque magnets 2034 to act as a magnetic gear element in cooperation with the plurality of torque magnets 2024 of the pair of magnetic gears 2016. In this manner, each torque magnet of the plurality of torque magnets 2034 of the moto coupling gear 2026 is arranged in an alternating fashion, e.g., a pole of each respective magnet of the plurality of torque magnets 2034 alternates in a north, south, north, south, etc. fashion such that rotation of the motor coupling gear 2026 causes the plurality of torque magnets 2034 to repel and attract the plurality of torque magnets 2024 of the pair of magnetic gears 2016, thereby effectuating a corresponding rotation of the pair of magnetic gears 2016.

The magnetic coupling force between the plurality of torque magnets 2034 of the motor coupling gear 2026 and the plurality of torque magnets 2024 of the pair of magnetic gears 2016 acts as an axial-gap magnetic gear. In embodiments, the plurality of torque magnets 2034 of the motor coupling gear 2026 may include the same or different number of magnets as the plurality of torque magnets 2024 of the pair of magnetic gears 2016 depending upon the design needs of the flywheel assembly 1010. As can be appreciated, the motor coupling gear is configured to couple to or otherwise engage a corresponding portion of a motor or generator to effectuate rotation of the motor coupling gear 2026.

Figure 23:
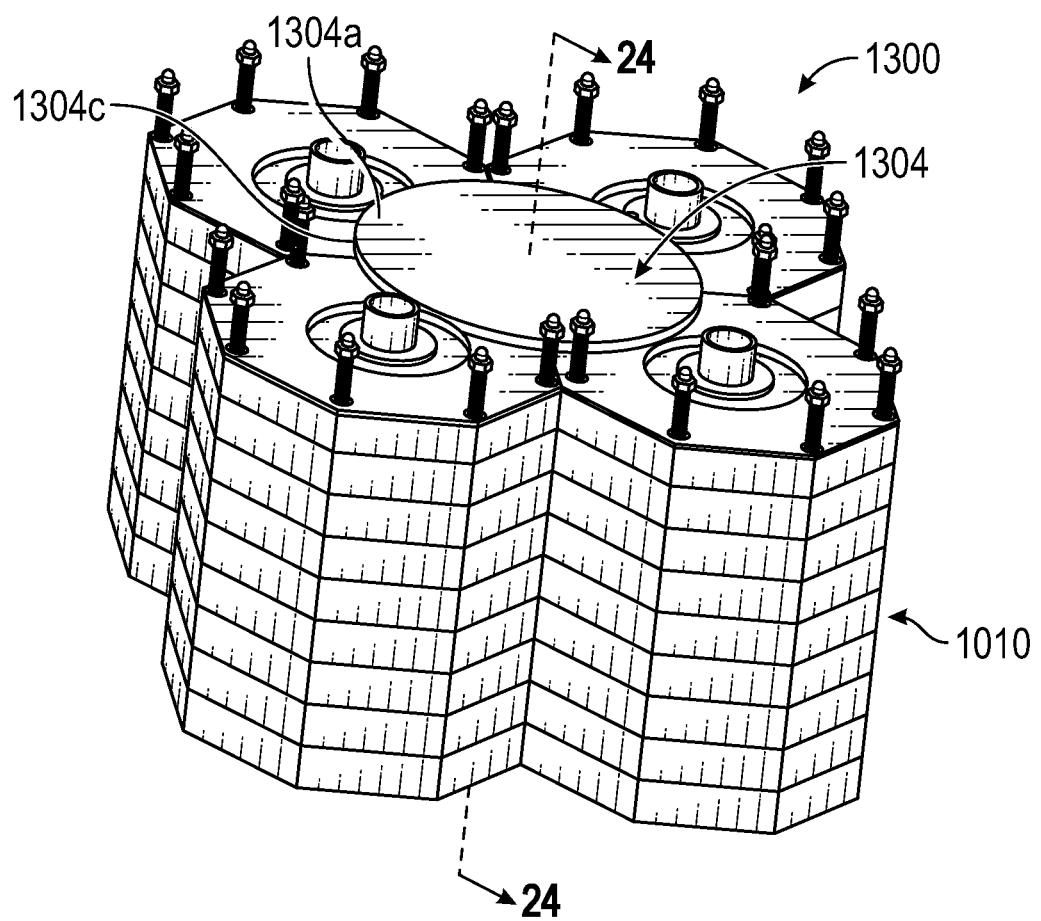
FIG. 23 is a perspective view of a flywheel pod including four flywheel assemblies of FIG. 17.
Figure 24:
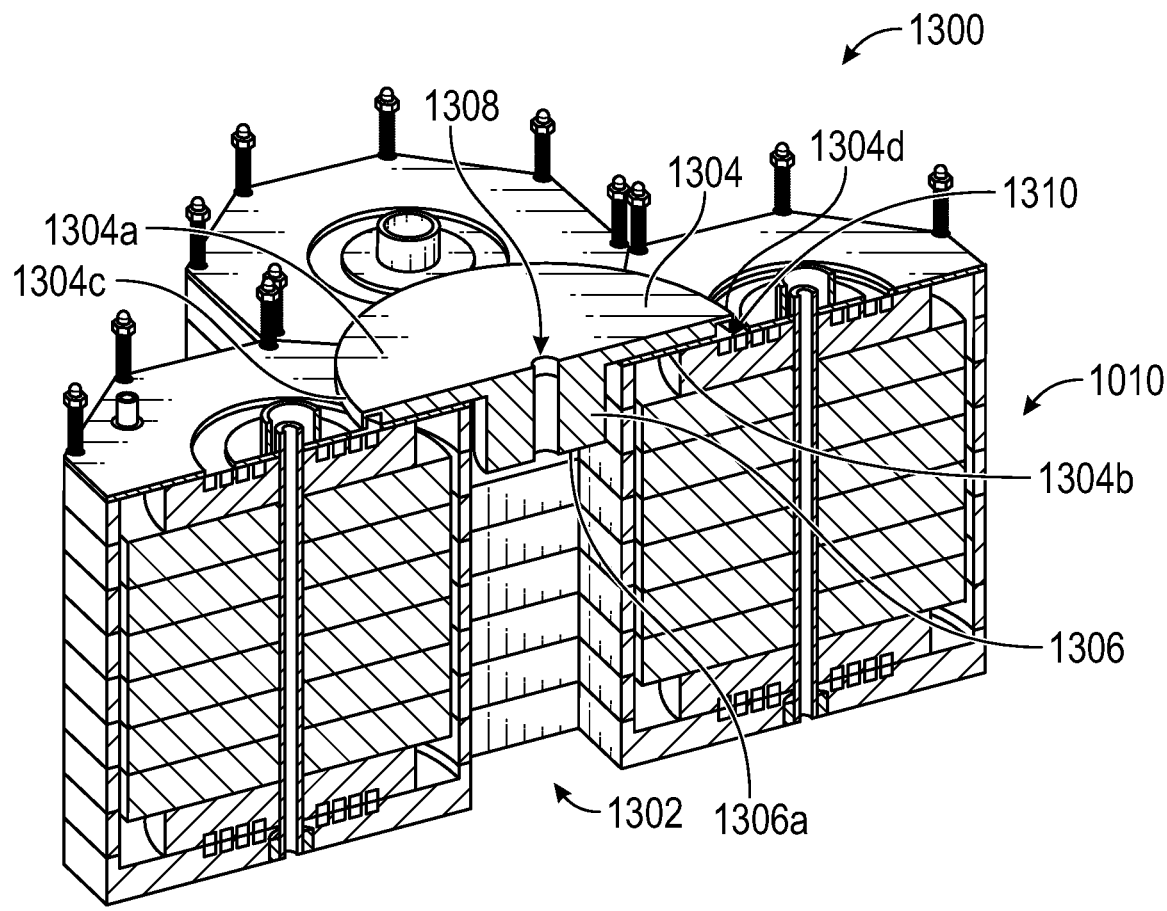
FIG. 24 is a cross-sectional view of the flywheel pod of FIG. 23 taken along section line 24-24 of FIG. 23.

With reference to FIGS. 23 and 24, a pod 1300 of flywheel assemblies 1010 is illustrated. The pod 1300 includes two or more flywheel assemblies 1010 disposed adjacent and spaced apart from one another to define a channel 1302 therebetween. It is contemplated that the pod 1300 may include any suitable number of flywheel assemblies 1010, such as three, four, five, six, etc. and in one non-limiting embodiment includes four flywheel assemblies 1010. The flywheel assemblies 1010 are disposed in a circular pattern such that the center channel 1302 is defined at a center portion thereof. In embodiments, any suitable pattern defining a center channel 302 may be utilized, such as square, oval, hexagonal, pentagonal, octagonal, etc.

Each flywheel assembly 1010 of the pod 1300 is substantially similar to the flywheel assembly 1010 described hereinabove except that each flywheel assembly 1010 of the pod 1300 does not include a motor coupling 1080 or top plate 1100. The pod 1300 includes a central motor coupling 1304 rotatably disposed at least partially within the center channel 1302. The central motor coupling 1304 defines a generally circular profile having opposed upper and lower surfaces 1304a and 1304b, respectively, and an outer surface 1304c extending longitudinally therebetween. A boss 1306 is disposed on the lower surface 1304b of the central motor coupling 1304 and extends longitudinally therefrom and terminating at an end surface 1306a. A bore 1308 is defined through the upper surface 1304a and extends through the end surface 1306a. The bore 1308 is configured to be coupled to a motor or generator (not shown) such that rotation of the motor effectuates a corresponding rotation of the central motor coupling 1304. It is contemplated that the motor may be coupled to the central motor coupling 1304 using any suitable means, such as a spline, interference fit, friction fit, adhesives, welding, mechanical fasteners, etc.

The lower surface 1304b of the central motor coupling 1304 includes a plurality of recesses 1304d defined therein configured to receive a corresponding plurality of torque magnets 1310 therein. The plurality of torque magnets 1310 of the central motor coupling 1304 is arranged in a circumferential manner to enable the plurality of torque magnets 1310 to act as a magnetic gear element in cooperation with the plurality of torque magnets 1054 of the magnetic coupling 1050 of each of the flywheel assemblies 1010 of the pod 1300. In this manner, each torque magnet of the plurality of torque magnets 1310 of the central motor coupling 1304 is arranged in an alternating fashion, e.g., a pole of each respective magnet of the plurality of torque magnets 1310 alternates in a north, south, north, south, etc. fashion such that rotation of the central motor coupling 1304 causes the plurality of torque magnets 1310 to repel and attract the plurality of torque magnets 1054 of the magnetic coupling 1050 of each respective flywheel assembly 1010, thereby effectuating a corresponding rotation of the magnetic coupling 1050 of each respective flywheel assembly 1010.

The magnetic coupling force between the plurality of torque magnets 1310 of the central motor coupling 1304 and the plurality of torque magnets 1054 of the magnetic coupling 1050 acts as an axial-gap magnetic gear. In embodiments, the plurality of torque magnets 1310 of the central motor coupling 1304 may include the same or different number of magnets as the plurality of torque magnets 1054 of the magnetic coupling 1050 depending upon the design needs of the flywheel assembly 1010.

In one embodiment, the flywheel pods 1300 are encased in concrete. This can mitigate some of the moisture and environmental needs of the flywheel pods. Further, such a configuration is particularly suited for placement in underground levels of buildings and other structures and prevents them from being vandalized otherwise damaged.

Figure 25:
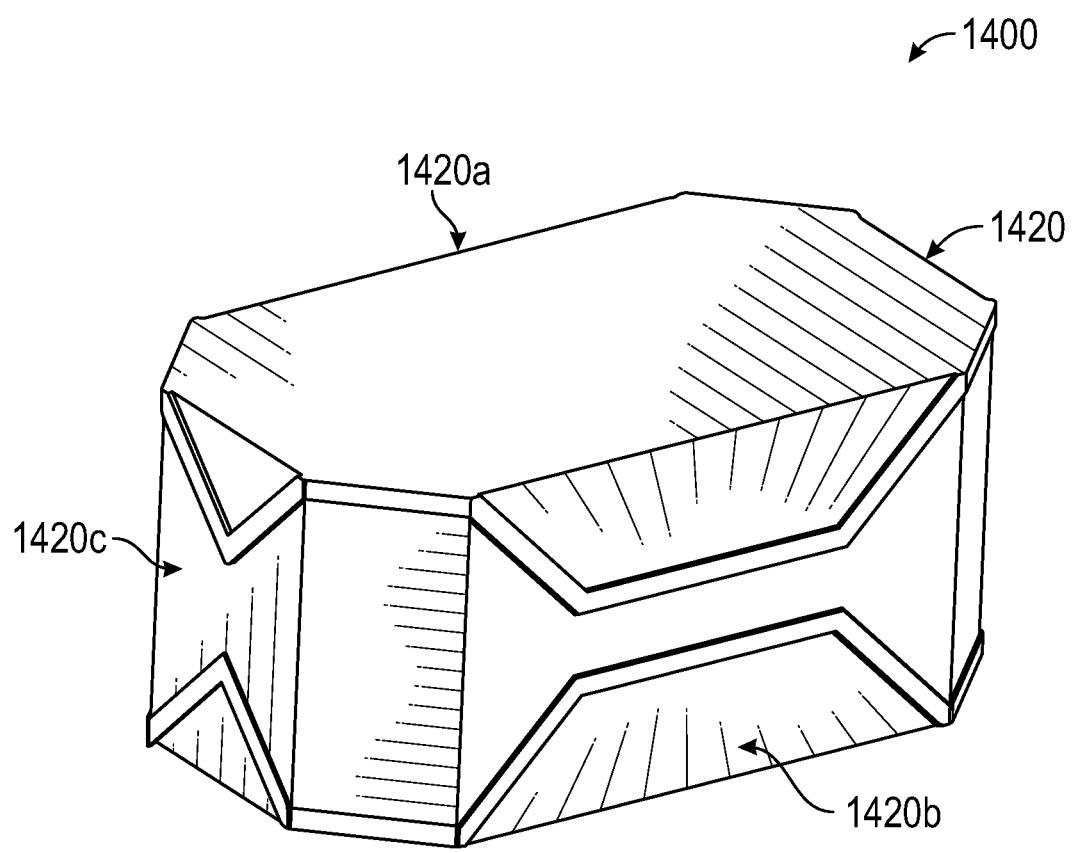
FIG. 25 is a perspective view of a housing of a renewable energy generation system provided in accordance with the present disclosure.
Figure 26:
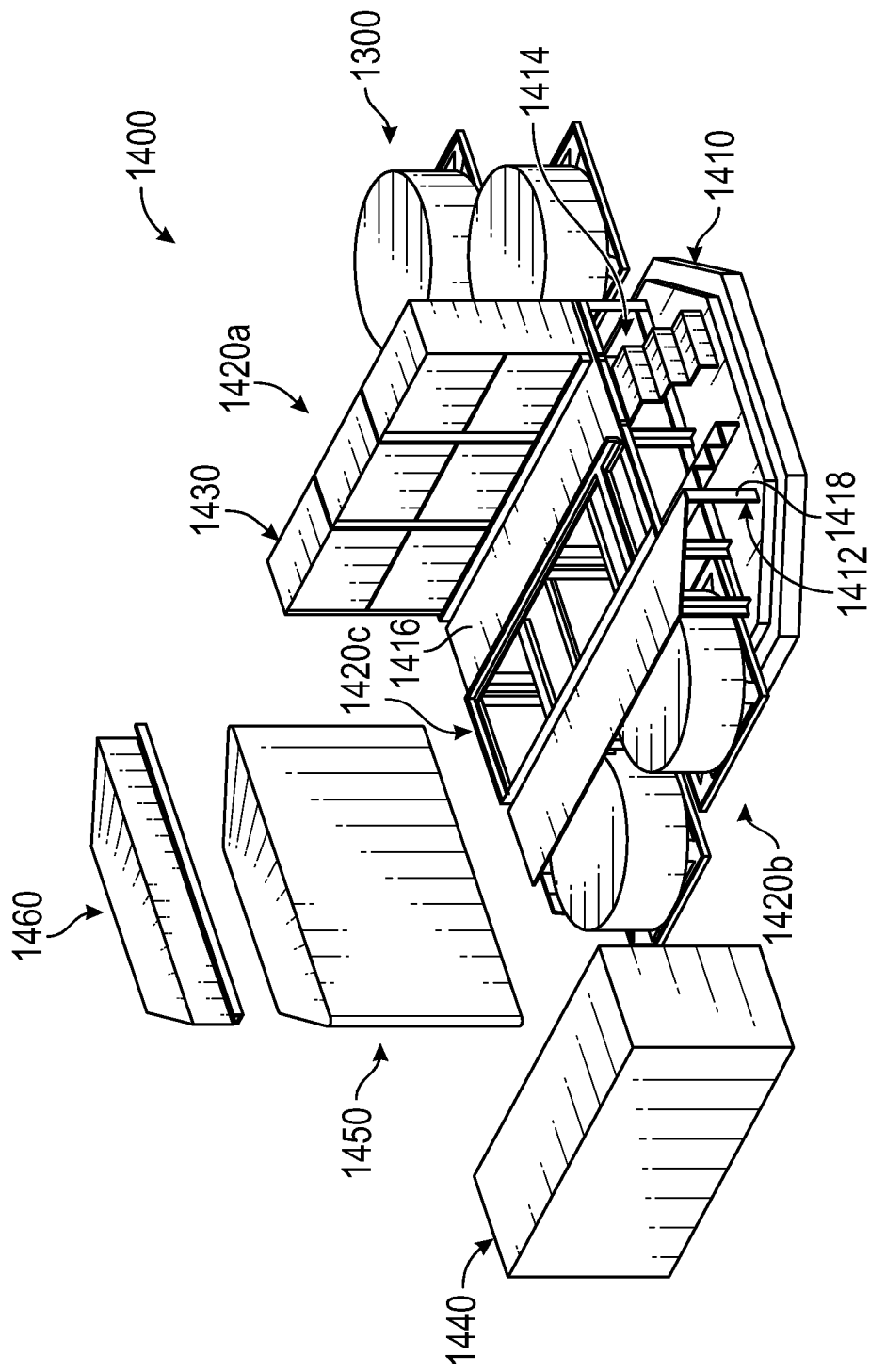
FIG. 26 is an exploded, perspective view of an interior portion of the housing of FIG. 25.
Figure 27:
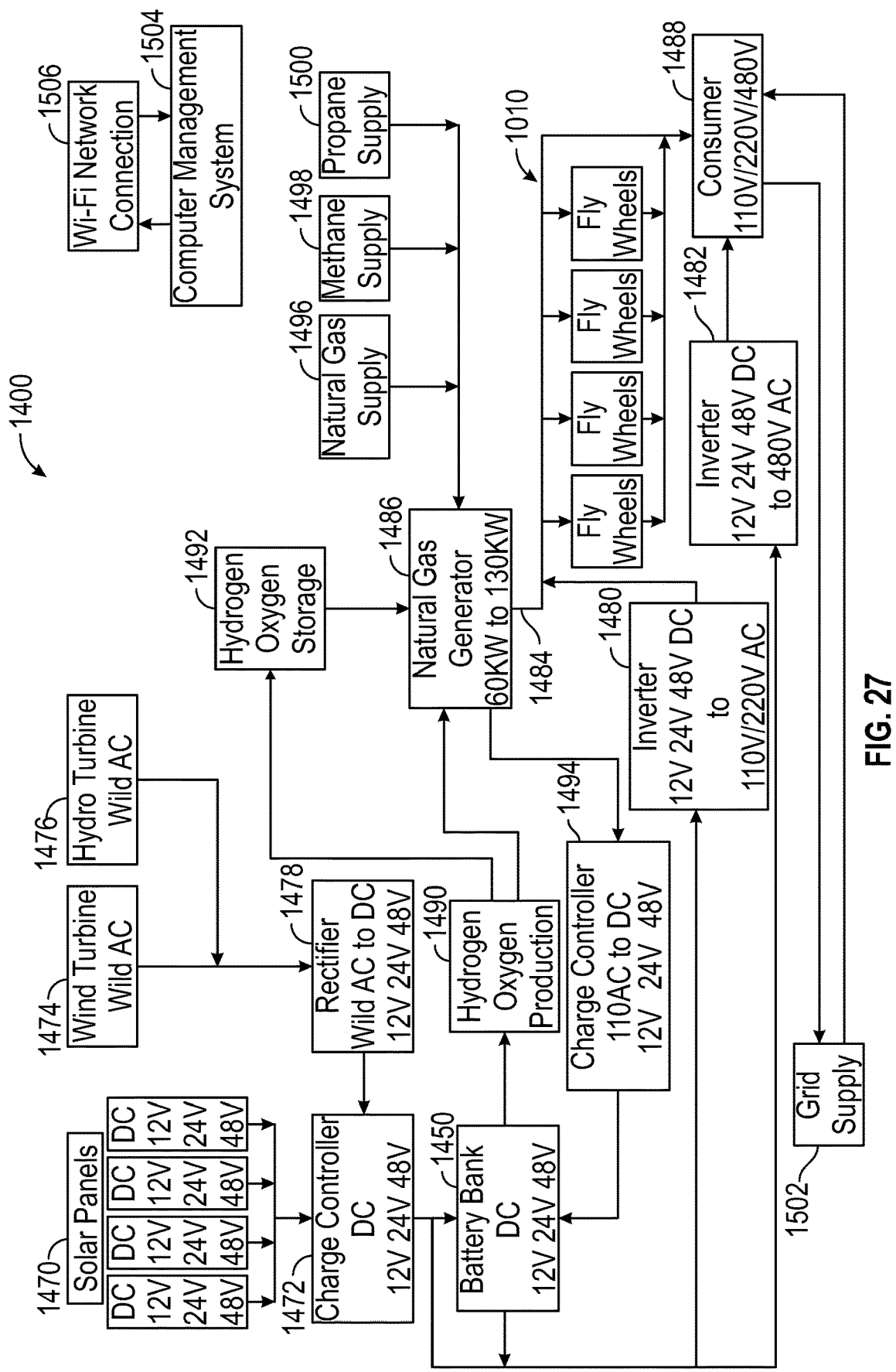
FIG. 27 is a schematic view of the renewable energy generation system of FIG. 25.

With reference to FIGS. 25-27, a renewable energy generation system in which the flywheel assemblies 1010 is utilized is illustrated and generally identified by reference numeral 1400. The renewable energy generation system 1400 includes a foundation 1410, a housing 1420 in which hydrogen generators 1430, a propane generator 1440, a battery storage compartment 1450, a reserve water tank 1460, and flywheel pods 1300 are disposed.

The frame or superstructure 1412 is disposed on the foundation 1410, such as a concrete foundation, steel foundation, stone foundation, etc. The frame 1412 defines a plurality of cavities 1414 between the foundation 1410 and a support floor 1416 spaced apart from the foundation 1410 and supported by a plurality of beams 1418. Each cavity of the plurality of cavities 1414 is configured to receive a corresponding flywheel pod 1300. It is envisioned that the flywheel pods 1300 may be disposed on a rolling tray or structure that is configured to permit the flywheel pods 1300 to be easily removed from or advanced within a respective cavity of the plurality of cavities 1414.

The support floor 1416 supports the hydrogen generators 1430 at a first side 1420a of the housing 1420 and the propane generators 1440 at an opposite, second side 1420b of the housing 1420. The hydrogen generators 1430 and the propane generators 1440 are each disposed over a corresponding set of flywheel pods 1300 such that each of the hydrogen generators 1430 and propane generators 1440 may be operably coupled to respective central motor couplings 1304 of each respective flywheel pod 1300. In this manner, rotation of a portion of the hydrogen generators 1430 and a portion of the propane generators 1440 effectuates a corresponding rotation of each flywheel assembly 1010 within each respective flywheel pod 1300 to store rotational energy. Although generally described as being a hydrogen generator and a propane generator, it is contemplated that the system 1400 may include any suitable type of generator, such as electric, gasoline, diesel, solar powered, etc.

The support floor 1416 supports the battery storage compartment 1450 at a first end portion 1420c of the housing 1420 (e.g., that is opposite an entrance to the housing 1420) and is interposed between the hydrogen generator 1430 and the propane generator 1440. The battery storage compartment 1450 includes a plurality of batteries disposed therein that is operably coupled to each of the hydrogen generator 1430, the propane generator 1440, and the plurality of flywheel pods 1300 such that energy generated and/or stored by each of the hydrogen generator 1430, the propane generator 1440, and the plurality of flywheel pods 1300 may be stored therein for selective discharge. The reserve water tank 1460 is disposed on the battery storage compartment 1450 and is configured to store water therein. The reserve water tank 1460 is operably coupled to the hydrogen generator 1430 such that when the hydrogen generator 1430 requires additional water, the hydrogen generator 1430 may draw water from the reserve water tank 1460.

Turning to FIG. 27, a schematic view of the renewable energy generation system 1400 is illustrated. The renewable energy generation system 1400 includes one or more solar panels 1470 operably coupled to a first charge controller 1472. In embodiments, the renewable energy generation system 1400 also includes one or more wind turbines 1474 and/or one or more hydrodynamic turbines 1476. The wind turbines and hydrodynamic turbines are operably coupled to a rectifier 1478, which in turn, is operably coupled to the first charge controller 1472. The first charge controller 1472 is operably coupled to the battery storage compartment or battery bank 1450 such that electrical energy generated by the solar panels 1470, the wind turbines 1474, and/or the hydrodynamic turbines 1476 may be stored therein.

The battery storage compartment 1450 is operably coupled to a first inverter 1480 and a second inverter 1482, each of which is configured to convert the Direct Current (DC) electrical energy stored within the battery storage compartment 1450 into Alternating Current (AC) electrical energy. The first inverter 1480 is operably coupled to an electrical energy output 1484 of the generator, which may be a hydrogen generator 1430, a propane generator 1440, a natural gas generator 1486, etc. In one non-limiting embodiment, the generator is a natural gas generator 1486. The electrical energy output 1484 is operably connected to a consumer 1488 (e.g., meter box, service, etc.). The second inverter 1482 is operably coupled to the consumer 1488, such that electrical energy stored within the battery storage compartment 1450 may be directly transmitted to the consumer 1488.

The battery storage compartment 1450 is operably coupled to a hydrogen oxygen production module 1490, which in turn, is operably coupled to the natural gas generator 1486 and a hydrogen oxygen storage compartment 1492. As can be appreciated, the hydrogen oxygen storage compartment 1492 stores excess hydrogen and oxygen, or in embodiments, oxyhydrogen, which may be selectively drawn by the natural gas generator 1486. A portion of the electrical energy generated by the natural gas generator 1486 may be transmitted to a second charge controller 1494, which in turn, is operably coupled to the battery storage compartment 1450 such that electrical energy generated by the natural gas generator 1486 may be stored within the battery storage compartment 1450.

In embodiments, the renewable energy generation system 1400 may include one or more of a natural gas supply 1496, a methane supply 1498, and/or a propane supply 1500. Each of the natural gas supply 1496, the methane supply 1498, and the propane supply 1500 is operably coupled to the natural gas generator 1486 to provide fuel thereto.

It is envisioned that the consumer 1488 may be operably coupled to an electrical grid 1502. In this manner, the consumer 1488 may draw electrical energy from the grid 1502, or in instances where the renewable energy generation system 1400 generates excess electrical energy (e.g., more electrical energy than is being utilized by the consumer or when the battery storage compartment is fully charged), the excess electrical energy may be transmitted from the consumer back into the grid. In this manner, the renewable energy generation system 1400 includes a computer management system 1504 having a wireless (WiFi) transmitter or wireless network connection 1506 operably coupled thereto. In this manner, the computer management system 1504 may communicate wirelessly to a remote computer or user device such that a user may monitor or otherwise control the renewable energy generation system 1400 remotely. The wireless transmitter 1506 may be any suitable wireless transmitter capable of wirelessly transmitting communication data to a remote computer or user device (not shown), such as a WiFi transmitter conforming to IEEE standards or any other suitable wireless protocol. The wireless transmitter 1506 is in electrical communication with the computer management system 1506, such that information pertaining to the operation of the renewable energy generation system 1400 that is collected by a processor associated with the computer management system 1504 may be wirelessly transmitted by the wireless transmitter 1506 to the remote computer or user device. In this manner, alarms and/or messages generated by the processor of the computer management system 1504 are wirelessly transmitted by the wireless transmitter 1506 and received by the computer or user device to alert a user to a fault in the renewable energy generation system 1400.

In embodiments, the computer management system 1504 monitors the renewable energy generation system 1400, and in particular, the battery storage compartment 1450, the natural gas generator 1486, the flywheel assemblies 1010, etc., and controls how the generated energy is stored, utilized, and/or generated. In embodiments, the computer management system 1504 directs the renewable energy generation system 1400 to deliver electrical energy to the consumer 1488 solely from the battery storage compartment 1450 if the load (e.g., electrical energy utilized by the consumer 1488) is 10 kW or less. If the computer management system 1504 identifies that the load increases to 9 kW, the computer management system 1504 instructs the flywheel assemblies 1010 to engage the natural gas generator 1486 and generate electrical energy. As the load increases to over 10 kW, the computer management system 1504 instructs the battery storage compartment 1450 to stop transmitting electrical energy to the consumer 1488 and receive electrical energy from the natural gas generator 1486 via the energy provided by the flywheel assemblies 1010 to charge the batteries within the battery storage compartment 1450.

In embodiments, the computer management system 1486 instructs the flywheel assemblies 1010 to provide energy is the load is between 11 kW and 40 kW. If the computer management system 1486 identifies that the load is 36 kW, it will instruct the natural gas generator 1486 to operate and be in a ready state (e.g., be ready to provide electrical energy to the consumer 1488). At a load of 41 kW, the computer management system 1486 instructs the flywheel assemblies 1010 to stop supplying energy and begin receiving energy from the natural gas generator 1486 to charge the flywheel assemblies 1010. At this point, at a load above 41 kW, the natural gas generator 1486 provides all of the electrical energy to the consumer 1488.

Turning now to FIGS. 28-31, a hydrogen generator system is illustrated and generally identified by reference numeral 1600. The hydrogen generator system 1600 includes a hydrogen generation system 1602, an electrical generation system 1700, and a computer management system 1800 operably coupled to each of the hydrogen generation system 1602 and the electrical generation system 1700.

The hydrogen generation system 1602 includes an electrical power supply 1604 that is operably coupled to a hydrogen generator 1606 such that electrical energy is supplied to the hydrogen generator 1606 by the electrical power supply 1604. It is contemplated that the electrical power supply 1604 may be any suitable power supply capable of supplying electrical energy to the hydrogen generator 1606 and the various components of the hydrogen generator system 1600, and in embodiments, may supply 120 VAC, 220 VAC, 240 VAC, a DC voltage such as 12 VDC, 24 VDC, 48 VDC, etc.

The hydrogen generator 1606 is configured to produce a hydrogen/oxygen gas mixture from a water supply (not shown) that is stored therewithin using electrical energy supplied by the electrical power supply 1604. In this manner, the hydrogen generator 1606 uses electrolysis to split the water into hydrogen and oxygen gas, which is usable by the hydrogen generator system 1600 to generate electrical energy, as will be described in further detail hereinbelow. Although generally described as being an electrolysis hydrogen generator, it is contemplated that the hydrogen generator 1606 may be any suitable method of generating hydrogen, such as chemically assisted electrolysis, radiolysis, thermolysis, thermochemical, ferrosilicon, photobiological water splitting, etc. In one non-limiting embodiment, the hydrogen generator 1602 is a Proton Exchange Membrane (PEM) hydrogen generator.

The hydrogen-oxygen gas mixture generated by the hydrogen generator 1606 is transmitted to a gas bubbler 1608 using any suitable means, such as a gas line 1610, amongst others. The gas bubbler 1608 includes one or more chambers (not shown) defined therein that are partially filled with water. The hydrogen-oxygen mixture transmitted from the hydrogen generator 1606 is fed into the water of each chamber of the gas bubbler 1608 such that the hydrogen-oxygen gas mixture flows through the water and is captured in a vacant space (not shown) disposed above the waterline of each chamber of the gas bubbler 1608. In this manner, the water disposed in the gas bubbler 1608 acts as a filter to scrub impurities from the hydrogen-oxygen gas mixture and acts as a one-way valve such that the hydrogen-oxygen gas mixture is inhibited from flowing back towards the hydrogen generator 1606. As can be appreciated, the one-way valve property of the gas bubbler 1608 also serves as a flash arrestor and/or safety device to inhibit the propagation of fire towards the hydrogen generator 1606. It is envisioned that the gas bubbler 1608 may be any suitable gas bubbler capable of permitting gas to flow into and out of water, and in embodiments, may be an oil bubbler or a mercury bubbler depending upon the design needs of the hydrogen generation system 1600.

The filtered hydrogen-oxygen gas mixture is transmitted from the gas bubbler 1608 to one or more desiccant dryers 1612 using the gas line 1610. The desiccant dryers 1612 remove moisture from the hydrogen-oxygen gas mixture as the hydrogen-oxygen gas mixture flows therethrough to ensure that the hydrogen-oxygen gas mixture is substantially free of moisture. It is contemplated that the desiccant dryer 1612 may be an absorbent type or an adsorbent type, and in embodiments, may be a regenerative desiccant dryer. In embodiments, the desiccant dryers 1612 may be operably coupled to the electrical power supply 1604. As can be appreciated, the desiccant dryer 1612 may also serve as a flash arrestor and safety device by inhibiting the propagation of fire towards the hydrogen generator 1606. It is envisioned that the hydrogen generation system 1602 may include any suitable number of desiccant dryers depending upon the design needs of the hydrogen generator system 1600, such as one, two, three, etc.

The hydrogen-oxygen gas mixture is transmitted from the desiccant dryers 1612 to a super-charger 1614 via the gas line 1610. An air intake 1616 is operably coupled to the gas line 1610 at a location interposed between the desiccant dryers 1612 and the super-charger 1614. In this manner, ambient air is introduced into the hydrogen-oxygen gas mixture via the air intake 1616 and is mixed with the hydrogen-oxygen gas mixture within the super-charger 1614. As can be appreciated, the amount of air mixed into the hydrogen-oxygen gas mixture is varied by the computer management system 1800 to ensure that a predetermined amount of air is mixed with the hydrogen-oxygen gas mixture, as will be described in further detail hereinbelow. The super-charger 1614 compresses the hydrogen-oxygen-air mixture using a compressor (not shown) that may be electrically or mechanically driven (e.g., electrical motor, an engine, etc.). It is envisioned that the super-charger 1614 may be any suitable type of compressor capable of compressing the hydrogen-oxygen-air mixture to the desired pressure, such as a positive displacement compressor, a dynamic compressor, etc. In embodiments, the supercharger 1614 is configured to compress the hydrogen-oxygen-air mixture to a pressure of 2 psi.

The compressed hydrogen-oxygen-air mixture is transmitted from the super-charger 1614 to a storage chamber 1618 via the gas line 1610. The storage chamber 1618 stores a predetermined amount of the hydrogen-oxygen-air mixture within a chamber (not shown) defined therein at a predetermined maximum pressure (e.g., 2 psi). In this manner, the hydrogen-oxygen-air mixture is compressed by the super-charger 1614 against the pressure within the storage chamber 1618. In embodiments, the storage chamber 1618 includes a volume capable of storing an amount of the hydrogen-oxygen-air mixture to supply a combustion cylinder 1626 for approximately 5-10 minutes, although it is contemplated that the storage chamber 1618 may be any suitable size and any number of storage chambers 1618 may be utilized to increase or decrease the amount of the hydrogen-oxygen-air mixture that can be stored.

The pressure within the storage chamber 1618 is monitored by a pressure switch 1620 that is operably coupled thereto. The pressure switch 1620 is configured to send a first signal to the computer management system 1800 once a predetermined upper pressure within the storage chamber 1618 has been reached, which in turn, causes the hydrogen generator 1606 to turn off or otherwise stop producing the hydrogen-oxygen gas mixture. The pressure switch 1620 is configured to send a second signal to the computer management system 1800 once a predetermined lower pressure has been reached, which in turn, causes the hydrogen generator 1606 to turn on and otherwise start producing the hydrogen-oxygen gas mixture.

The hydrogen-oxygen-air mixture is transmitted to a fuel flow switch 1622 that is operably coupled to the gas line 1610. The fuel flow switch 1622 is configured to selectively permit and selectively inhibit the flow of the hydrogen-oxygen-air mixture from the storage chamber 1618 to the combustion cylinder 1626. It is contemplated that the fuel flow switch 1622 may be any suitable switch capable of selectively inhibiting and permitting the flow of a fluid therethrough, and in embodiments may be an electrically controlled valve. As can be appreciated, in the case of an emergency, the fuel flow switch 1622 may be actuated by the computer management system 1800 to close and inhibit the flow of the hydrogen-oxygen-air mixture from the storage chamber 1618 to the combustion cylinder 1626.

A pressure regulator 1624 is operably coupled to the gas line 1610 and is configured to regulate a pressure of the hydrogen-oxygen-air mixture that is supplied to the combustion cylinder 1626. It is contemplated that the pressure regulator 1624 may be any suitable pressure regulator capable of regulating a pressure of a gas, and in embodiments, the pressure regulator 1624 may be electrically or manually operated. In this manner, the pressure at which the hydrogen-oxygen-air mixture is supplied to the combustion cylinder 1626 may be varied depending upon the design needs of the hydrogen generator system 1600 and the conditions at which the hydrogen generator system 1600 is operating.

The combustion cylinder 1626 is operably coupled to the gas line 1610 such that the hydrogen-oxygen-air mixture is permitted to flow from the pressure regulator 1624 to the combustion cylinder 1626 at a predetermined pressure. The combustion cylinder 1626 is a reciprocating piston type engine having a cylinder 1626a and a piston-connecting rod assembly 1626b. The piston (not shown) of the piston connecting rod assembly 1626b is slidably disposed within the cylinder 1626a such that a combustion chamber (not shown) is formed. The cylinder 1626a includes an inlet port 1626c disposed thereon that is in fluid communication with the combustion chamber and the gas line 1610 such that the hydrogen-oxygen-air mixture may be transmitted from the storage chamber 1618 to the combustion chamber of the cylinder 1626a. The inlet port 1626c is operably coupled to an inlet port valve (not shown) that is configured to selectively inhibit and permit the flow of the hydrogen-oxygen-air mixture into the combustion chamber depending upon the position of the piston of the piston connecting rod assembly 1626b within the combustion cycle.

The combustion cylinder 1626 may include a glow plug or spark plug 1626d that is selectively secured to the cylinder 1626a and operably coupled to the combustion chamber. In this manner, the glow plug 1626d acts as a heat source to aid in combustion of the hydrogen-oxygen-air mixture within the combustion chamber and thereby cause the piston connecting rod assembly 1626b to be driven away from the glow plug 1626d during a power stroke thereof. It is envisioned that the timing of the combustion cylinder 1626 (e.g., timing at which the inlet port valve permits the hydrogen-oxygen-air mixture to flow through the inlet port 1626c and/or the timing at which the spark plug fires) may be controlled mechanically (e.g., by a linkage operably coupled to a flywheel, etc.) or electronically by the computer management system 1800. As will be appreciated, neither the glow plug nor a spark plug is expressly necessary, and the combustion cylinder 1626 may be solely compression fired as the piston moves within the combustion cylinder 1626. In this manner, the combustion cylinder 1626 may act as either a four-stroke or a two-stroke engine depending on the placement of the inlet and exhaust valves and ports.

In a preferred embodiment the combustion cylinder is a compression fired two-stroke engine. In such a configuration, the exhaust is uncovered by the piston as the piston travels in the direction of bottom dead center. The high-pressure combustion gases exit the exhaust port and continue to do so as the piston travels past bottom dead center and begins compression of the gas in the combustion cylinder 1626. At a certain point of travel, the piston again covers the exhaust ports and further travel of the piston compresses the air in the combustion cylinder 1626. Injection of the hydrogen and oxygen mixture occurs after this point, and as the mixture is further compressed at a point a few degrees before or after top dead center the hydrogen and oxygen mixture combusts and propels the piston towards bottom dead center to drive the piston rod and therewith the generator 1702 and/or flywheel 1706.

Alternatively, the combustion cylinder 1626 may be a four-stroke design where combustion occurs only every second time that the piston reaches top dead center. In such a design, following ignition of the hydrogen and oxygen mixture the exhaust valve remains closed until the piston nears bottom dead center. At this point the exhaust valve opens, and as the piston travels towards top dead center the combusted gases are exhausted via the exhaust valve. The inlet valve opens either before the piston reaches top dead center to assist with exhaust or shortly after the piston reaches top dead center. As the piston travels back towards bottom dead center, the movement of the piston creates vacuum which draws oxygen and hydrogen into the combustion cylinder 1626. After reaching bottom dead center the inlet valve closes and subsequent movement of the piston compresses the mixture until an ignition point is reached and the piston begins to travel towards bottom dead center, and the process repeats. As will be appreciated, the timing of compression, ignition, exhaust, and injection can be manipulated to achieve a desired efficiency. Further the volume of hydrogen and oxygen mixture can be adjusted for the desired power output and speed of the combustion cylinder 1626 and generator 1702.

In embodiments, the combustion cylinder 1626 includes a cooling jacket 1626e is disposed about an outer surface thereof. An interior portion (not shown) of the cooling jacket 1626e includes a cooling fluid disposed therein, such as water, glycol, oil, etc. The interior portion of the cooling jacket 1626e is in fluid communication with a radiator 1628 or other suitable cooling device that is configured to cool the cooling fluid circulating within the cooling jacket 1626e. Although generally illustrated as including a fan or other mechanical cooling device, it is contemplated that the radiator 1628 may not include a fan. A thermostat 1630 or other suitable temperature sensing device capable of permitting or inhibiting the flow of fluid therethrough based upon a temperature of the fluid is operably coupled to the cooling jacket 1626e to ensure that the fluid within the cooling jacket 1626e is maintained at a suitable temperature. In embodiments, the thermostat 1630 is operably coupled to the computer management system 1800 such that the computer management system 1800 controls the opening and closing of a valve (not shown) associated with the thermostat 1630.

In embodiments, the cooling jacket 1626e may include a plurality of tubes or rods (not shown) that is configured to permit a cooling fluid to flow therewithin. Similar to the interior portion of the cooling jacket 1626e described hereinabove, the plurality of tubes is fluidly coupled to the thermostat and to the radiator to cool the fluid flowing within the plurality of tubes to ensure the combustion cylinder 1626 is operating at an optimal temperature.

It is envisioned that the combustion cylinder 1626 may include a plurality of cooling fins (not shown) disposed on the outer surface that is configured to cool the combustion cylinder 1626 using the ambient air. In embodiments, a fan (not shown) or other air moving device may be utilized to cause air to move over the plurality of cooling fins and enhance the cooling ability of the plurality of cooling fins.

Figure 28:
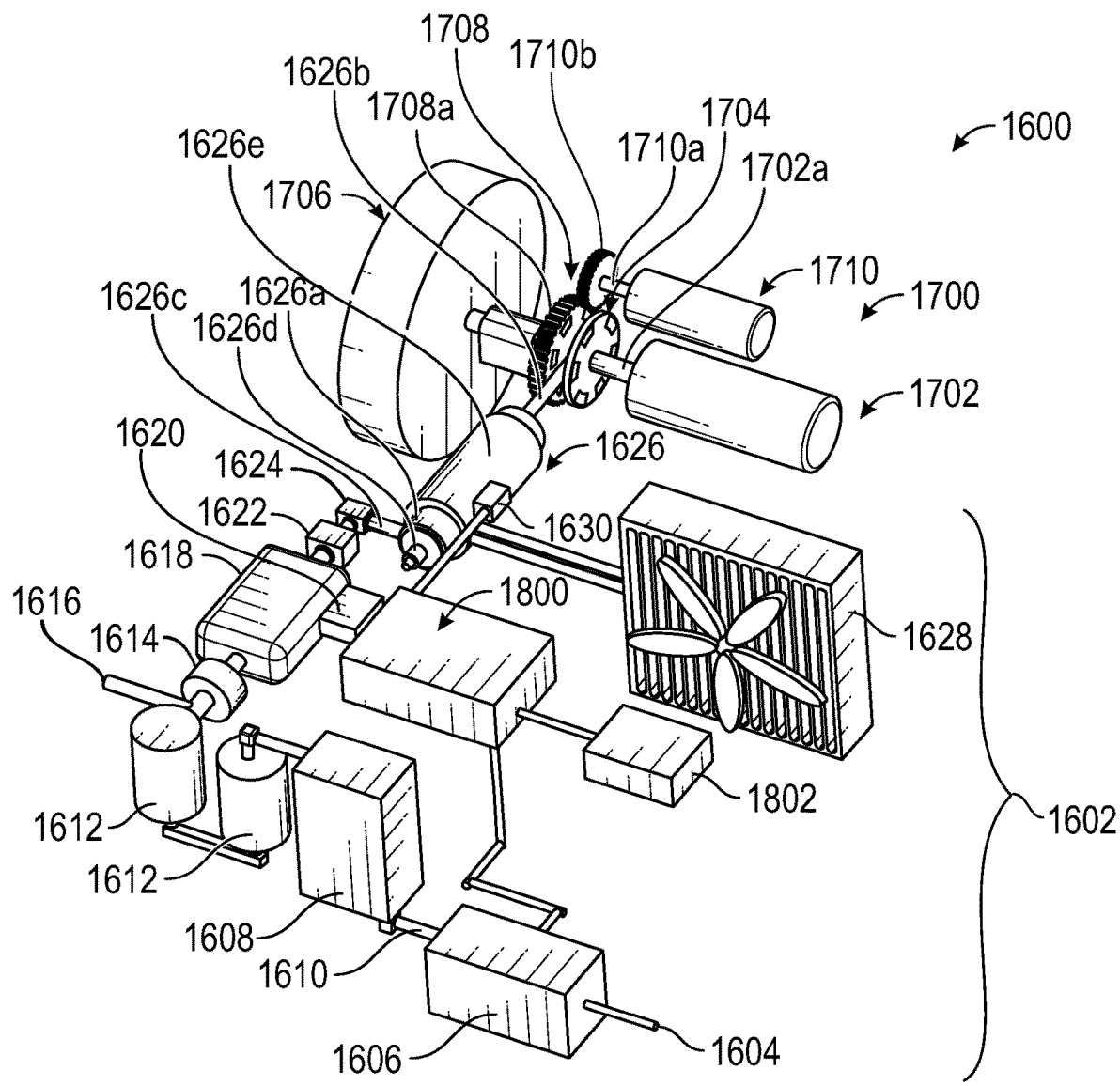
FIG. 28 is a perspective view of a hydrogen generation system provided in accordance with the present disclosure.

Continuing with FIG. 28, the electrical generation system 1700 includes an electric generator 1702, a motor coupling 1704, a flywheel 1706, a magnetic coupling 1708, and a starter motor 1710.

A distal portion of the piston connecting rod assembly 1626b is operably coupled to a motor coupling 1704. The motor coupling 1704 is substantially similar to the motor coupling 1080 and therefore, the motor coupling 1704 will not be described in detail herein in the interest of brevity. The piston connecting rod assembly 1626b is operably coupled to the motor coupling 1704 at a location that is radially offset from a center or rotation of the motor coupling 1704 such that a drive force during the power stroke of the piston connecting rod assembly 1626b imparted on the motor coupling 1704 causes the motor coupling 1704 to rotate about its center of rotation. The motor coupling 1704 is operably coupled to an input shaft 1702a of the electric generator 1702 at a center of rotation thereof, such that rotation of the motor coupling 1704 effectuates a corresponding rotation of the input shaft 1702a, which in turn, causes the electric generator 1702 to generate electrical energy.

A flywheel 1706 is rotatably supported adjacent to the motor coupling 1704 and includes a magnetic coupling 1708 operably coupled thereto. In this manner, rotation of the magnetic coupling 1708 effectuates a corresponding rotation of the flywheel 1706 and vice versa. The magnetic coupling 1708 is substantially similar to the magnetic coupling 1050 and therefore, the magnetic coupling 1708 will not be described in detail herein in the interest of brevity. The magnetic coupling 1708 is magnetically coupled to the motor coupling 1704 such that rotation of the magnetic coupling 1708 effectuates a corresponding rotation of the motor coupling 1704 and vice versa. As can be appreciated, the interaction between the magnetic coupling 1708 and the motor coupling 1704 is substantially similar to that of the magnetic coupling 1050 and the motor coupling 1080 described in detail hereinabove. The flywheel 1706 is substantially similar to the flywheels described hereinabove, and in embodiments, may be substantially similar to the flywheel assemblies 1010 and may include one or more pods 1300.

A starter motor 1710 is operably coupled to the magnetic coupling 1708 using any suitable means such that rotation of an output shaft 1710a of the starter motor 1710 effectuates a corresponding rotation of the magnetic coupling 1708. In one non-limiting embodiment, the starter motor 1710 is operably coupled to the magnetic coupling 1708 using a pinion gear 1710b disposed on the output shaft 1710a of the starter motor 1710 and a spur gear 1708a disposed on a portion of the magnetic coupling 1708. As can be appreciated, rotation of the magnetic coupling 1708 effectuates a corresponding rotation of the motor coupling 1704, which in turn, causes the piston connecting rod assembly 1626b to reciprocate within the combustion chamber of the combustion cylinder 1626. Continued rotation of the magnetic coupling 1708 causes the combustion cylinder 1626 to maintain combustion and cause the piston connecting rod assembly 1626b to drive the motor coupling 1704. In this manner, the starter motor 1710 is selectively utilized to start the combustion process.

With continued reference to FIG. 28, the computer management system 1800 includes a processor (not shown) and a memory (not shown) operably coupled to the processor. The memory stores instructions, which when executed by the processor cause the processor to interrogate or otherwise control various sensors and valves associated with the hydrogen generator system 1600, as described hereinabove. The computer management system 1800 may be operably coupled to a computer system (not shown) located at a remote location, such that the hydrogen generator system 1600 may be controlled remotely. In embodiments, the computer management system 1800 is operably coupled to a battery back-up system 1802, such as the battery storage compartment 1450 described in detail hereinabove. In this manner, should the electrical power supplied by the electrical power supply 1604 be interrupted, the battery back-up system supplies the computer management system 1800 and the electrical components of the hydrogen generator system 1600 with electrical energy to ensure uninterrupted generation of electrical energy by the hydrogen generator system 1600. As can be appreciated, the computer management system 1800 is configured to issue various alarms and signals to the use based upon the operation of the hydrogen generator system 1600 and is capable of autonomously running the hydrogen generator system 1600.

Figure 29:
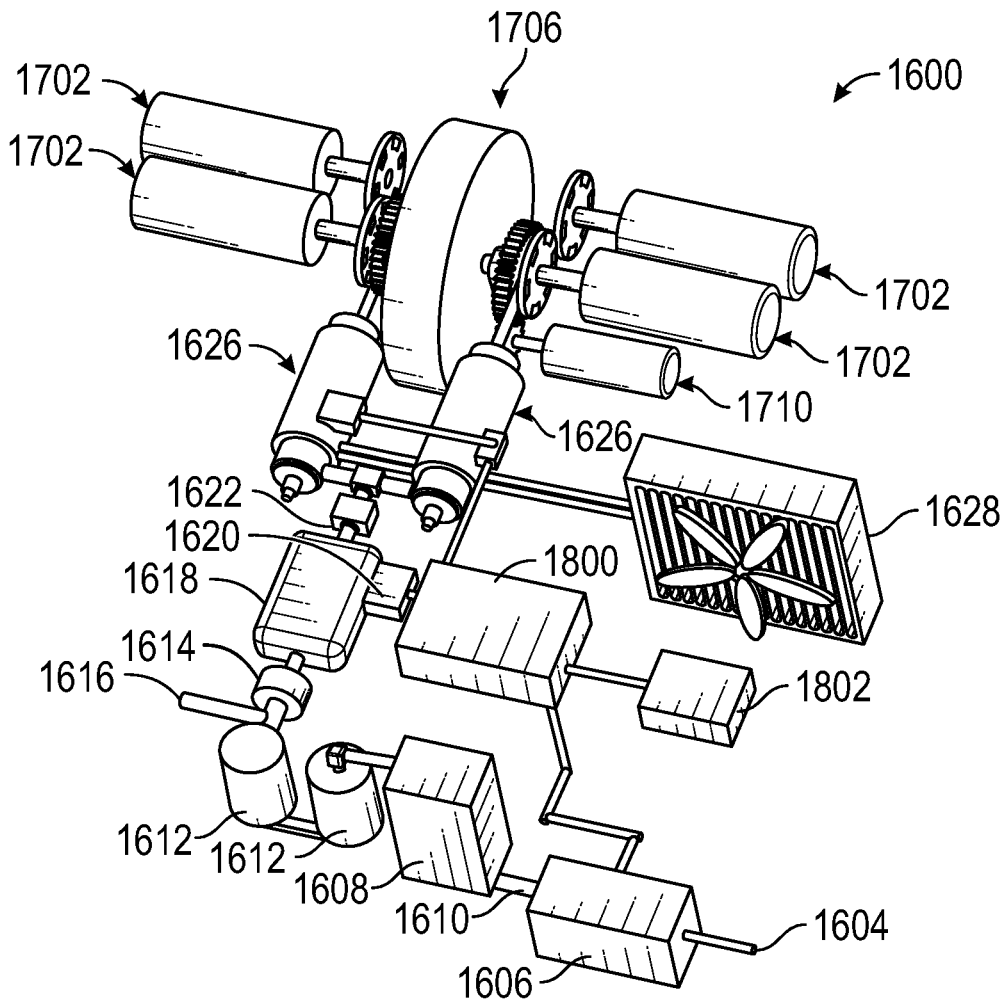
FIG. 29 is a perspective view of another embodiment of the hydrogen generation system of FIG. 28 provided in accordance with the present disclosure.
Figure 30:
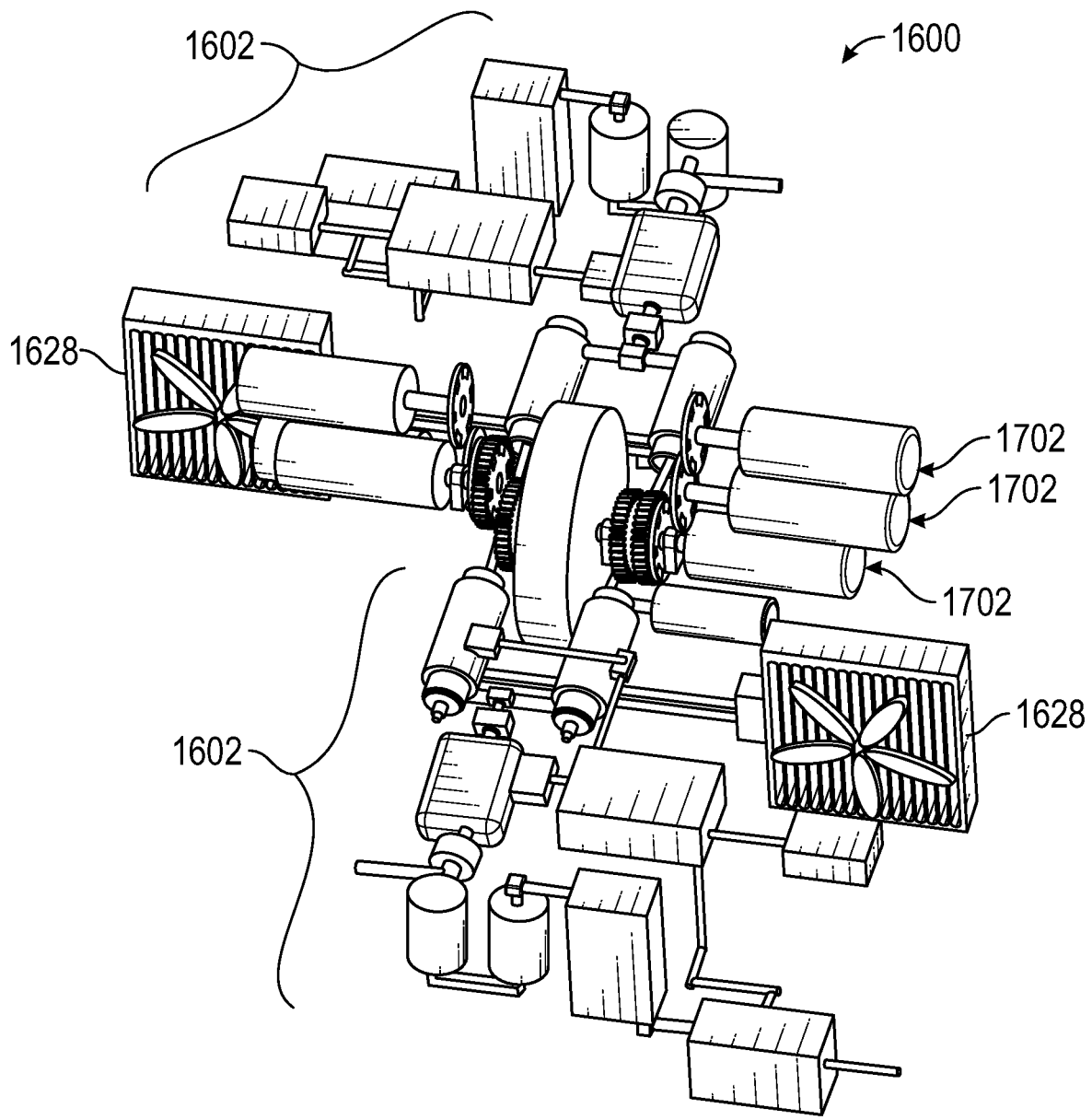
FIG. 30 is a perspective view of yet another embodiment of the hydrogen generation system of FIG. 28 provided in accordance with the present disclosure.
Figure 31:
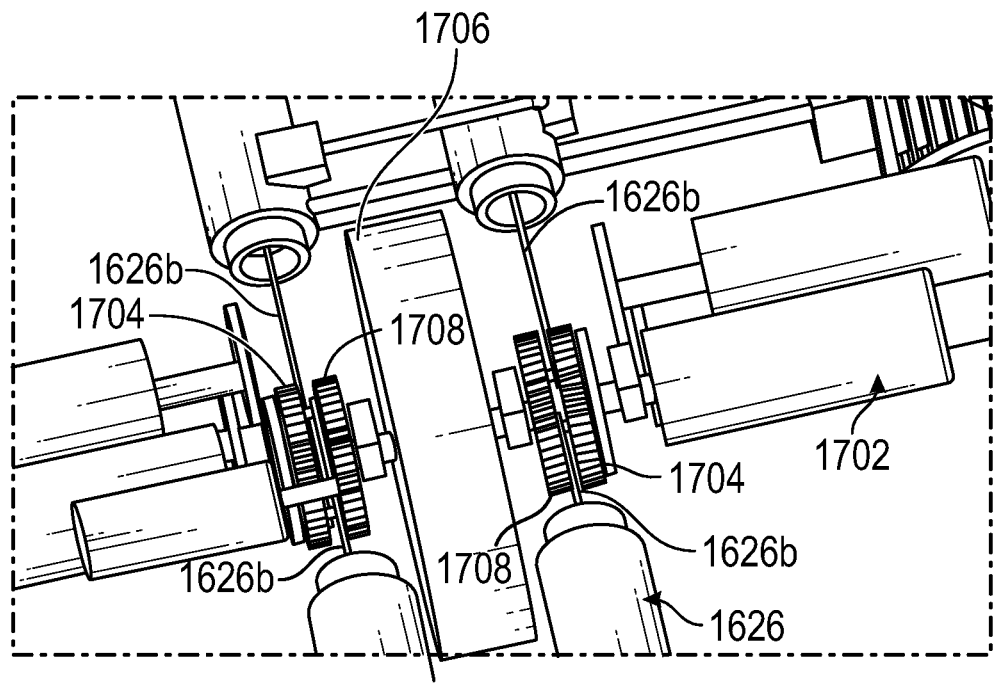
FIG. 31 is a perspective view magnetic coupling of the hydrogen generation system of FIG. 30.

As illustrated in FIGS. 29-31, is it envisioned that the hydrogen generator system 1600 may include one or more combustion cylinders 1626, one or more electric generators 1630, and/or one or more flywheels 1632, etc., depending upon the design needs of the hydrogen generator system 1600. It is envisioned that the motor couplings 1628 of each electric generator 1702 may overlap one another such that rotation of one motor coupling 1704 effectuates a corresponding rotation of an adjacent, overlapping motor coupling 1704, thereby minimizing the number of components necessary to drive each respective electric generator 1702.

With reference to FIG. 31, as can be appreciated, the piston connecting rod assembly 1626b may be operably coupled to a portion of the motor coupling 1704 or the magnetic coupling 1708, and in embodiments having more than one combustion cylinder 1626, the piston connecting rod assembly 1626b of each respective combustion cylinder is operably coupled to an opposite one of the motor coupling 1704 or magnetic coupling 1708.

With reference to FIGS. 28-31, in operation, the computer management system 1800 causes the hydrogen generator 1606 to begin the electrolysis process and generate the hydrogen-oxygen gas mixture. Thereafter, the hydrogen-oxygen gas mixture flows through the gas bubbler 1608 for filtration and to the one or more desiccant dryers 1612 for drying. After exiting the desiccant dryers 1612, air is introduced into the dry, filtered, hydrogen-oxygen gas mixture at the air intake 1616 before the hydrogen-oxygen-air mixture is introduced to the supercharger 1614. The supercharger 1614 compresses the hydrogen-oxygen-air mixture forces the hydrogen-oxygen-air mixture into the storage chamber 1618 for storage before use by the combustion cylinder 1626. The computer management system 1800 monitors the pressure within the storage chamber 1618 and if the pressure reaches a predetermined upper pressure limit, the computer management system 1800 causes the hydrogen generator 1604 to shut off and cease the generation of hydrogen and oxygen gas. Similarly, if the pressure within the storage chamber 1618 reaches a predetermined lower pressure limit, the computer management system 1800 causes the hydrogen generator to turn on and begin generating hydrogen and oxygen gas to replenish the hydrogen-oxygen-air mixture stored within the storage chamber 1618.

When the generation of electrical energy is desired, the computer management system 1800 causes the starter motor 1710 to begin rotating the flywheel 1706 which effectuates rotation of the magnetic coupling 1708, which effectuates rotation of the motor coupling 1704, which in turn, effectuates rotation of the electric generator 1702 and the reciprocation of the piston connecting rod assembly 1626b within the cylinder 1626a of the combustion cylinder 1626. In this manner, the combustion process begins and the electric generator 1702 is caused to generate electrical energy by the combustion of the hydrogen-oxygen-air mixture fed into the combustion cylinder 1626. As can be appreciated, the computer management system 1800 may turn the combustion process within the combustion cylinder 1626 on and off depending upon the electrical load placed upon the electric generator 1702.

The computer management system 1800 monitors the temperature of the combustion cylinder 1626 and causes the thermostat to open or close to permit and inhibit the flow of cooling fluid to the radiator 1628 to maintain the combustion cylinder 1626 at a desired temperature. The computer management system 1800 similarly monitors the amount of air mixed into the hydrogen-oxygen gas mixture at the air intake 1616 and controls a valve or other suitable device (not shown). The computer management system 1800 controls the flow of the hydrogen-oxygen-air mixture into the combustion chamber of the combustion cylinder 1626 based upon the location of the piston connecting rod assembly 1626b within the cylinder 1626a to ensure the desired operation of the combustion cylinder 1626.

It is envisioned that the hydrogen generator system 1600 may be utilized within any of the devices and system described hereinabove. In embodiments, the hydrogen generator system 1600 may be utilized in the renewable energy generation system 1400. It is contemplated that the hydrogen generator system 1600 may be utilized as a standalone system or in combination with one or more hydrogen generator systems 1600, renewable energy generation systems 1400, solar arrays, hydrodynamic systems, etc.

Figure 32:
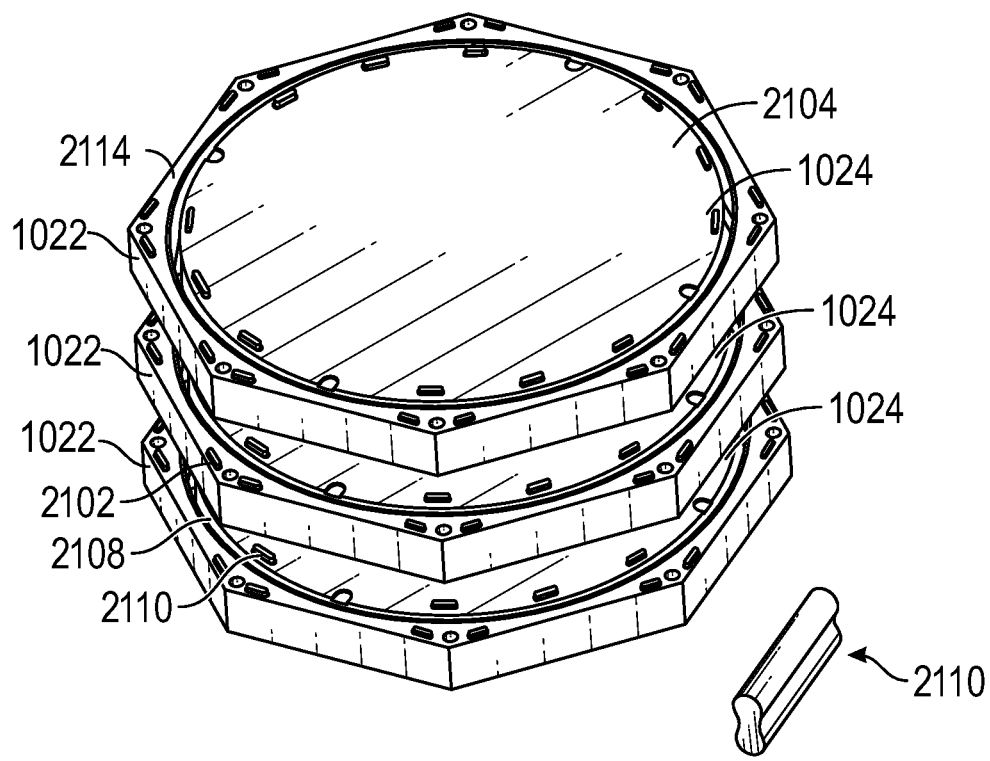
FIG. 32 is a top perspective view of a flywheel and flywheel housing connecting system and method in accordance with the disclosure.
Figure 33:
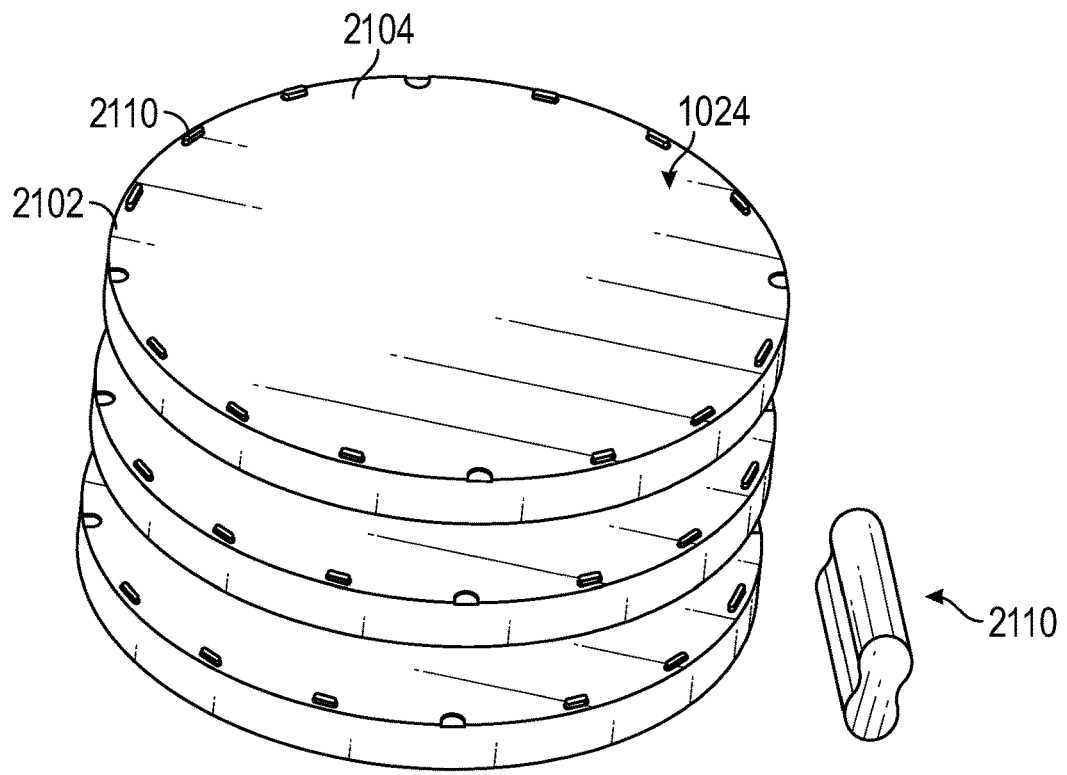
FIG. 33 is a top perspective view of a flywheel and connecting system and method in accordance with the disclosure.
Figure 34:
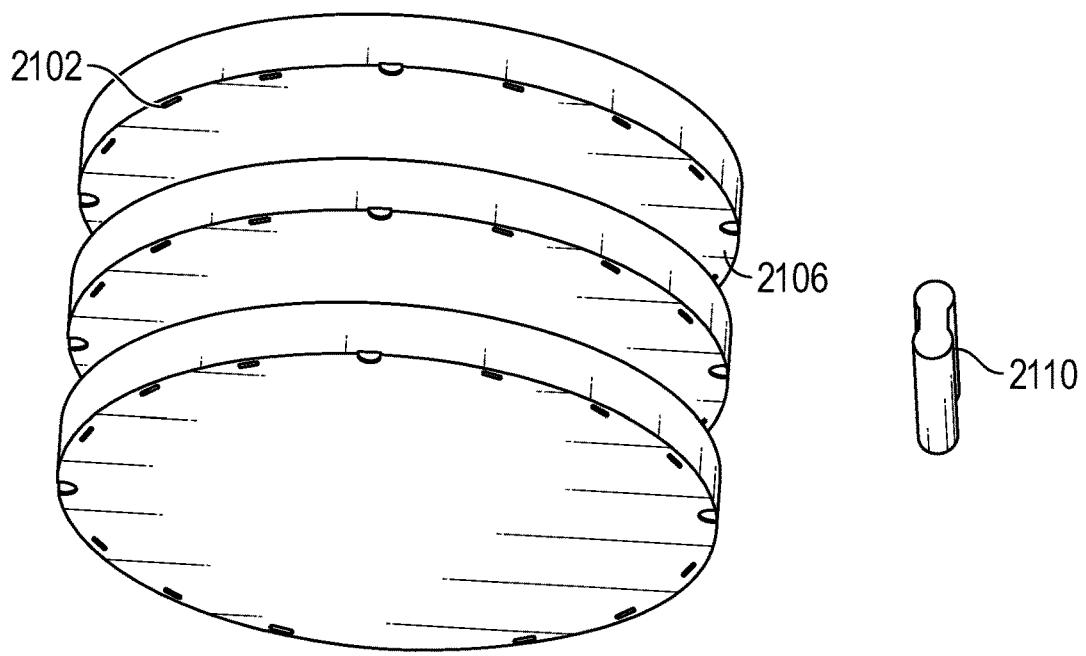
FIG. 34 is a bottom perspective view of a flywheel connecting system and method in accordance with the disclosure.
Figure 35:
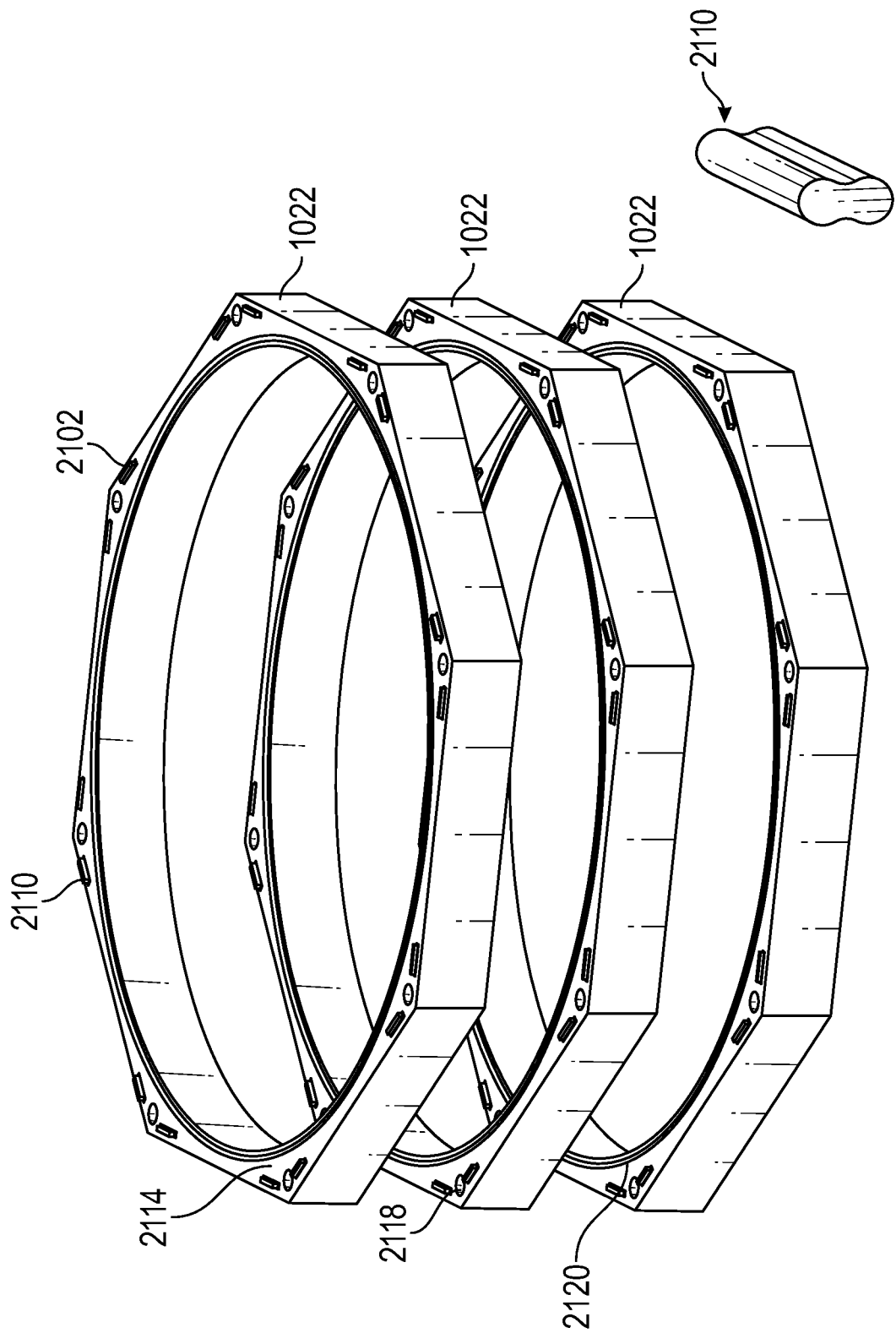
FIG. 35 is a top perspective view of a flywheel housing connecting system and method in accordance with the disclosure.
Figure 36:
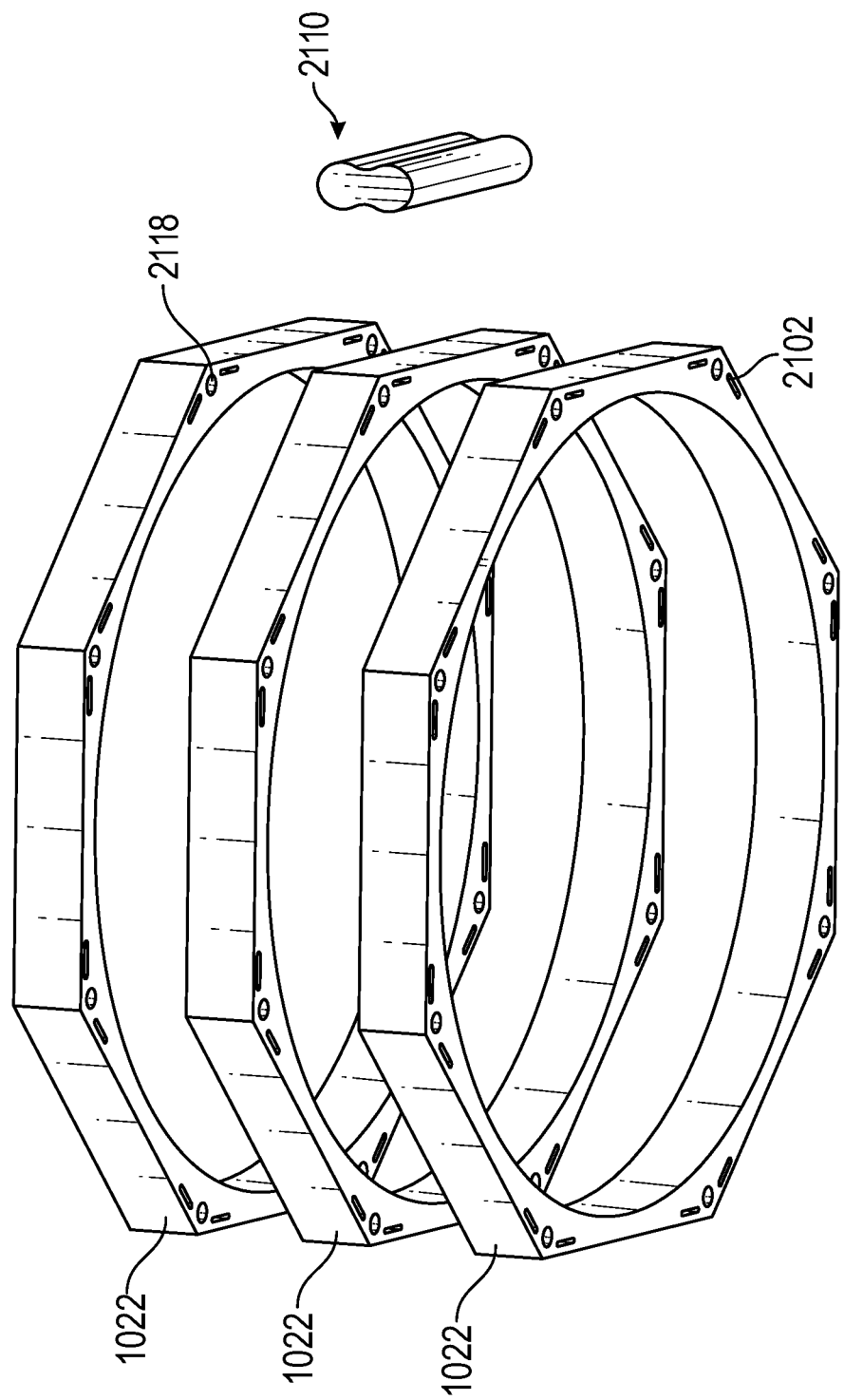
FIG. 36 is a bottom perspective view of a flywheel housing connecting system and method in accordance with the disclosure.

FIGS. 32-36 depict a system and method of securing a desired number of flywheel housings 1022 and a desired number of flywheels 1024 such that they form substantially monolithic structures. These monolithic structures ensure that the flywheels 1024 rotate together and that the flywheel housings 1022 are secured to one another and are prevented from rotating. As depicted in FIG. 32, each flywheel 1024 includes a plurality of machined slots 2102. The machined slots 2102 are formed on both the top and bottom surfaces 2104 and 2106 of each flywheel 1024. In one embodiment they are formed proximate the peripheral edge 2108 of the flywheel 1024, though they may be formed at any location in the flywheel 1024 as long as the locations of the machined slots 2102 formed on a top surface 2104 match those formed on an adjacent bottom surface 2104 of the next flywheel 1024 in a stack of flywheels. Placed in each of these machined slots 2102 is a pin 2110. The pin 2110 is placed, for example, in a machined slot 2102 formed in a top surface 2104 of one flywheel 1024. When all of the machined slots 2102 in a top surface 2104 are filled with pins 2110, a second flywheel 1024, having machined slots 2102 formed in a bottom surface 2106 is placed such that the machined slots 2102 on the bottom surface 2106 receive the pins 2110. The pins 2110 may be press fit into the machined slots 2102, or they may simply have a secure but hand fit. The two flywheels 1024 are secured to one another by the weight of the top flywheel 1024 on the bottom flywheel 1024 and the pins 2110. As depicted in FIGS. 32-36, the pins 2110 have a "peanut" shape, though other shapes can be utilized without departing from the scope of the disclosure. Further, though shown with slots 2102 being formed on all top and bottom surfaces 2104, 2106, the top most and bottom most flywheel 1024 need not have slots 2102 formed in the top most and bottom most surface of the flywheel stack to reduce the amount of machining.

In a similar vein, each flywheel housing 1022 includes similar machine slots 2102 formed on both top surface 2114 and bottom surface 2116 thereof. Placing successive flywheel housings 1022 such that pins 2110 are received in the machine slots 2102 ensures alignment of the flywheel housings 1022. Such alignment ensures that there will be no interference between the flywheel 1024 and the flywheel housing 1022. Further, this speeds the process of assembling the flywheel housings and holds them in place until the securement bolts 1130 can be placed in the through holes 2118. As noted above an O-ring or gasket 2120 may be placed in a channel 2122 formed in each housing 1022 to ensure that the flywheel housing 1022 is air tight such that a vacuum may be formed on the interior of the flywheel housing 1022.

Figure 37:
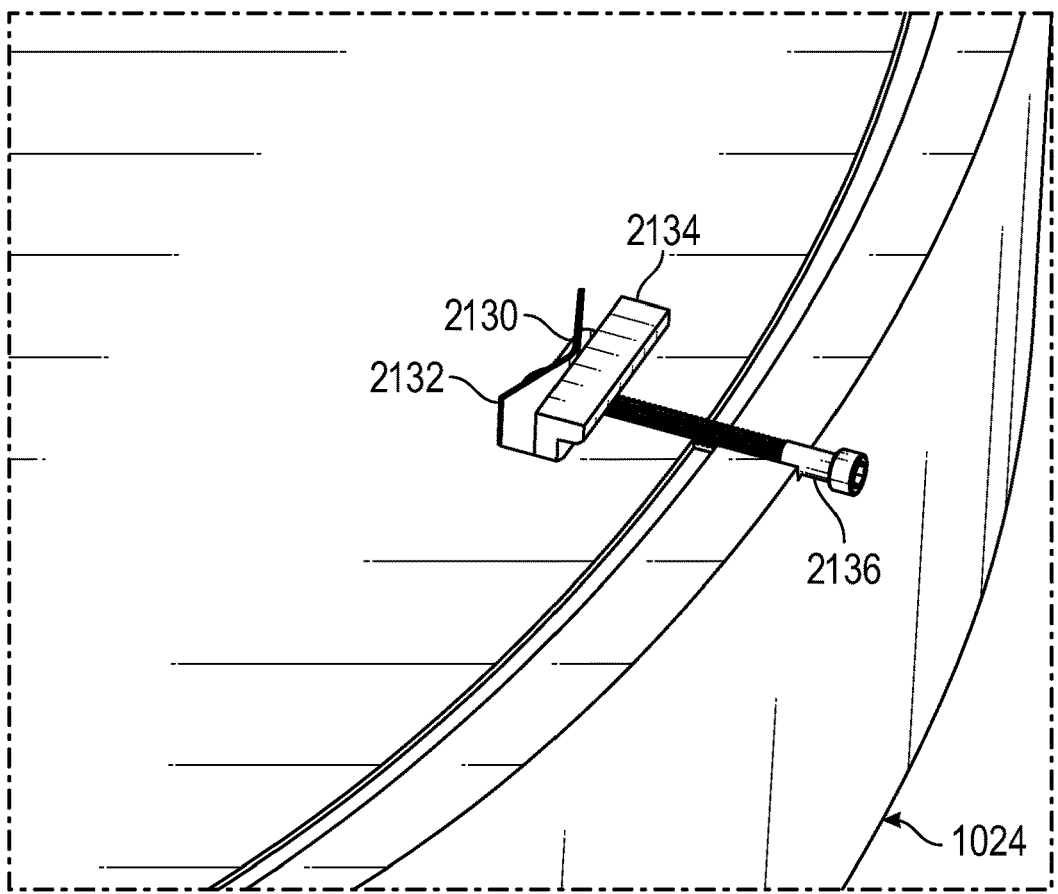
FIG. 37 is a top perspective view of a flywheel locking system and method in accordance with the disclosure.

FIGS. 37-41 depict an alternative method of securing adjacent flywheels 1024. As depicted in FIG. 37, each flywheel 1024 includes a slot 2130 formed therein. Placed in this slot 2130 is a biasing spring 2132 and a U-shaped insert 2134. The biasing spring 2132 forces the U-shaped insert 2134 into an undercut portion 2136 of the slot 2130 (See FIG. 39). A screw 2136 acts on the U-shaped insert 2134 to force the U-shaped insert 2134 against the biasing spring 2132 to allow two flywheels 1024 to be aligned and placed on top of each other, as shown in FIG. 39. Once two flywheels 1024 are placed one on top of another, the screw 2136 can be withdrawn. The biasing spring 2132 forces the U-shaped insert 2134 into the undercut portion 2138 of the slot 2130 to secure the two (or more) flywheels 1024 to one another. As will be appreciated matching slots 2130 with undercut portions 2138 are machined into both the top and bottom surfaces of the flywheels 1024 so that the U-shaped insert 2134 can be received into the undercut portions 2138 of two successive flywheels 1024 as shown. It will be appreciated that any number of flywheels 1024 may be secured in this manner. Further, it will be appreciated that where a top surface of a flywheel 1024 or a bottom surface of a flywheel 1024 will not be mating with another flywheel 1024, it need not include the slot 2130. FIG. 41 depicts a perspective view of the U-shaped insert 2134. If for some reason the flywheel stack should ever need to be de-constructed, re-insertion of the screws 2136 can be used to again compress the biasing spring 2132 and allow a top flywheel 1024 to be removed from a bottom flywheel 1024. As will be appreciated each flywheel 1024 can include 2, 4, 6, 8, 10, or more slots 2130 formed therein to secure two or more flywheels 1024 to one another.

It will be understood that various modifications may be made to the embodiments of the presently disclosed renewable energy generation systems. Therefore, the above description should not be construed as limiting, but merely as exemplifications of embodiments. Those skilled in the art will envision other modifications within the scope and spirit of the present disclosure.

What is claimed is:

1. A renewable energy generation system, comprising:
   an electric drive motor operating at a substantially constant speed;
   a flywheel in mechanical communication with the electric drive motor, wherein the electric drive motor effectuates a rotation of the flywheel to generate stored rotational energy;
   a generator in direct mechanical communication with the flywheel, wherein the rotational energy of the flywheel is transferred to the generator;
   a charge controller in electrical communication with the generator;
   a plurality of charge controller switches in electrical communication with the charge controller;
   a plurality of batteries, each battery of the plurality of batteries in electrical communication with a respective charge controller switch of the plurality of charge controller switches;
   a power management module in electrical communication with the plurality of charge controller switches, the power management module selectively opening or closing one or more of the plurality of charge controller switches to permit or inhibit flow of electrical energy to respective batteries of the plurality of batteries from the generator; and
   a plurality of discharge controller switches, each discharge controller switch in electrical communication one or more of the plurality of batteries and the power management module, the power management module selectively opening or closing one or more of the plurality of discharge controller switches to permit or inhibit flow of electrical energy from respective batteries of the plurality of batteries to a load, wherein the power management module prevents the charge controller switch and the discharge controller switch for any one of the plurality of batteries from closing at the same time thereby isolating the generator from the load.

2. The renewable energy generation system according to claim 1, further comprising a plurality of generators, each generator of the plurality of generators being in mechanical communication with the flywheel and being in electrical communication with the charge controller.

3. The renewable energy generation system according to claim 1, further comprising an electrical control box disposed on an exterior portion of a housing, the electrical control box defining an interior portion in which the charge controller, the plurality of charge controller switches, the plurality of batteries, and the power management module are disposed.

4. The renewable energy generation system according to claim 3, wherein a rectifier, a diode, and a speed controller are disposed within the electrical control box, wherein the rectifier and the diode are in electrical communication with the generator and the speed controller is in electrical communication with the drive motor.

5. The renewable energy generation system according to claim 1, further comprising:
   a first electrical control box for receiving electrical energy generated by the generator, the first electrical control box defining an interior portion in which a speed controller is disposed, the speed controller being in electrical communication with the drive motor; and
   a second electrical control box in electrical communication with the first electrical control box, the second electrical control box defining an interior portion in which a rectifier and a diode are disposed, wherein the rectifier and the diode are in electrical communication with the generator.

6. A method of generating renewable electrical energy, comprising:
   transmitting rotational energy from an electric drive motor at a substantially constant speed to a flywheel to store rotational energy in the flywheel;

transmitting rotational energy from the flywheel to a generator to generate electrical energy;

transmitting generated electrical energy from the generator to a charge controller in electrical communication with a plurality of charge controller switches;

identifying with a power management module a battery from a plurality of batteries having a power level greater than a first pre-determined threshold;

opening a charge controller switch corresponding to the identified battery to inhibit flow of electrical energy to the identified battery from the generator; and closing a discharge controller switch corresponding to the identified battery to permit flow of electrical energy from the identified battery to a load, thereby isolating the generator from the load and inhibiting a large instantaneous load from being placed upon the generator and drive motor.

7. The method according to claim 6, further comprising converting alternating current generated by the generator to direct current using a rectifier in electrical communication with the generator to store direct current electrical energy in the plurality of batteries.

8. The method according to claim 7, further comprising converting the direct current received from the plurality of batteries to alternating current using an inverter.

9. The method according to claim 7, further comprising converting a first portion of the direct current electrical energy transmitted from the plurality of batteries to alternating current using a first inverter.

10. The method according to claim 9, further comprising converting a second portion of the direct current electrical energy transmitted from the plurality of batteries to alternating current using a second inverter.

11. The method according to claim 10, wherein the first portion of direct current electrical energy is converted into alternating current using a pure sine wave inverter.

12. The method according to claim 11, wherein the second portion of direct current electrical energy is converted into alternating current using a grid tie inverter.

13. The method according to claim 6, further comprising opening the discharge switch corresponding to the identified battery to inhibit discharging the identified battery.

14. The method according to claim 6, further comprising closing a battery bank bypass switch such that electrical energy generated by the generator bypasses the plurality of batteries and inhibits electrical energy from being transmitted to the plurality of batteries.

15. The method according to claim 6, further comprising monitoring the generator using a computer module in electrical communication therewith and generating an alarm in response to a fault identified by the computer module.

* * * * *